(12) United States Patent
Kawasaki et al.

(10) Patent No.: US 11,672,037 B2
(45) Date of Patent: Jun. 6, 2023

(54) UE AND MME FOR DETERMINING NBIFOM MODE

(71) Applicant: SHARP KABUSHIKI KAISHA, Sakai (JP)

(72) Inventors: Yudai Kawasaki, Sakai (JP); Yoko Kuge, Sakai (JP); Masafumi Aramoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 47 days.

(21) Appl. No.: 15/564,930

(22) PCT Filed: Apr. 6, 2016

(86) PCT No.: PCT/JP2016/061299
§ 371 (c)(1),
(2) Date: Oct. 6, 2017

(87) PCT Pub. No.: WO2016/163418
PCT Pub. Date: Oct. 13, 2016

(65) Prior Publication Data
US 2018/0098373 A1 Apr. 5, 2018

(30) Foreign Application Priority Data
Apr. 7, 2015 (JP) .............................. JP2015-078106

(51) Int. Cl.
*H04W 76/15* (2018.01)
*H04W 76/10* (2018.01)
(Continued)

(52) U.S. Cl.
CPC .............. *H04W 76/15* (2018.02); *H04L 69/24* (2013.01); *H04W 4/00* (2013.01); *H04W 8/02* (2013.01);
(Continued)

(58) Field of Classification Search
CPC ...... H04W 76/15; H04W 76/18; H04W 76/10; H04W 8/02; H04L 69/24
See application file for complete search history.

(56) References Cited

U.S. PATENT DOCUMENTS

2010/0208698 A1* 8/2010 Lu ...................... H04W 36/08
370/331
2011/0103348 A1* 5/2011 Hori .................. H04W 36/0055
370/331
(Continued)

FOREIGN PATENT DOCUMENTS

EP 3206436 A1 * 8/2017 ............. H04L 45/38
WO WO 2013/082245 A1 6/2013
WO WO-2016159522 A1 * 10/2016 ............ H04W 28/08

OTHER PUBLICATIONS

3GPP SA WG2 Meeting#107 S2-150528: IP Flow Mobility Using the IFMP Protocol, NB-IFOM Rel-13, BlackBerry/Motorola LTD, Jan. 26-30, 2015.*
(Continued)

*Primary Examiner* — Jael M Ulysse
(74) *Attorney, Agent, or Firm* — Birch, Stewart, Kolasch & Birch, LLP

(57) ABSTRACT

Communications control in response to establishment of a multi-access PDN connection or with rejection of establishment of a multi-access PDN connection is performed based on a response to a PDN connectivity establishment request from a terminal device. This provides a method of communication control and the like in response to a multi-access PDN connectivity establishment request from the terminal device.

8 Claims, 18 Drawing Sheets

(51) Int. Cl.

| | |
|---|---|
| *H04W 48/18* | (2009.01) |
| *H04W 72/04* | (2023.01) |
| *H04W 4/00* | (2018.01) |
| *H04W 80/00* | (2009.01) |
| *H04L 69/24* | (2022.01) |
| *H04W 76/18* | (2018.01) |
| *H04W 8/02* | (2009.01) |
| *H04W 48/02* | (2009.01) |
| *H04W 48/16* | (2009.01) |
| *H04W 88/10* | (2009.01) |

(52) U.S. Cl.
CPC ........... *H04W 48/02* (2013.01); *H04W 48/18* (2013.01); *H04W 72/04* (2013.01); *H04W 76/10* (2018.02); *H04W 76/18* (2018.02); *H04W 80/00* (2013.01); *H04W 48/16* (2013.01); *H04W 88/10* (2013.01)

(56) References Cited

U.S. PATENT DOCUMENTS

| | | | | |
|---|---|---|---|---|
| 2012/0218974 | A1* | 8/2012 | Zhou | H04L 69/161 370/331 |
| 2013/0070596 | A1* | 3/2013 | Yeh | H04W 76/22 370/235 |
| 2014/0219248 | A1* | 8/2014 | Reddiboyana | H04W 76/15 370/331 |
| 2014/0233386 | A1* | 8/2014 | Jamadagni | H04W 36/22 370/235 |
| 2014/0321328 | A1* | 10/2014 | Zuniga | H04W 8/24 370/254 |
| 2015/0036672 | A1* | 2/2015 | Kim | H04W 40/02 370/338 |
| 2015/0327114 | A1* | 11/2015 | Gupta | H04W 40/36 370/235 |
| 2015/0382393 | A1* | 12/2015 | Kiss | H05K 999/99 370/328 |
| 2016/0105828 | A1* | 4/2016 | Lai | H04W 76/16 370/331 |
| 2016/0135219 | A1* | 5/2016 | Jain | H04W 28/0263 370/329 |
| 2017/0026824 | A1* | 1/2017 | Kim | H04W 64/00 |
| 2017/0366960 | A1* | 12/2017 | Kim | H04W 8/08 |
| 2018/0041928 | A1* | 2/2018 | Youn | H04W 76/16 |
| 2018/0054760 | A1* | 2/2018 | Chun | H04W 76/27 |
| 2018/0070288 | A1* | 3/2018 | Kim | H04W 36/0016 |

OTHER PUBLICATIONS

Alcatel-Lucent, Alcatel-Lucent Shanghai Bell, Broadcom Corporation, "Updates to section 7.3.2 to align with PCC", S2-143895, SA WG2 Meeting #106, Nov. 17-21, 2014, San Francisco, US.

Apple Inc., "Control Plane signalling solution for S2b", S2-144200, SA WG2 Meeting #106, Nov. 17-21, 2014, San Francisco, California, USA.

BlackBerry UK Ltd., Motorola Mobility, Broadcom Corporation, Intel, IP flow mobility using the IFMP protocol, 3GPP SA WG2 Meeting #107, Jan. 26-30, 2015, Sorrento, Italy.

CATT, "Network initiated NB-IFOM for S2a", S2-142597, SA WG2 Meeting #104, Jul. 7-11, 2014, Dublin, Ireland.

Lte, "3rd Generation Partnership Project; Technical Specification Group Services and System Aspects; Network based IP flow mobility (Release 13)", Technical Report, 3GPP TR 23.861 V2.0.0 (Jun. 2015).

Qualcomm Incorporated, "UE-initiated S2a NB_IFOM", S2-142677, SA WG2 Meeting #104, Jul. 7-11, 2014, Dublin. Ireland.

Samsung, "NBIFOM solution for operation mode", TD S2-143791, 3GPP TSG SA WG2 Meeting #105, Sapporo, Japan, Oct. 13-17, 2014.

Samsung, Hitachi, "Discussion: Emergency Call when maximum number of EPS bearers not yet known at the UE", C1-130238, 3GPP TSG CT WG1 Meeting #82, San Jose del Cabo, Mexico, Jan. 28 Feb. 1, 2013.

ZTE, "Merged proposal for IP flow mobility solutions for S2b (GTP)—UE-initiated and Network-initiated IP flow mobility", S2-150536, SA WG2 Meeting #107, Jan. 26-30, 2015, Sorrento, Italy.

International Preliminary Report on Patentability and the English translation of the Written Opinion of the International Searching Authority (Forms PCT/IB/338, PCT/IB/373 and PCT/ISA/237), dated Oct. 19, 2017, for International Application No. PCT/JP2016/061299.

3GPP SA WG2 Meeting #107, S2-150528 (revision of S2-150503), Sorrento, Italy, "IP flow mobility using hte IFMP protocol", Jan. 26-30, 2015 (10 pages).

SA WG2 Meeting #106, S2-144200 (revision of S2-14xxxx), "Control Plane signalling solution for S2b", Nov. 17-21, 2014, San Francisco, California (10 pages).

* cited by examiner

| TWAG ID | NBIFOM capability |

FIG. 4A

| PGW ID 1 | NBIFOM capability |
| PGW ID 2 | NBIFOM capability |

FIG. 4B

| UE NBIFOM capability |
| NBIFOM allowed |

FIG. 4C

| PDN connection ID |
| Network allowed mode |
| Operation mode |
| User Plane Connection ID |
| TWAG MAC address |
| NBIFOM permission |

FIG. 4D

| TRANSFER PATH IDENTIFICATION INFORMATION |
| Routing rule |

FIG. 4E

| MME ID | NBIFOM capability |

FIG. 4F

| SGW ID | NBIFOM capability |

FIG. 4G

| |
|---|
| IMSI |
| MSISDN |
| IMEI / IMEISV |
| Access Restriction |
| UE NBIFOM capability |

FIG. 6A

| |
|---|
| Context ID |
| PDN Address |
| PDN Type |
| Access Point Name (APN) |
| WLAN offload ability |
| PDN GW ID |
| NBIFOM permission |

FIG. 6B

| IMSI |
|---|
| EMM State |
| GUTI |
| ME Identity |
| UE NBIFOM capability |

FIG. 8A

| PDN connection Id |
|---|
| APN in Use |
| IP Address |
| Default Bearer |
| WLAN offload ability |
| UE allowed mode |
| Operation mode |

FIG. 8B

| TRANSFER PATH IDENTIFICATION INFORMATION |
|---|
| routing rule |

FIG. 8C

| TWAG ID | NBIFOM capability |
|---|---|

FIG. 8D

| PGW ID 1 | NBIFOM capability |
|---|---|
| PGW ID 2 | NBIFOM capability |

FIG. 8E

| MME ID | NBIFOM capability |
|---|---|

FIG. 8F

| SGW ID | NBIFOM capability |
|---|---|

FIG. 8G

| IMSI |
| ME Identity |
| MSISDN |
| UE NBIFOM capability |

FIG. 10A

| IP Address |
| PDN type |
| APN |
| Network allowed mode |
| Operation mode |

FIG. 10B

| TRANSFER PATH IDENTIFICATION INFORMATION |
| routing rule |

FIG. 10C

| TWAG ID | NBIFOM capability |

FIG. 10D

| PGW ID 1 | NBIFOM capability |
| PGW ID 2 | NBIFOM capability |

FIG. 10E

| MME ID | NBIFOM capability |

FIG. 10F

| SGW ID | NBIFOM capability |

FIG. 10G

| Subscriber ID |
| UE NBIFOM capability |

FIG. 12A

| APN |
| Operation mode |
| Network Policy |
| Charging rule |
| PCC rule |
| QoS rule |

FIG. 12B

| routing rule |

FIG. 12C

| TWAG ID | NBIFOM capability |

FIG. 12D

| PGW ID 1 | NBIFOM capability |
| PGW ID 2 | NBIFOM capability |

FIG. 12E

| MME ID | NBIFOM capability |

FIG. 12F

| SGW ID | NBIFOM capability |

FIG. 12G

UE AND MME FOR DETERMINING NBIFOM MODE

TECHNICAL FIELD

The present invention relates to a terminal device and the like.

BACKGROUND ART

The 3rd Generation Partnership Project (3GPP), which undertakes activities for standardizing recent mobile communication systems, is in the process of creating specifications for the Evolved Packet System (EPS), which realizes an all-IP architecture (see NPL 1). The EPS is a mobile communication system through which mobile operators and the like provide mobile telephone services, and is structured to include a core network called the Evolved Packet Core (EPC), an access network based on the radio communication standard called the Long Term Evolution (LTE), and the like.

Furthermore, in the process of creating specifications for the EPS by the 3GPP, the Network-based IP Flow Mobility (NBIFOM) has been discussed (see NPL 1). The NBIFOM is a technical item that allows one device to simultaneously utilize a 3GPP interface and an interface other than the 3GPP interface (for example, WLAN).

In the related art, one PDN connection accommodates a communication path, a bearer, or a transfer path through either a 3GPP access network (for example, LTE access network) or a non-3GPP access network (for example, WLAN access network).

With the NBIFOM, a state can be maintained in which one PDN connection simultaneously accommodates a bearer, a communication path, or a transfer path through the 3GPP access network and a bearer, a communication path, or a transfer path through the non-3GPP access network. Such a PDN connection is defined as a multi-access PDN connection.

It has also been discussed for the NBIFOM to provide an operation mode indicating an endpoint node that is capable of initiating switching of a communication path. Specifically, it has been discussed to classify operation modes into a UE-Initiated mode and a Network-Initiated mode.

A terminal device and each device included in a core network and an access network are capable of transmitting/receiving data on a communication path through an appropriate access network for each application by using NBIFOM functionality.

Furthermore, an endpoint node configured to initiate switching a flow of the multi-access PDN connection established by using the NBIFOM functionality can be configured based on the operation mode.

CITATION LIST

Non Patent Literature

NPL 1: 3GPP TR 23.861 Technical Specification Group Services and System Aspects, Network based IP flow mobility (Release 13)

SUMMARY OF INVENTION

Technical Problem

For the NBIFOM, a detailed procedure for establishing a multi-access PDN connection has not been stipulated. Specifically, details of successful procedures and failure procedures in the multi-access PDN connectivity establishment procedure have not been provided.

More specifically, details of accept means and reject procedures from a network for a request of establishing the multi-access PDN connection in which a terminal device supports NBIFOM functionality, have not been clarified.

In light of the foregoing, an object of the present invention is to provide a suitable way of implementing a communication control procedure in response to a PDN connectivity establishment request from a terminal device.

Solution to Problem

A terminal device of the present invention includes an LTE interface unit configured to transmit a Packet Data Network (PDN) connectivity request message to a Mobility Management Entity (MME), in order to establish a PDN connection, and receive an Activate default EPS bearer context request message from the MME. The PDN connectivity request message includes first information indicating a requested Network-based IP Flow Mobility (NBIFOM) mode. The Activate default EPS bearer context request message is a response message to the PDN connectivity request message, and includes second information indicating an NBIFOM mode.

A Mobility Management Entity (MME) of the present invention includes an IP mobile communication network interface unit configured to receive a Packet Data Network (PDN) connectivity request message from a terminal device and transmit an Activate default EPS bearer context request message to the terminal device. The PDN connectivity request message includes first information indicating a requested Network-based IP Flow Mobility (NBIFOM) mode. The Activate default EPS bearer context request message is a response message to the PDN connectivity request message, and includes second information indicating an NBIFOM mode.

A PDN Gateway (PGW) of the present invention includes an IP mobile communication network interface unit configured to receive a Create Session Request message from a Serving Gateway (SGW) and transmit a Create Session Response message to the SGW. The Create Session Request message includes first information indicating a Network-based IP Flow Mobility (NBIFOM) mode, and the Create Session Response message is a response message to the Create Session Request message, and includes second information indicating an NBIFOM mode.

Advantageous Effects of Invention

The present invention enables a communication control procedure in response to a multi-access PDN connectivity establishment request from a terminal device to be implemented.

Specifically, according to the present invention, successful procedures for establishing a multi-access PDN connection and/or failure procedures for establishing the multi-access PDN connection can be supported.

BRIEF DESCRIPTION OF DRAWINGS

FIGS. 2A and 2B are diagrams illustrating a configuration of an IP mobile communication network, and the like.

FIGS. 4A to 4G are diagrams illustrating a configuration of a storage of the TWAG.

FIGS. 6A and 6B are diagrams illustrating a configuration of a storage of the HSS.

FIGS. 8A to 8G are diagrams illustrating a configuration of a storage of the UE.

FIGS. 10A to 10G are diagrams illustrating a configuration of a storage of the PGW.

FIGS. 12A to 12G are diagrams illustrating a configuration of a storage of the PCRF 60.

DESCRIPTION OF EMBODIMENTS

1. First Embodiment

Hereinafter, a radio communication technology according to an embodiment of the present invention will be described in detail with reference to the drawings.

1.1. System Overview

Figure 1:
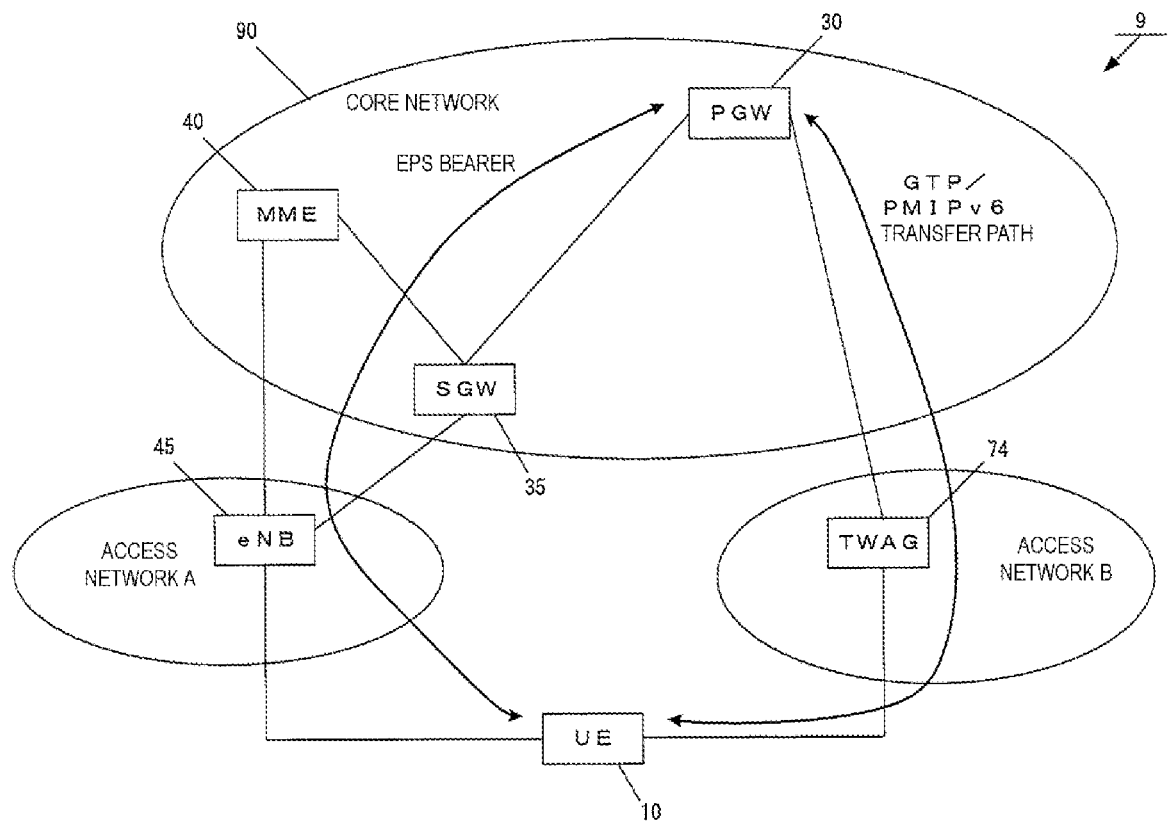
FIG. 1 is a diagram illustrating an overview of a mobile communication system.

FIG. 1 is a diagram illustrating an overview of a mobile communication system according to the present embodiment. As illustrated in FIG. 1, a mobile communication system 9 is constituted of a mobile terminal device UE 10, an LTE base station eNB 45 included in an access network A, a Trusted WLAN Access Gateway 74 (gateway TWAG) 74 included in an access network B, a Mobility Management Entity (MME) 40 included in a core network 90, a Serving Gateway (SGW) 35, and a PDN Gateway (PGW) 30.

Here, the UE 10 may be any mobile terminal device, and may be a User equipment (UE) 10, a Mobile equipment (ME), or a Mobile Station (MS).

Furthermore, the access network A may be an LTE access network, and the eNB 45 included in the access network A may be an LTE radio base station. Note that the access network A may include multiple radio base stations.

Furthermore, the access network B may be a WLAN access network. The TWAG 74 may be a gateway that connects to the PGW 30 in the core network 90 to connect the core network 90 and the WLAN access network.

In the present embodiment, the UE 10 can establish a PDN connection using an EPS bearer through the access network A.

Furthermore, the UE 10 can establish a PDN connection using a GTP/PMIPv6 transfer path between the PGW 30 and the UE 10. Note that the transfer path may be a bearer.

Here, the core network 90 refers to an IP mobile communication network run by a mobile operator.

For example, the core network 90 may be a core network 90 for the mobile operator that runs and manages the mobile communication system 9, or may be a core network 90 for a virtual mobile operator such as a Mobile Virtual Network Operator (MVNO).

The MME 40 is a control device configured to perform, through the access network A, location management and access control for the UE 10. Details of the MME 40 will be described later.

Furthermore, the SGW 35 is a gateway device between the core network 90 and the access network A, and is configured to transfer user data between the UE 10 and the PGW 30.

The PGW 30 is a gateway device of a packet data service network (Packet Data Network (PDN)) that provides a communication service to the UE 10.

In the present embodiment, the UE 10 can establish a first PDN connection and/or a second PDN connection.

Furthermore, in the present embodiment, an NBIFOM is a technique that enables establishment of a multi-access PDN connection.

Furthermore, in the present embodiment, the multi-access PDN connection refers to a PDN connection capable of accommodating, in one PDN connection, a transfer path and/or a bearer over 3GPP access and/or WLAN access. In other words, the multi-access PDN connection can accommodate both a transfer path through the 3GPP access and a transfer path through the WLAN access. Note that the multi-access PDN connection may be a PDN connection accommodating only a bearer through the 3GPP access or may be a PDN connection accommodating only a transfer path through the WLAN access. In other words, the multi-access PDN connection is a PDN connection capable of establishing one or multiple transfer paths.

Furthermore, in a case that the multi-access PDN connection is constituted of multiple transfer paths, each of the transfer paths can utilize the same IP address. That is, each of the communication paths is associated with a multi-access PDN connection flow, and thus, the communication paths can be switched for each flow.

In the present embodiment, to clearly distinguish from a PDN connection established based on an IP Flow Mobility (IFOM), a PDN connection in which a transfer path of a specific flow can be selected based on the NBIFOM is defined as a "multi-access PDN connection."

Note that the IFOM is a technique for switching a communication path of a specific IP flow by using a Dual Stack Mobile IPv6 (DSMIPv6) protocol, and in the present embodiment, a PDN connection capable of switching, based on the IFOM, a communication path of a specific IP flow is described as a PDN connection for the IFOM.

Furthermore, the first PDN connection may be the above-described multi-access PDN connection.

In detail, the first PDN connection is a PDN connection in which, as one PDN connection, a communication path EPS bearer through the access network A and a communication path constituted of a GTP/PMIPv6 tunnel through the access network B can be used. That is, this PDN connection can transmit/receive data through the 3GPP access, the WLAN access, or both thereof. The first PDN connection may be the multi-access PDN connection.

Furthermore, the second PDN connection may be the PDN connection of the related art, rather than the multi-access PDN connection. Note that the second PDN connection may be a single-access PDN connection.

Here, the "single-access PDN connection" refers to one PDN connection constituting only a transfer path of either the 3GPP access or the WLAN access, unlike the multi-access PDN connection. In detail, the single-access PDN connection is a PDN connection established by the Attach of the related art.

That is, the second PDN connection is a PDN connection constituted of the EPS bearer through the access network A or a PDN connection constituted of the GTP/PMIPv6 transfer path through the access network B. The second PDN connection accommodates a transfer path and/or a communication path through either one of the access networks. As described above, the single-access PDN connection refers to a PDN connection that is different from the multi-access PDN connection or the PDN connection for the IFOM. Moreover, the single-access PDN connection refers to a PDN connection that is also different from a PDN connection for a Local IP Access (LIPA). Here, the LIPA refers to communication control for performing offload to a home network. More specifically, the base station to which the terminal device connects performs the offload by transmitting, to a home network to which the base station connects, user data that is delivered to the core network 90 in the related art. The PDN connection for the LIPA is a PDN connection for such communication based on the LIPA.

Figure 2A:
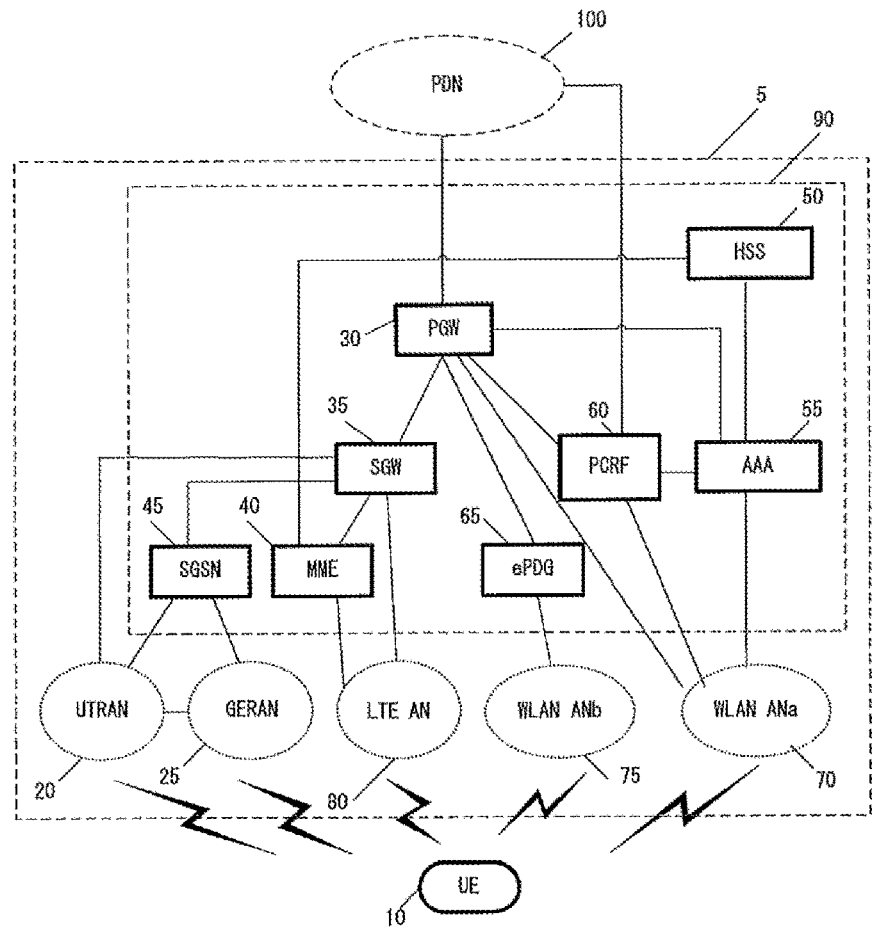

Next, an example of a configuration of the core network 90 will be described. FIG. 2A illustrates an example of a configuration of the IP mobile communication network. As illustrated in FIG. 2A, the core network 90 is constituted of a Home Subscriber Server (HSS) 50, an Authentication, Authorization, Accounting (AAA) 55, a Policy and Charging Rules Function (PCRF) 60, the PGW 30, an enhanced Packet Data Gateway (ePDG) 65, the SGW 35, the MME 40, and a Serving GPRS Support Node (SGSN) 45.

Furthermore, the core network 90 can connect to multiple radio access networks (the LTE AN 80, the WLAN ANb 75, the WLAN ANa 70, the UTRAN 20, and the GERAN 25). Such a radio access network may be constituted of connections to multiple different access networks, or may be constituted of a connection to any one of the access networks. Moreover, the UE 10 can wirelessly connect to the radio access network.

Moreover, the WLAN access network b (WLAN ANb 75) that connects to the core network 90 via the ePDG 65 and the WLAN access network a (WLAN ANa 75) that connects to the PGW 30, the PCRF 60, and the AAA 55 can be constituted as the access network connectable in the WLAN access system.

Note that each device has a similar constitution to those of the devices of the related art in a mobile communication system using EPS, and thus detailed descriptions thereof will be omitted. Each device will be described briefly hereinafter.

The PGW 30 is connected to the PDN 100, the SGW 35, the ePDG 65, the WLAN ANa 70, the PCRF 60, and the AAA 55 and is a relay device configured to transfer user data by functioning as a gateway device between the PDN 100 and the core network 90.

The SGW 35 is connected to the PGW 30, the MME 40, the LTE AN 80, the SGSN 45, and the UTRAN 20 and is a relay device configured to transfer user data by functioning as a gateway device between the core network 90 and the 3GPP access network (the UTRAN 20, the GERAN 25, and the LTE AN 80).

The MME 40 is connected to the SGW 35, the LTE AN 80, and the HSS 50 and is an access control device configured to perform location information management and access control for the UE 10 via the LTE AN 80. Furthermore, the core network 90 may include multiple location management devices. For example, a location management device different from the MME 40 may be constituted. As with the MME 40, the location management device different from the MME 40 may be connected to the SGW 35, the LTE AN 80, and the HSS 50.

Furthermore, in a case that multiple MMEs 40 are included in the core network 90, the MMEs 40 may be connected to each other. With this configuration, the context of the UE 10 may be transmitted/received between the MMEs 40.

The HSS 50 is connected to the MME 40 and the AAA 55 and is a managing node configured to manage subscriber information. The subscriber information in the HSS 50 is referenced during access control of the MME 40, for example. Moreover, the HSS 50 may be connected to a location management device different from the MME 40.

The AAA 55 is connected to the PGW 30, the HSS 50, the PCRF 60, and the WLAN ANa 70, and is configured to perform access control for the UE 10 connected to the AAA 55 via the WLAN ANa 70.

The PCRF 60 is connected to the PGW 30, the WLAN ANa 75, the AAA 55, and the PDN 100 and is configured to perform QoS management on data delivery. For example, the PCRF 60 manages QoS of a communication path between the UE 10 and the PDN 100.

The ePDG 65 is connected to the PGW 30 and the WLAN ANb 75 and is configured to deliver user data by functioning as a gateway device between the core network 90 and the WLAN ANb 75.

The SGSN 45 is connected to the UTRAN 20, the GERAN 25, and the SGW 35 and is a control device for location management between a 3G/2G access network (UTRAN/GERAN) and the LTE access network (E-UTRAN). In addition, the SGSN 45 has the functions of: selecting the PGW 30 and the SGW 35; managing a time zone of the UE 10; and selecting the MME 40 at the time of handover to the E-UTRAN.

Figure 2B:
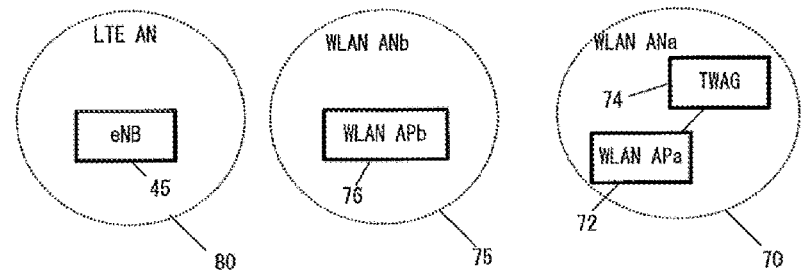
Figure 2B:
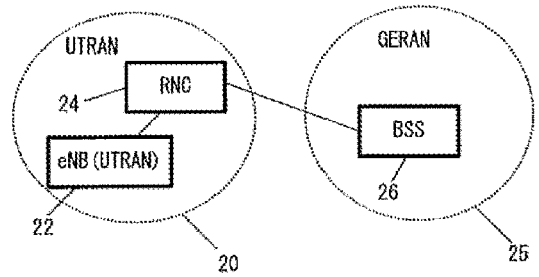

Also, as illustrated in FIG. 2B, each radio access network includes devices to which the UE 10 is actually connected (for example, a base station device and an access point device), and the like. The devices used in these connections are assumed to adapt to the radio access networks.

In the present embodiment, the LTE AN 80 includes the eNB 45. The eNB 45 is a radio base station to which the UE 10 connects in the LTE access system, and the LTE AN 80 may include one or multiple radio base stations.

The WLAN ANa 70 includes the WLAN APa 72 and the TWAG 74. The WLAN APa 72 is a radio base station to which the UE 10 connects in the WLAN access system trusted by the operator running the core network 90, and the WLAN ANa 70 may include one or multiple radio base stations. The TWAG 74 is a gateway device between the core network 90 and the WLAN ANa 70. Furthermore, the WLAN APa 72 and the TWAG 74 may be constituted as a single device.

Even in a case where the operator running the core network 90 and the operator running the WLAN ANa 70 are different, such a constitution can be implemented through a contract or agreement between the operators.

Furthermore, the WLAN ANb 75 includes the WLAN APb 76. The WLAN APb 76 is a radio base station to which the UE 10 connects in the WLAN access system in a case where no trusting relationship is established with the operator running the core network 90, and the WLAN ANb 75 may include one or multiple radio base stations.

In this manner, the WLAN ANb 75 is connected to the core network 90 via the ePDG 65 serving as a gateway. The ePDG 65 is a device included in the core network 90 and having security functionality for ensuring security.

The UTRAN 20 includes the Radio Network Controller (RNC) 24 and the eNB (UTRAN) 22. The eNB (UTRAN) 22 is a radio base station to which the UE 10 connects through a UMTS Terrestrial Radio Access (UTRA), and the UTRAN 20 may include one or multiple radio base stations. Furthermore, the RNC 24 is a control unit configured to connect the core network 90 and the eNB (UTRAN) 22, and the UTRAN 20 may include one or multiple RNCs. Moreover, the RNC 24 may be connected to one or multiple eNBs (UTRANs) 22. In addition, the RNC 24 may be connected to a radio base station (Base Station Subsystem (BSS) 26) included in the GERAN 25.

The GERAN 25 includes the BSS 26. The BSS 26 is a radio base station to which the UE 10 connects through a GSM/EDGE Radio Access (GERA), and the GERAN 25 may be constituted of one or multiple radio base station BSSs. Furthermore, multiple BSSs 26 may be connected to each other. Moreover, the BSS 26 may be connected to the RNC 24. Note that in the present specification, the UE 10 being connected to each radio access network refers to the UE 10 being connected to a base station device, an access point, or the like included in each radio access network, and data, signals, and the like being transmitted/received also pass through those base station devices, access points, or the like.

1.2. Device Constitution

The constitution of each device will be described below.

1.2.1. TWAG Constitution

Figure 3:
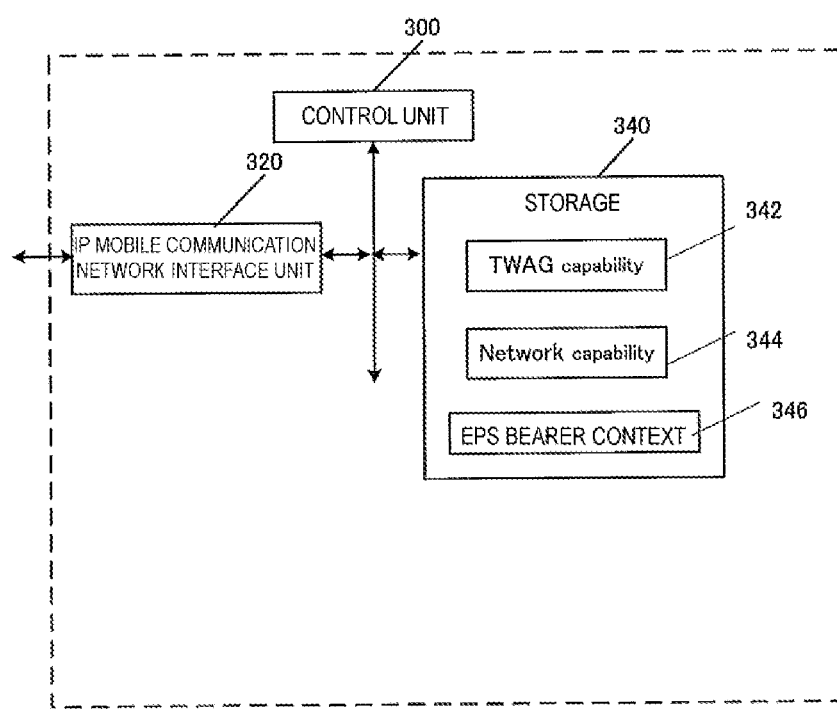
FIG. 3 is a diagram illustrating a functional configuration of a TWAG.

FIG. 3 illustrates a device constitution of the TWAG 74. As illustrated in FIG. 3, the TWAG 74 is constituted of an IP mobile communication network interface unit 320, a control unit 300, and a storage 340. The IP mobile communication network interface unit 320 and the storage 340 are connected to the control unit 300 via a bus.

The control unit 300 is a function unit for controlling the TWAG 74. The control unit 300 implements various processes by reading out and executing various programs stored in the storage 340.

The IP mobile communication network interface unit 320 is a function unit through which the TWAG 74 connects to the PGW 30.

The storage 340 is a function unit for storing programs, data, and the like necessary for each operation of the TWAG 74. The storage 340 is constituted of, for example, a semiconductor memory, a Hard Disk Drive (HDD), or the like.

As illustrated in FIG. 3, the storage 340 stores a TWAG capability 342, a Network capability 344, and an EPS bearer context 346. Hereinafter, information elements stored in the storage 340 will be described.

FIGS. 4A to 4G illustrate the information elements stored in the storage 340. FIG. 4A illustrates an example of the TWAG capability stored by the TWAG 74. In the TWAG capability, identification information (NBIFOM capability) is stored for each TWAG 74, the identification information indicating whether or not the capability of establishing the first PDN connection is supported. In other words, the identification information indicates whether or not the TWAG 74 supports NBIFOM functionality. Specifically, the NBIFOM capability may include "allowed" or "Not allowed".

Note that the NBIFOM functionality may be information indicating the possession of functionality for establishing the multi-access PDN connection.

Alternatively, the NBIFOM capability may be identification information indicating the possession of capability of establishing the first PDN connection. That is, the existence of the NBIFOM capability in the storage may mean that the TWAG 74 is a gateway having functionality for establishing the first PDN connection. In other words, the existence of the NBIFOM capability in the storage may mean that the TWAG 74 is a gateway supporting the NBIFOM functionality.

As illustrated in FIG. 4A, the NBIFOM capability may be stored being associated with a TWAG ID that is the identification information of the TWAG 74. In a case that the NBIFOM capability is not associated with the TWAG ID, the NBIFOM capability may refer to the capability of the TWAG 74 to be stored.

In a case that the TWAG ID and the NBIFOM capability are stored being associated with each other, the TWAG 74 may store TWAG capabilities of multiple TWAGs 74.

In this case, when the UE 10 performs handover to another TWAG 74, the TWAG 74 may select a TWAG 74 to which the handover is made, based on the TWAG capability.

Next, the Network capability 344 will be described. FIG. 4B illustrates an example of the Network capability stored by the TWAG 74. In the Network capability, the NBIFOM capability is stored for each network, i.e., for each PGW 30.

Here, the NBIFOM capability is identification information on each network indicating whether or not the capability of establishing the first PDN connection is supported. In other words, the identification information indicates whether or not the PGW 30 supports the NBIFOM functionality. More specifically, for example, the NBIFOM capability may include "allowed" or "Not allowed."

Note that the NBIFOM functionality may be information indicating the possession of functionality for establishing the multi-access PDN connection.

Alternatively, the NBIFOM capability may be identification information indicating the possession of capability of establishing the first PDN connection. In other words, the NBIFOM capability may be identification information indicating that it is a gateway supporting the NBIFOM functionality. That is, the existence of the NBIFOM capability in the storage may mean that the PGW 30 is a gateway having functionality for establishing the first PDN connection. In other words, the existence of the NBIFOM capability in the storage may mean that the PGW 30 is a gateway supporting the NBIFOM functionality.

As illustrated in FIG. 4B, the TWAG 74 stores the NBIFOM capability associated with the PGW ID. Furthermore, as illustrated in FIG. 4B, the NBIFOM capability may be stored being associated with each of the multiple PGWs 30.

The PGW ID may be any information for identifying the PGW 30, and may be an Access Point Name (APN), for example.

Next, the EPS bearer context will be described. The EPS bearer context may be classified into an EPS bearer context for each UE 10 stored for each UE 10, an EPS bearer context for each PDN connection, and an EPS bearer context for each bearer and/or transfer path.

FIG. 4C illustrates information elements included in the EPS bearer context for each UE 10. As is obvious from FIG.

4C, the TWAG 74 stores, for each UE 10, a UE NBIFOM capability and an NBIFOM allowed.

The UE NBIFOM capability is the NBIFOM capability of the UE 10. The UE NBIFOM capability is identification information on each UE 10 indicating whether or not the capability of establishing the first PDN connection is supported. In other words, the UE NBIFOM capability is identification information indicating whether or not the UE 10 supports the NBIFOM functionality. More specifically, for example, the UE NBIFOM capability may include "allowed" or "Not allowed."

Note that the NBIFOM functionality may be information indicating the possession of functionality for establishing the multi-access PDN connection.

Alternatively, the UE NBIFOM capability may be identification information indicating that the UE 10 has the capability of establishing the first PDN connection. That is, the existence of the UE NBIFOM capability may mean that the UE 10 has functionality for establishing the first PDN connection.

In other words, the UE NBIFOM capability may be identification information indicating that the UE 10 supports the NBIFOM functionality. That is, the existence of the UE NBIFOM capability in the storage may mean that the UE 10 supports the NBIFOM functionality.

Furthermore, the NBIFOM allowed is identification information indicating an APN that is allowed to establish a PDN connection using the NBIFOM. The NBIFOM may be associated with at least the APN. The NBIFOM allowed may be associated with multiple APNs.

In the present embodiment, the APN 1 is associated with the NBIFOM allowed. That is, the APN 1 is allowed to establish the multi-access PDN connection. In other words, in the present embodiment, the UE 10 is allowed to establish the multi-access PDN connection by using the APN 1. Note that the APN 1 is also allowed to establish the PDN connection of the related art, rather than the multi-access PDN connection.

In addition, in the present embodiment, the APN 2 is not associated with the NBIFOM allowed. That is, in the present embodiment, the APN 2 is not allowed to establish the multi-access PDN connection. That is, in the present embodiment, the UE 10 cannot establish the multi-access PDN connection by using the APN 2.

The NBIFOM allowed may be stored before the PDN connection is established.

The TWAG 74 may access the HSS 50 to acquire the NBIFOM allowed before the PDN connection is established and/or during the establishment procedure.

Furthermore, the EPS bearer context for each UE 10 may include identification information on the UE 10. The identification information on the UE 10 may be an IMSI.

Furthermore, FIG. 4D illustrates the EPS bearer context for each PDN connection. The EPS bearer context for each PDN connection includes a PDN connection ID, a Network allowed mode, an Operation mode, a User plane connection ID, a TWAG MAC address, and an NBIFOM Permission.

The PDN connection ID is identification information for identifying a PDN connection. The UE 10, the TWAG 74, and the PGW 30 may store the same identification information. The Operation mode is identification information on a mode that indicates which of the UE 10 and the network takes an initiative in transmitting/receiving data or is allowed to initiate communication control in a case that the PDN connection is the first PDN connection.

More specifically, for example, an Operation mode that allows the UE 10 to initiate the communication control may be a UE-Initiated mode.

Furthermore, an Operation mode that allows the network and/or the PGW 30 and/or the PCRF 60 to initiate the communication control may be a Network Initiated mode.

The Network allowed mode indicates an Operation mode allowed by the network. The Network allowed mode may include the UE Initiated mode, the Network Initiated mode, or both thereof.

The User plane connection ID is identification information for identifying a connection used for transmission of user data in a case that the UE 10 has established a transfer path via the TWAG 74.

The TWAG MAC address is a physical address of the TWAG 74.

The NBIFOM permission is information indicating that this PDN connection has established the multi-access PDN connection. In other words, the NBIFOM permission indicates that the first PDN connection has been established.

That is, the fact that the TWAG 74 has stored the NBIFOM permission means that this PDN connection is the first PDN connection.

The NBIFOM permission is identification information that is stored by the TWAG 74 upon the PDN connection being established.

The TWAG 74 may access the HSS 50 to acquire the NBIFOM permission during the establishment of the PDN connection. Alternatively, the TWAG 74 may store the NBIFOM permission based on the fact that the multi-access PDN connection has been established.

Next, the EPS bearer context for each bearer and/or transfer path will be described. As illustrated in FIG. 4E, the EPS bearer context for each bearer and/or transfer path may include the transfer path identification information and the Routing Rule.

The transfer path identification information is information for identifying a transfer path and/or bearer. The transfer path identification information may be an EPS bearer ID, for example.

The Routing Rule indicates an association of a Routing Filter, and a Routing address or Routing access type. Based on this association, whether using a communication path through the 3GPP access network or using a communication path through the WLAN access network is determined.

Here, the Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the TWAG 74. Alternatively, the Routing address may be an IP address of a Mobile Access Gateway (MAG).

The Routing Rule may be notified from the PGW 30 or the PCRF 60, or may be notified from the UE 10. Alternatively, the Routing Rule may be a value that the TWAG 74 prestores as a default value.

The Routing Filter may include an IP header to switch an IP flow. Alternatively, the Routing Filter may include an application ID to switch the flow for each application. Alternatively, the Routing Filter may include a TFT.

The Routing Rule may store multiple rules. Furthermore, the Routing Rule may include a priority for each rule.

The TWAG capability and the Network capability may be included in the EPS bearer context.

1.2.2. HSS Constitution

Figure 5:
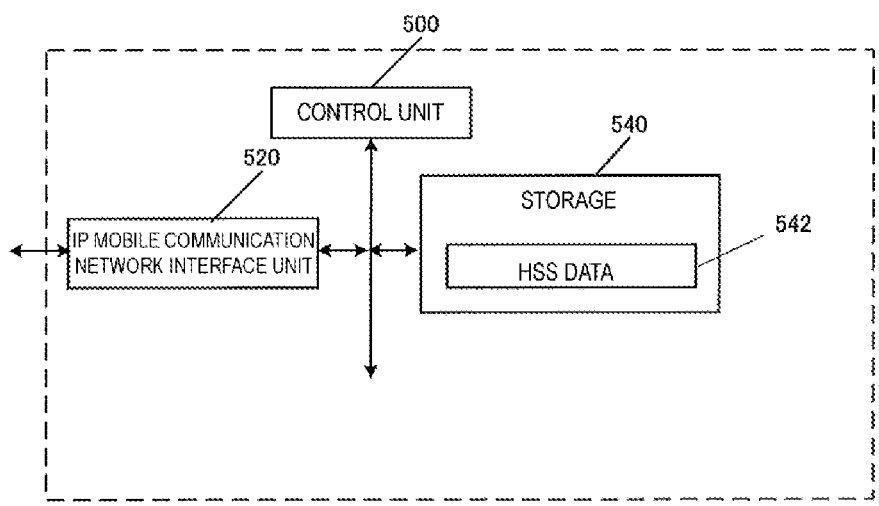
FIG. 5 is a diagram illustrating a functional configuration of an HSS.

Next, the constitution of the HSS 50 will be described. FIG. 5 illustrates a device constitution of the HSS 50. As illustrated in FIG. 5, the HSS 50 is constituted of an IP mobile communication network interface unit 520, a control unit 500, and a storage 540. The IP mobile communication network interface unit 520 and the storage 540 are connected to the control unit 500 via a bus.

The control unit 500 is a function unit for controlling the HSS 50. The control unit 500 implements various processes by reading out and executing various programs stored in the storage 540.

The IP mobile communication network interface unit 520 is a function unit through which the HSS 50 connects to the MME 40 and/or another MME 40, and the AAA 55.

The storage 540 is a function unit for storing programs, data, and the like necessary for each operation of the HSS 50. The storage 540 is constituted of, for example, a semiconductor memory, a Hard Disk Drive (HDD), or the like.

As illustrated in FIG. 5, the storage 540 stores HSS data 542. Hereinafter, information elements stored in the storage 540 will be described.

FIGS. 6A and 6B illustrate the information elements stored in the storage 540. FIG. 6A illustrates an example of HSS data for each UE 10 stored by the HSS 50.

As is obvious from FIG. 6A, the HSS data for each UE 10 includes an IMSI, an MSISDN, an IMEI/IMEISV, an Access Restriction, a UE NBIFOM capability, and an NBIFOM allowed.

The IMSI is identification information assigned to a user (subscriber) using the UE 10. The MSISDN represents the phone number of the UE 10.

The IMEI/IMISV is identification information assigned to the UE 10.

The Access Restriction indicates registration information for access restriction.

The UE NBIFOM capability is the NBIFOM capability of the UE 10. The UE NBIFOM capability is identification information on each UE 10 indicating whether or not the capability of establishing the first PDN connection is supported. In other words, the UE NBIFOM capability indicates whether or not the UE 10 supports the NBIFOM functionality. More specifically, for example, the NBIFOM capability may include "allowed" or "Not allowed."

Alternatively, the UE NBIFOM capability may be identification information indicating that the UE 10 has the capability of establishing the first PDN connection. That is, the existence of the UE NBIFOM capability may mean that the UE 10 has functionality for establishing the first PDN connection.

Furthermore, the NBIFOM allowed is identification information indicating an APN that is allowed to establish a PDN connection using the NBIFOM. The NBIFOM may be associated with at least the APN. The NBIFOM allowed may be associated with multiple APNs.

In the present embodiment, the APN 1 is associated with the NBIFOM allowed. That is, the APN 1 is allowed to establish the multi-access PDN connection. In other words, in the present embodiment, the UE 10 is allowed to establish the multi-access PDN connection by using the APN 1. Note that the APN 1 is also allowed to establish the PDN connection of the related art, rather than the multi-access PDN connection.

In addition, in the present embodiment, the APN 2 is not associated with the NBIFOM allowed. That is, in the present embodiment, the APN 2 is not allowed to establish the multi-access PDN connection. That is, in the present embodiment, the UE 10 cannot establish the multi-access PDN connection by using the APN 2.

The NBIFOM allowed may be stored before the PDN connection is established.

FIG. 6B illustrates an example of HSS data for each PDN connection stored by the HSS 50. As is obvious from FIG. 6B, the HSS data for each PDN connection includes at least a Context ID, a PDN address, a PDN Type, an Access Point Name (APN), a WLAN offload ability, a PDN GW ID, and an NBIFOM Permission.

The Context ID is identification information on the context storing the HSS data for each PDN connection.

The PDN Address represents a registered IP address. The PDN Address is an IP address of the UE 10.

The PDN Type indicates the type of PDN Address. That is, the PDN Type is identification information for identifying IPv4, IPv6, or IPv4v6, for example.

The APN is a label indicating an access destination in the network, in accordance with DNS naming convention. The WLAN offload ability is identification information indicating whether traffic connected through this APN can perform offload to the WLAN or maintains the 3GPP connection by utilizing a cooperative function between the WLAN and the 3GPP. The WLAN offload ability may vary for each RAT type. Specifically, the LTE (E-UTRA) and the 3G (UTRA) may have different WLAN offload abilities.

The PDN GW identity is identification information for identifying the PGW 30 utilized in this APN. This identification information may be a Fully Qualified Domain Name (FQDN) or an IP address.

The NBIFOM permission is information indicating that this PDN connection has established the multi-access PDN connection. In other words, the NBIFOM permission indicates that the first PDN connection has been established. That is, the fact that the TWAG 74 has stored the NBIFOM permission means that this PDN connection is the first PDN connection.

The NBIFOM permission is identification information that is stored by the TWAG 74 upon the PDN connection being established.

Specifically, for example, the HSS data for each PDN connection including the APN 1 may include the NBIFOM Permission, and the HSS data for each PDN connection including the APN 2 need not include the NBIFOM permission.

In other words, the PDN connection with the APN 1 may be the first PDN connection, and the PDN connection with the APN 2 must not be the first PDN connection.

1.2.3. UE Constitution

Figure 7:
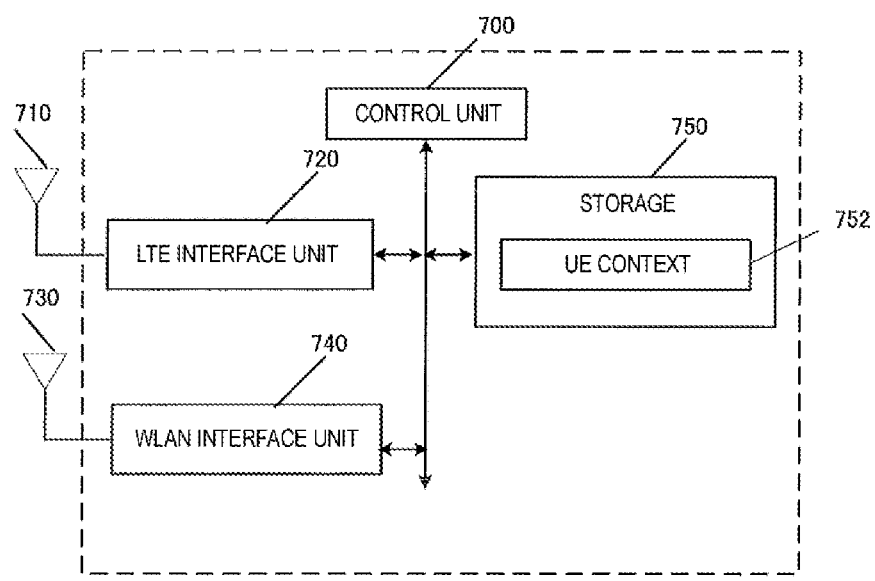
FIG. 7 is a diagram illustrating a functional configuration of a UE.

Next, the constitution of the UE 10 will be described. FIG. 7 illustrates a device constitution of the UE 10. As illustrated in FIG. 7, the UE 10 is constituted of an LTE interface unit 720, a WLAN interface unit 740, a control unit 700, and a storage 750.

The LTE interface unit 720, the WLAN interface unit 740, and the storage 750 are connected to the control unit 700 via a bus.

The control unit 700 is a function unit for controlling the UE 10. The control unit 700 implements various processes by reading out and executing various programs stored in the storage 750.

The LTE interface unit 720 is a function unit through which the UE 10 connects to an IP access network via an LTE base station. Furthermore, an external antenna 710 is connected to the LTE interface unit 720.

The WLAN interface unit 740 is a function unit through which the UE 10 connects to the IP access network via a WLAN AP. Furthermore, an external antenna 730 is connected to the WLAN interface unit 740.

The control unit 700 is a function unit for controlling the UE 10. The control unit 700 implements various processes by reading out and executing various programs stored in the storage 750.

The storage 750 is a function unit for storing programs, data, and the like necessary for each operation of the UE 10. The storage 750 is constituted of, for example, a semiconductor memory, a Hard Disk Drive (HDD), or the like.

As illustrated in FIG. 7, the storage 750 stores a UE context 752. Hereinafter, information elements stored in the storage 750 will be described. Note that the UE context 752 is classified into a UE context for each UE 10, a UE context for each PDN connection, and a UE context for each transfer path and/or bearer.

FIG. 8A is an example of the UE context stored for each UE 10. As illustrated in FIG. 8A, the UE context for each UE 10 includes an IMSI, an EMM State, a GUTI, an ME Identity, and a UE NBIFOM capability.

The IMSI is identification information assigned to a user (subscriber) using the UE 10. The EMM State indicates a mobility management state of the UE 10. For example, the EMM state may be EMM-REGISTERED in which the UE 10 is registered with the network (registered state) or EMM-DEREGISTERD in which the UE 10 is not registered with the network (deregistered state).

The GUTI is an abbreviation of "Globally Unique Temporary Identity," and is temporary identification information on the UE 10. The GUTI is constituted of identification information on the MME 40 (Globally Unique MME Identifier (GUMMEI)) and identification information on the UE 10 in a specific MME 40 (M-TMSI).

The ME Identity is an ID of ME, and may be the IMEI/IMISV, for example.

The UE NBIFOM capability is the NBIFOM capability of the UE 10. The UE NBIFOM capability is identification information on each UE 10 indicating whether or not the capability of establishing the first PDN connection is supported. In other words, the UE NBIFOM capability is identification information on each UE 10 indicating whether or not the NBIFOM functionality is supported. More specifically, for example, the NBIFOM capability may include "allowed" or "Not allowed."

Note that the NBIFOM functionality may be information indicating the possession of functionality for establishing the multi-access PDN connection.

Alternatively, the UE NBIFOM capability may be identification information indicating that the UE 10 has the capability of establishing the first PDN connection. That is, the existence of the UE NBIFOM capability in the storage of the UE 10 may mean that the UE 10 has functionality for establishing the first PDN connection.

In other words, the UE NBIFOM capability may be identification information indicating that the UE 10 supports the NBIFOM functionality. That is, the existence of the UE NBIFOM capability in the storage of the UE 10 may mean that the UE 10 supports the NBIFOM functionality.

FIG. 8B illustrates an example of the UE context for each PDN connection. As illustrated in FIG. 8B, the UE context for each PDN connection includes at least a PDN connection ID, an APN in Use, an IP address, a Default Bearer, a WLAN offload ability, a UE allowed mode, and an Operation mode.

The PDN connection ID is identification information for identifying a PDN connection. The UE 10, the TWAG 74, and the PGW 30 may store the same identification information. The APN in Use is an APN utilized by the UE 10 most recently. This APN may be constituted of identification information on the network and identification information on a default operator.

The IP Address is an IP address assigned to the UE 10 through the PDN connection, and may be an IPv4 address or an IPv6 prefix.

The Default Bearer is EPS bearer identification information for identifying a default bearer in this PDN connection.

The WLAN offloadability is WLAN offload permission information indicating whether or not a communication associated with this PDN connection allows offload to the WLAN using an interworking function between the WLAN and the 3GPP, or maintains the 3GPP access.

The UE allowed mode is an operation mode allowed by the UE 10. This identification information may indicate the UE initiated mode, may indicate the Network Initiated mode, or may indicate both thereof.

The Operation mode is identification information on a mode that indicates which of the UE 10 and the network takes an initiative in transmitting/receiving data or is allowed to initiate communication control in a case that the current PDN connection is the first PDN connection.

FIG. 8C illustrates the UE context for each bearer. The UE context for each bearer includes transfer path identification information and a Routing Rule.

The transfer path identification information is information for identifying a transfer path and/or bearer. The transfer path identification information may be an EPS bearer ID, for example.

Furthermore, the transfer path identification information may be associated with the TFT.

Here, the Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the TWAG 74. Alternatively, the Routing address may be an IP address of a Mobile Access Gateway (MAG).

The Routing Rule may be notified from the PGW 30 or the PCRF 60. Alternatively, the Routing Rule may be a value that the UE 10 prestores as a default value.

The Routing Filter may include an IP header to switch an IP flow. Alternatively, the UE 10 may include an application ID in the Routing Filter to switch the flow for each application. Alternatively, the Routing Filter may include the TFT.

The Routing Rule may store multiple rules (regulations). Furthermore, the Routing Rule may include a priority for each rule.

FIG. 8D illustrates the TWAG capability. In the TWAG capability, identification information (NBIFOM capability) is stored for each TWAG 74, the identification information indicating whether or not the capability of establishing the first PDN connection is supported. In other words, the identification information indicates whether or not the TWAG 74 supports the NBIFOM functionality. Specifically, the NBIFOM capability may include "allowed" or "Not allowed."

Note that the NBIFOM functionality may be information indicating the possession of functionality for establishing the multi-access PDN connection.

Alternatively, the NBIFOM capability may be identification information indicating the possession of capability of establishing the first PDN connection. That is, the existence of the NBIFOM capability in the storage may mean that the TWAG 74 is a gateway having functionality for establishing the first PDN connection. In other words, the existence of the NBIFOM capability in the storage may mean that the TWAG 74 is a gateway supporting the NBIFOM functionality.

The UE 10 may store the NBIFOM capability associated with the TWAG ID. Furthermore, the NBIFOM capabilities of multiple TWAGs 74 may be stored.

FIG. 8E illustrates an example of the Network capability. In the Network capability, the NBIFOM capability is stored for each network, i.e., for each PGW 30.

Here, the NBIFOM capability is identification information on each network indicating whether or not the capability of establishing the first PDN connection is supported. More specifically, for example, the NBIFOM capability may include "allowed" or "Not allowed."

Alternatively, the NBIFOM capability may be identification information indicating the possession of capability of establishing the first PDN connection. That is, the existence of the NBIFOM capability may mean that the PGW 30 and/or the network is a gateway having functionality for establishing the first PDN connection.

As illustrated in FIG. 8E, the TWAG 74 stores the NBIFOM capability associated with the PGW ID. Furthermore, as illustrated in FIG. 8E, the NBIFOM capability may be stored being associated with each of the multiple PGWs 30.

The PGW ID is information for identifying the PGW 30. The PGW ID may be an APN, for example.

FIG. 8F illustrates an MME capability. The MME capability stores, for each MME 40, identification information (NBIFOM capability) indicating whether or not the capability of establishing the first PDN connection is supported. In other words, the identification information indicates whether or not the MME 40 supports the NBIFOM functionality. Specifically, the NBIFOM capability may include "allowed" or "Not allowed."

Note that the NBIFOM functionality may be information indicating the possession of functionality for establishing the multi-access PDN connection.

Alternatively, the NBIFOM capability may be identification information indicating the possession of capability of establishing the first PDN connection. That is, the existence of the NBIFOM capability in the storage may mean that the MME 40 is a gateway having functionality for establishing the first PDN connection. In other words, the existence of the NBIFOM capability in the storage may mean that the MME 40 is a gateway supporting the NBIFOM functionality.

The UE 10 may store the NBIFOM capability associated with an MME ID.

FIG. 8G illustrates an SGW capability. The SGW capability stores, for each SGW 35, identification information (NBIFOM capability) indicating whether or not the capability of establishing the first PDN connection is supported. In other words, the identification information indicates whether or not the SGW 35 supports the NBIFOM functionality. Specifically, the NBIFOM capability may include "allowed" or "Not allowed."

Note that the NBIFOM functionality may be information indicating the possession of functionality for establishing the multi-access PDN connection.

Alternatively, the NBIFOM capability may be identification information indicating the possession of capability of establishing the first PDN connection. That is, the existence of the NBIFOM capability in the storage may mean that the SGW 35 is a gateway having functionality for establishing the first PDN connection. In other words, the existence of the NBIFOM capability in the storage may mean that the SGW 35 is a gateway supporting the NBIFOM functionality.

The UE 10 may store the NBIFOM capability associated with an SGW ID.

The TWAG capability, the Network capability, the MME capability, and the SGW capability may be included in the UE context, or may be separated from the UE context.

That is, the UE 10 may store the TWAG capability and the Network capability included in the UE context, or may store the TWAG capability and the Network capability separately from the UE context.

1.2.4. PGW Components

Figure 9:
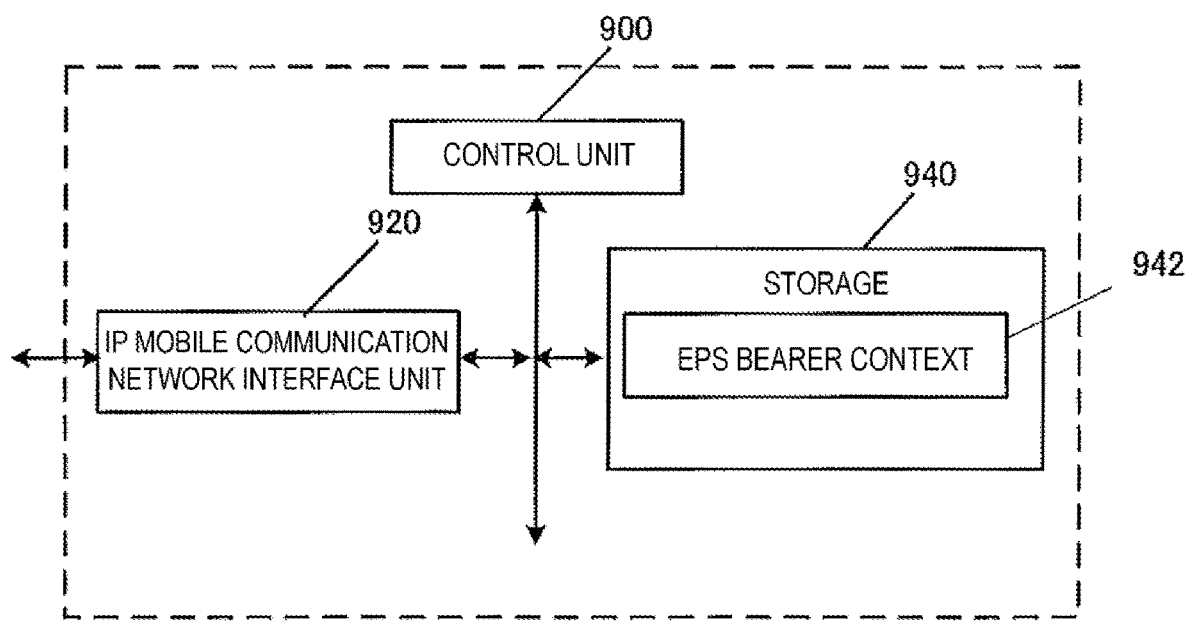
FIG. 9 is a diagram illustrating a functional configuration of a PGW.

Next, the components of the PGW 30 will be described. FIG. 9 illustrates a device constitution of the PGW 30. As illustrated in FIG. 9, the PGW 30 is constituted of an IP mobile communication network interface unit 920, a control unit 900, and a storage 940. The IP mobile communication network interface unit 920 and the storage 940 are connected to the control unit 900 via a bus.

The control unit 900 is a function unit for controlling the PGW 30. The control unit 900 implements various processes by reading out and executing various programs stored in the storage 940.

The IP mobile communication network interface unit 920 is a function unit through which the PGW 30 connects to the SGW 35 and/or the PCRF 60 and/or the ePDG 65 and/or the AAA 55 and/or the GW 74.

The storage 940 is a function unit for storing programs, data, and the like necessary for each operation of the PGW 30. The storage 940 is constituted of, for example, a semiconductor memory, a Hard Disk Drive (HDD), or the like.

As illustrated in FIG. 9, the storage 940 stores an EPS bearer context 942. Note that the EPS bearer context includes an EPS bearer context stored for each UE 10, an EPS bearer context stored for each APN, an EPS bearer context stored for each PDN connection, and an EPS bearer context stored for each transfer path and/or bearer.

First, the EPS bearer context for each UE 10 will be described. FIG. 10A illustrates an example of the EPS bearer context for each UE 10. As illustrated in FIG. 10A, the EPS bearer context includes at least an IMSI, an ME identity, an MSISDN, and a UE NBIFOM capability.

The IMSI is information for identifying a user of the UE 10.

The ME identity is an ID of ME, and may be the IMEI/IMISV, for example.

The MSISDN represents the phone number of the UE 10.

The UE NBIFOM capability is the NBIFOM capability of the UE 10. The UE NBIFOM capability is identification information on each UE 10 indicating whether or not the capability of establishing the first PDN connection is supported. More specifically, for example, the NBIFOM capability may include "allowed" or "Not allowed."

Alternatively, the UE NBIFOM capability may be identification information indicating that the UE 10 has the capability of establishing the first PDN connection. That is, the existence of the UE NBIFOM capability may mean that the UE 10 has functionality for establishing the first PDN connection.

Next, the EPS bearer context for each PDN connection will be described. FIG. 10B illustrates an example of the EPS bearer context for each PDN connection.

As illustrated in FIG. 10B, the context includes at least a PDN connection ID, an IP address, a PDN type, an APN, a Network allowed mode, and an Operation mode.

The PDN connection ID is identification information for identifying a PDN connection. The UE 10, the TWAG 74, the MME 40, and the PGW 30 may store the same identification information.

The IP Address indicates an IP address assigned to the UE 10 for this PDN connection. The IP address may be an IPv4 and/or IPv6 prefix.

The PDN type indicates the type of IP address. The PDN type indicates IPv4, IPv6 or IPv4v6, for example. The APN is a label indicating an access destination in the network, in accordance with DNS naming convention.

The Network allowed mode indicates an Operation mode allowed by the network. The Network allowed mode may include the UE Initiated mode, the Network Initiated mode, or both thereof.

The Operation mode is identification information on a mode that indicates which of the UE 10 and the network takes an initiative in transmitting/receiving data or is allowed to initiate communication control in a case that the current PDN connection is the first PDN connection.

More specifically, for example, the UE Initiated mode that allows the UE 10 to initiate the communication control or the Network Initiated mode that allows the network to initiate the communication control may be identified.

Next, an example of the EPS bearer context for each transfer path and/or bearer will be described with reference to FIG. 10C. As illustrated in FIG. 10C, the context includes at least transfer path identification information and a Routing Rule.

The transfer path identification information is information for identifying a transfer path and/or bearer. The transfer path identification information may be an EPS bearer ID, for example.

Furthermore, the transfer path identification information may be associated with the TFT.

The Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the TWAG 74. Alternatively, the Routing address may be an IP address of a Mobile Access Gateway (MAG).

The Routing Rule may be notified from the PGW 30 or the PCRF 60. Alternatively, the Routing Rule may be a value that the UE 10 prestores as a default value.

The PGW 30 may include an IP header into the Routing Filter to switch the IP flow. Alternatively, the PGW 30 may include an application ID in the Routing Filter to switch the flow for each application. Alternatively, the Routing Filter may include the TFT.

The Routing Rule may store multiple rules. Furthermore, the Routing Rule may include a priority for each rule.

FIG. 10D illustrates the TWAG capability. In the TWAG capability, identification information (NBIFOM capability) is stored for each TWAG 74, the identification information indicating whether or not the capability of establishing the first PDN connection is supported. In other words, the identification information indicates whether or not the TWAG 74 supports the NBIFOM functionality. Specifically, the NBIFOM capability may include "allowed" or "Not allowed."

Note that the NBIFOM functionality may be information indicating the possession of functionality for establishing the multi-access PDN connection.

Alternatively, the NBIFOM capability may be identification information indicating the possession of capability of establishing the first PDN connection. That is, the existence of the NBIFOM capability in the storage may mean that the TWAG 74 is a gateway having functionality for establishing the first PDN connection. In other words, the existence of the NBIFOM capability in the storage may mean that the TWAG 74 is a gateway supporting the NBIFOM functionality.

The PGW 30 may store the NBIFOM capability associated with the TWAG ID.

FIG. 10E illustrates an example of the Network capability. In the Network capability, the NBIFOM capability is stored for each network, i.e., for each PGW 30.

Here, the NBIFOM capability is identification information on each network indicating whether or not the capability of establishing the first PDN connection is supported. More specifically, for example, the NBIFOM capability may include "allowed" or "Not allowed."

Alternatively, the NBIFOM capability may be identification information indicating the possession of capability of establishing the first PDN connection. That is, the existence of the NBIFOM capability may mean that the PGW 30 and/or the network is a gateway having functionality for establishing the first PDN connection.

As illustrated in FIG. 10E, the PGW 30 stores the NBIFOM capability associated with the PGW ID. Furthermore, as illustrated in FIG. 10E, the NBIFOM capability may be stored being associated with each of the multiple PGWs 30.

The PGW ID may be any information for identifying the PGW 30, and may be an APN, for example.

FIG. 10F illustrates the MME capability. The MME capability stores, for each MME 40, identification information (NBIFOM capability) indicating whether or not the capability of establishing the first PDN connection is supported. In other words, the identification information indicates whether or not the MME 40 supports the NBIFOM functionality. Specifically, the NBIFOM capability may include "allowed" or "Not allowed."

Note that the NBIFOM functionality may be information indicating the possession of functionality for establishing the multi-access PDN connection.

Alternatively, the NBIFOM capability may be identification information indicating the possession of capability of establishing the first PDN connection. That is, the existence of the NBIFOM capability in the storage may mean that the MME 40 is a gateway having functionality for establishing the first PDN connection. In other words, the existence of the NBIFOM capability in the storage may mean that the MME 40 is a gateway supporting the NBIFOM functionality.

The PGW 30 may store the NBIFOM capability associated with the MME ID.

FIG. 10G illustrates the SGW capability. The SGW capability stores, for each SGW 35, identification information (NBIFOM capability) indicating whether or not the capability of establishing the first PDN connection is supported. In other words, the identification information indicates whether or not the SGW 35 supports the NBIFOM functionality. Specifically, the NBIFOM capability may include "allowed" or "Not allowed."

Note that the NBIFOM functionality may be information indicating the possession of functionality for establishing the multi-access PDN connection.

Alternatively, the NBIFOM capability may be identification information indicating the possession of capability of establishing the first PDN connection. That is, the existence of the NBIFOM capability in the storage may mean that the SGW 35 is a gateway having functionality for establishing the first PDN connection. In other words, the existence of the NBIFOM capability in the storage may mean that the SGW 35 is a gateway supporting the NBIFOM functionality.

The PGW 30 may store the NBIFOM capability associated with the SGW ID.

The TWAG capability, the Network capability, the MME capability, and the SGW capability may be included in the EPS bearer context, or may be separated from the UE context.

1.2.5. PCRF Components

Figure 11:
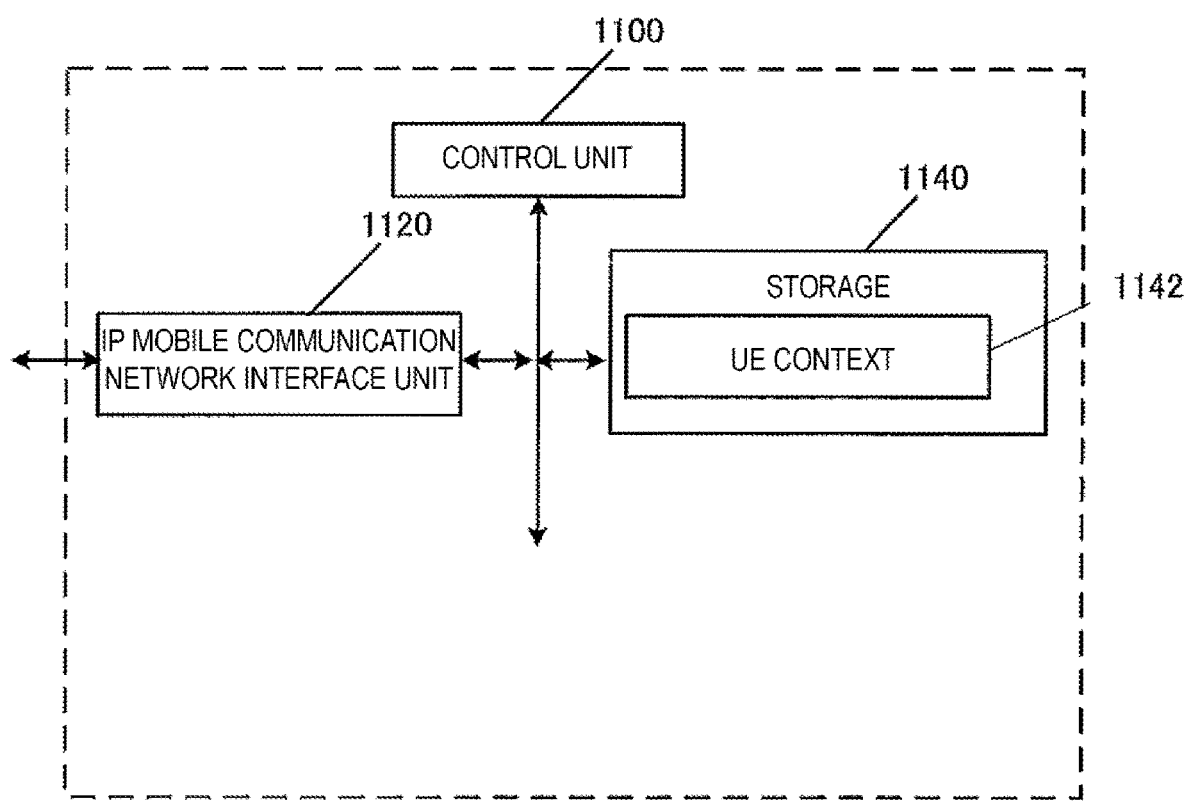
FIG. 11 is a diagram illustrating a functional configuration of a PCRF 60.

Next, the components of the PCRF 60 will be described. FIG. 11 illustrates a device constitution of the PCRF 60. As illustrated in FIG. 11, the PCRF 60 is constituted of an IP mobile communication network interface unit 1120, a control unit 1100, and a storage 1140. The IP mobile communication network interface unit 1120 and the storage 1140 are connected to the control unit 1100 via a bus.

The control unit 1100 is a function unit for controlling the PCRF 60. The control unit 1100 implements various processes by reading out and executing various programs stored in the storage 1140.

The IP mobile communication network interface unit 1120 is a function unit through which the PCRF 60 connects to the PGW 30 and/or the TWAG 74 and/or the AAA 55.

The storage 1140 is a function unit for storing programs, data, and the like necessary for each operation of the PCRF 60. The storage 940 is constituted of, for example, a semiconductor memory, a Hard Disk Drive (HDD), or the like.

As illustrated in FIG. 11, the storage 1140 stores UE context 1142. Note that the UE context may be classified into the UE context stored for each UE 10 and the UE context stored for each PDN connection.

FIG. 12A illustrates the UE context for each UE 10. As illustrated in FIG. 12A, the context includes at least a Subscriber ID and UE NBIFOM capability.

The Subscriber ID is identification information on a user. For example, the subscriber ID may be an IMSI.

The UE NBIFOM capability is the NBIFOM capability of the UE 10. The UE NBIFOM capability is identification information on each UE 10 indicating whether or not the capability of establishing the first PDN connection is supported. In other words, the UE NBIFOM capability is identification information indicating whether or not the UE 10 supports the NBIFOM functionality. More specifically, for example, the UE NBIFOM capability may include "allowed" or "Not allowed."

Alternatively, the UE NBIFOM capability may be identification information indicating that the UE 10 has the capability of establishing the first PDN connection. That is, the existence of the UE NBIFOM capability may mean that the UE 10 has functionality for establishing the first PDN connection.

In other words, the UE NBIFOM capability may be identification information indicating that the UE 10 supports the NBIFOM functionality. That is, the existence of the UE NBIFOM capability in the storage may mean that the UE 10 supports the NBIFOM functionality.

Next, the UE context for each PDN connection will be described. FIG. 12B illustrates an example of the UE context for each PDN connection. As illustrated in FIG. 12B, the context may include at least an APN, an Operation mode, a Network Policy, a Charging Rule, a PCC Rule, and a QoS Rule.

The APN is a label indicating an access destination in the network, in accordance with DNS naming convention. The Operation mode is identification information on a mode that indicates which of the UE 10 and the network takes an initiative in transmitting/receiving data or is allowed to initiate communication control in a case that the PDN connection is the first PDN connection.

More specifically, for example, an Operation mode that allows the UE 10 to initiate the communication control may be a UE Initiated mode.

Furthermore, an Operation mode that allows the network and/or the PGW 30 and/or the PCRF 60 to initiate the communication control may be a Network Initiated mode.

The Network policy is a communication control policy on the network side, and may include the Network allowed mode. Alternatively, the PCRF 60 may store the Network allowed mode separately from the Network Policy.

The Charging Rule is a regulation on charging. Based on the Charging Rule determined by the PCRF 60, a PCEF performs charging.

The PCC Rule is a regulation relating to control of the Network Policy and Charging Rule. Based on the PCC Rule, the PCEF performs communication control and charging.

The QoS Rule is a regulation relating to QoS of the flow. The QoS Rule may be associated with the PCC Rule.

FIG. 12C illustrates the UE context for each transfer path and/or bearer. As illustrated in FIG. 12C, the UE context for each transfer path and./or bearer includes at least the Routing Rule.

The Routing Rule indicates an association of a Routing Filter, and a Routing address or Routing access type. Based on this association, whether using a communication path through the 3GPP access network or using a transfer path through the WLAN access network is determined.

Here, the Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the TWAG 74. Alternatively, the Routing address may be an IP address of a Mobile Access Gateway (MAG).

The Routing Rule may be notified from the UE 10 and/or the TWAG 74 and/or the PGW 30. Alternatively, the Routing Rule may be a value that the PCRF 60 prestores as a default value. In this case, the PCRF 60 may determine the default value of the Routing Rule based on the PCC Rule.

The Routing Filter may include an IP header to switch an IP flow. Alternatively, the Routing Filter may include an application ID to switch the flow for each application. Alternatively, the Routing Filter may include a TFT.

The Routing Rule may store multiple rules. Furthermore, the Routing Rule may include a priority for each rule.

FIG. 12D illustrates an example of the TWAG capability stored by the TWAG 74. In the TWAG capability, identification information (NBIFOM capability) is stored for each TWAG 74, the identification information indicating whether or not the capability of establishing the first PDN connection is supported. In other words, the identification information indicates whether or not the TWAG 74 supports the NBIFOM functionality. Specifically, the NBIFOM capability may include "allowed" or "Not allowed".

Note that the NBIFOM functionality may be information indicating the possession of functionality for establishing the multi-access PDN connection.

Alternatively, the NBIFOM capability may be identification information indicating the possession of capability of establishing the first PDN connection. That is, the existence of the NBIFOM capability in the storage may mean that the TWAG 74 is a gateway having functionality for establishing the first PDN connection. In other words, the existence of the NBIFOM capability in the storage may mean that the TWAG 74 is a gateway supporting the NBIFOM functionality.

As illustrated in FIG. 12D, the NBIFOM capability may be stored being associated with the TWAG ID that is the identification information on the TWAG 74. In a case that the NBIFOM capability is not associated with the TWAG ID, the NBIFOM capability may refer to the capability of the TWAG 74 to be stored.

In a case that the TWAG ID and the NBIFOM capability are stored being associated with each other, the PCRF 60 may store the TWAG capabilities of multiple TWAGs 74.

FIG. 12E illustrates an example of the Network capability stored by the PCRF 60. In the Network capability, the NBIFOM capability is stored for each network, i.e., for each PGW 30.

Here, the NBIFOM capability is identification information on each network indicating whether or not the capability of establishing the first PDN connection is supported. In other words, the identification information indicates whether or not the PGW 30 supports the NBIFOM functionality. More specifically, for example, the NBIFOM capability may include "allowed" or "Not allowed."

Note that the NBIFOM functionality may be information indicating the possession of functionality for establishing the multi-access PDN connection.

Alternatively, the NBIFOM capability may be identification information indicating the possession of capability of establishing the first PDN connection. In other words, the NBIFOM capability may be identification information indicating that it is a gateway supporting the NBIFOM functionality. That is, the existence of the NBIFOM capability in the storage may mean that the PGW 30 is a gateway having functionality for establishing the first PDN connection. In other words, the existence of the NBIFOM capability in the storage may mean that the PGW 30 is a gateway supporting the NBIFOM functionality.

FIG. 12F illustrates the MME capability. The MME capability stores, for each MME 40, identification information (NBIFOM capability) indicating whether or not the capability of establishing the first PDN connection is supported. In other words, it is identification information indicating whether or not the MME 40 supports the NBIFOM functionality. Specifically, the NBIFOM capability may include "allowed" or "Not allowed."

Note that the NBIFOM functionality may be information indicating having a function of establishing the multi-access PDN connection.

Alternatively, the NBIFOM capability may be identification information indicating the possession of capability of establishing the first PDN connection. That is, the existence of the NBIFOM capability in the storage may mean that the MME 40 is a gateway having functionality for establishing the first PDN connection. In other words, the existence of the NBIFOM capability in the storage may mean that the MME 40 is a gateway supporting the NBIFOM functionality.

The PCRF 60 may store the NBIFOM capability associated with the MME ID.

FIG. 12G illustrates the SGW capability. The SGW capability stores, for each SGW 35, identification information (NBIFOM capability) indicating whether or not the capability of establishing the first PDN connection is supported. In other words, the identification information indicates whether or not the SGW 35 supports the NBIFOM functionality. Specifically, the NBIFOM capability may include "allowed" or "Not allowed."

Note that the NBIFOM functionality may be information indicating the possession of functionality for establishing the multi-access PDN connection.

Alternatively, the NBIFOM capability may be identification information indicating the possession of capability of establishing the first PDN connection. That is, the existence of the NBIFOM capability in the storage may mean that the SGW 35 is a gateway having functionality for establishing the first PDN connection. In other words, the existence of the NBIFOM capability in the storage may mean that the SGW 35 is a gateway supporting the NBIFOM functionality.

The PCRF 60 may store the NBIFOM capability associated with the SGW ID.

1.2.6. MME Constitution

A device constitution of the MME 40 will be described. The MME 40 is constituted of the IP mobile communication network interface unit 320, the control unit 300, and the storage 340. The IP mobile communication network interface unit 320 and the storage 340 are connected to the control unit 300 via a bus.

The control unit 300 is a function unit for controlling the MME 40. The control unit 300 implements various processes by reading out and executing various programs stored in the storage 340.

The IP mobile communication network interface unit 320 is a function unit through which the MME 40 is connected to the PGW 30.

The storage 340 is a function unit for storing programs, data, and the like necessary for each operation of the MME 40. The storage 340 is constituted of, for example, a semiconductor memory, a Hard Disk Drive (HDD), or the like.

The storage 340 stores an MME capability 342, the network capability 344, and the EPS bearer context 346. Hereinafter, information elements stored in the storage 340 will be described.

Information elements stored in the storage 340 will be described. An example of the MME capability stored by the MME 40 will be illustrated. The MME capability stores, for each MME 40, identification information (NBIFOM capability) indicating whether or not the capability of establishing the first PDN connection is supported. In other words, the identification information indicates whether or not the MME 40 supports the NBIFOM functionality. Specifically, the NBIFOM capability may include "allowed" or "Not allowed."

Note that the NBIFOM functionality may be information indicating the possession of functionality for establishing the multi-access PDN connection.

Alternatively, the NBIFOM capability may be identification information indicating the possession of capability of establishing the first PDN connection. That is, the existence of the NBIFOM capability in the storage may mean that the MME 40 is a gateway having functionality for establishing the first PDN connection. In other words, the existence of the NBIFOM capability in the storage may mean that the MME 40 is a gateway supporting the NBIFOM functionality.

The NBIFOM capability may be stored being associated with the MME ID that is the identification information on the MME 40. In a case that the NBIFOM capability is not associated with the MME ID, the NBIFOM capability may refer to the capability of the MME 40 to be stored.

In a case that the MME ID and the NBIFOM capability are stored being associated with each other, the MME 40 may store the MME capabilities of multiple MMEs 40.

In this case, when the UE 10 performs handover to another MME 40, the MME 40 may select an MME 40 to which the handover is made, based on the MME capability.

Next, the Network capability 344 will be described. An example of the Network capability stored by the MME 40 will be described. The Network capability stores the NBIFOM capability for each network, i.e., for each PGW 30.

Here, the NBIFOM capability is identification information on each network indicating whether or not the capability of establishing the first PDN connection is supported. In other words, the identification information indicates whether or not the PGW 30 supports the NBIFOM functionality. More specifically, for example, the NBIFOM capability may include "allowed" or "Not allowed."

Note that the NBIFOM functionality may be information indicating the possession of functionality for establishing the multi-access PDN connection.

Alternatively, the NBIFOM capability may be identification information indicating the possession of capability of establishing the first PDN connection. In other words, the NBIFOM capability may be identification information indicating that it is a gateway supporting the NBIFOM functionality. That is, the existence of the NBIFOM capability in the storage may mean that the PGW 30 is a gateway having functionality for establishing the first PDN connection. In other words, the existence of the NBIFOM capability in the storage may mean that the PGW 30 is a gateway supporting the NBIFOM functionality.

The MME 40 stores the NBIFOM capability associated with the PGW ID. Furthermore, the NBIFOM capability may be stored being associated with each of the multiple PGWs 30.

The PGW ID may be any information for identifying the PGW 30, and may be an Access Point Name (APN), for example.

Next, the EPS bearer context will be described. The EPS bearer context may be classified into the EPS bearer context for each UE 10 stored for each UE 10, the EPS bearer context for each PDN connection, and the EPS bearer context for each bearer and/or transfer path.

Information elements included in the EPS bearer context for each UE 10 will be described. The MME 40 stores, for each UE 10, the UE NBIFOM capability and the NBIFOM allowed.

The UE NBIFOM capability is the NBIFOM capability of the UE 10. The UE NBIFOM capability is identification information on each UE 10 indicating whether or not the capability of establishing the first PDN connection is supported. In other words, the UE NBIFOM capability is identification information indicating whether or not the UE 10 supports the NBIFOM functionality. More specifically, for example, the UE NBIFOM capability may include "allowed" or "Not allowed."

Note that the NBIFOM functionality may be information indicating the possession of functionality for establishing the multi-access PDN connection.

Alternatively, the UE NBIFOM capability may be identification information indicating that the UE 10 has the capability of establishing the first PDN connection. That is, the existence of the UE NBIFOM capability may mean that the UE 10 has functionality for establishing the first PDN connection.

In other words, the UE NBIFOM capability may be identification information indicating that the UE 10 supports the NBIFOM functionality. That is, the existence of the UE NBIFOM capability in the storage may mean that the UE 10 supports the NBIFOM functionality.

Furthermore, the NBIFOM allowed is identification information indicating an APN that is allowed to establish a PDN connection using the NBIFOM. The NBIFOM may be associated with at least the APN. The NBIFOM allowed may be associated with multiple APNs.

In the present embodiment, the APN 1 is associated with the NBIFOM allowed. That is, the APN 1 is allowed to establish the multi-access PDN connection. In other words, in the present embodiment, the UE 10 is allowed to establish the multi-access PDN connection by using the APN 1. Note that the APN 1 is also allowed to establish the PDN connection of the related art, rather than the multi-access PDN connection.

In addition, in the present embodiment, the APN 2 is not associated with the NBIFOM allowed. That is, in the present embodiment, the APN 2 is not allowed to establish the multi-access PDN connection. That is, in the present embodiment, the UE 10 cannot establish the multi-access PDN connection by using the APN 2.

The NBIFOM allowed may be stored before the PDN connection is established.

The MME 40 may access the HSS 50 to acquire the NBIFOM allowed before the PDN connection is established and/or during the establishment procedure.

Furthermore, the EPS bearer context for each UE 10 may include the identification information on the UE 10. The identification information on the UE 10 may be an IMSI.

The EPS bearer context for each PDN connection will be described. The EPS bearer context for each PDN connection includes a PDN connection ID, a Network allowed mode, an Operation mode, a User plane connection ID, an MME MAC address, and an NBIFOM Permission.

The PDN connection ID is identification information for identifying a PDN connection. The UE 10, the MME 40, and the PGW 30 may store the same identification information.

The Operation mode is identification information on a mode that indicates which of the UE 10 and the network takes an initiative in transmitting/receiving data or is allowed to initiate communication control in a case that the PDN connection is the first PDN connection.

More specifically, for example, an Operation mode that allows the UE 10 to initiate the communication control may be a UE Initiated mode.

Furthermore, an Operation mode that allows the network and/or the PGW 30 and/or the PCRF 60 to initiate the communication control may be a Network Initiated mode.

The Network allowed mode indicates an Operation mode allowed by the network. The Network allowed mode may include the UE Initiated mode, the Network Initiated mode, or both thereof.

The User plane connection ID is identification information for identifying a connection used for transmission of user data in a case that the UE 10 has established a transfer path via the MME 40.

The NBIFOM permission is information indicating that this PDN connection has established the multi-access PDN connection. In other words, the NBIFOM permission indicates that the first PDN connection has been established.

That is, the fact that the MME 40 stores the NBIFOM permission means that this PDN connection is the first PDN connection.

The NBIFOM permission is identification information stored by the MME 40 upon the PDN connection being established.

The MME 40 may access the HSS 50 to acquire the NBIFOM permission during the establishment of the PDN connection. Alternatively, the MME 40 may store the NBIFOM permission based on the fact that the multi-access PDN connection has been established.

Next, the EPS bearer context for each bearer and/or transfer path will be described. The EPS bearer context for each bearer and/or transfer path may include the transfer path identification information and the Routing Rule.

The transfer path identification information is information for identifying a transfer path and/or bearer. The transfer path identification information may be an EPS bearer ID, for example.

The Routing Rule indicates an association of a Routing Filter, and a Routing address or Routing access type. Based on this association, whether using a communication path through the 3GPP access network or using a communication path through the WLAN access network is determined.

Here, the Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the MME 40. Alternatively, the Routing address may be an IP address of a Mobile Access Gateway (MAG).

The Routing Rule may be notified from the PGW 30 or the PCRF 60, or may be notified from the UE 10. Alternatively, the Routing Rule may be a value that the MME 40 prestores as a default value.

The Routing Filter may include an IP header to switch an IP flow. Alternatively, the Routing Filter may include an application ID to switch the flow for each application. Alternatively, the Routing Filter may include a TFT.

The Routing Rule may store multiple rules. Furthermore, the Routing Rule may include a priority for each rule.

The SGW capability stores, for each SGW 35, identification information (NBIFOM capability) indicating whether or not the capability of establishing the first PDN connection is supported. In other words, the identification information indicates whether or not the SGW 35 supports the NBIFOM functionality. Specifically, the NBIFOM capability may include "allowed" or "Not allowed."

Note that the NBIFOM functionality may be information indicating the possession of functionality for establishing the multi-access PDN connection.

Alternatively, the NBIFOM capability may be identification information indicating the possession of capability of establishing the first PDN connection. That is, the existence of the NBIFOM capability in the storage may mean that the SGW 35 is a gateway having functionality for establishing the first PDN connection. In other words, the existence of the NBIFOM capability in the storage may mean that the SGW 35 is a gateway supporting the NBIFOM functionality.

The MME 40 may store the NBIFOM capability associated with the SGW ID.

The MME capability and the Network capability may be included in the EPS bearer context.

1.3. Description of Initial State

An initial state in the present embodiment will be described. The initial state in the present embodiment may be a first initial state described below.

Note that the initial state in the present embodiment may not be limited to the first initial state.

1.3.1. Description of First Initial State

The first initial state will be described. In the first state, the UE 10 has not yet established the first PDN connection with the core network 90. However, the UE 10 has already established the second PDN connection. In more detail, the UE 10 has not yet established the first PDN connection with a PGW_A 1310. However, the UE 10 has already established the second PDN connection with a PGW_B 1320.

Note that the PGW_A 1310 may be a gateway device selected by using the APN 1. The PGW_B 1320 may be a gateway device selected by using the APN 2. Moreover, the PGW_A 1310 and the PGW_B 1320 may be the PGW 30. Furthermore, the selection of a gateway using the APN 1 and/or the APN 2 may be performed by the TWAG 74 included and located in the access network B and/or the MME 40 included and located in the core network 90.

In addition, the gateway device selected by using the APN 1 and the gateway device selected by using the APN 2 may be the same gateway device. In this case, the PGW_A 1310 and the PGW_B 1320 may be the same device.

Note that the second PDN connection may be constituted of a transfer path between the UE 10 and the PGW 30 through the access network A. Thus, the second PDN connection may be constituted of a transfer path that is a combination of a transfer path between the UE 10 and the eNodeB 45, a transfer path between the eNodeB 45 and the SGW 35, and a transfer path between the SGW 35 and the PGW_B 1320. Here, the transfer path may be a bearer.

As described above, in the first initial state, the UE 10 may be in a state of being connected to the core network 90 via the access network A.

Note that the UE 10 need not have a connection to the core network 90 via the access network B. In other words, the UE 10 need not have Attach established through the WLAN access network.

Alternatively, the UE 10 may be in a state of being connected to the core network 90 via the access network B. In this case, the UE 10 may perform an Attach procedure initiated by the UE 10 to establish the third PDN connection.

Note that the third PDN connection may be established with the gateway selected by using the APN 2. Alternatively, the third PDN connection may be established with a gateway selected by using another APN different from the APN 1 or the APN 2.

The first initial state has been described above; however, the first initial state is not limited to the above-described state, and only needs to be a state in which the multi-access PDN connection has not been established through the access network B, for example.

1.3.2. Description of Procedure for Leading to First Initial State

Figure 15:
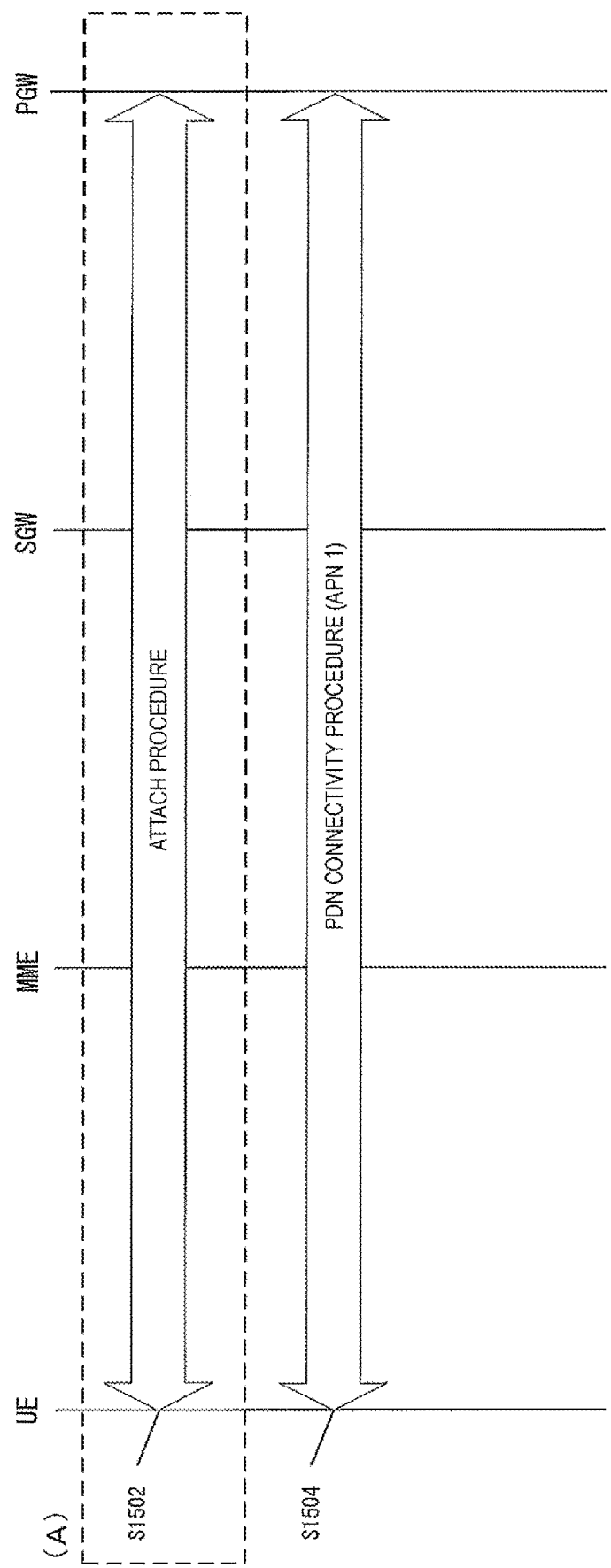
FIG. 15 is a diagram illustrating a procedure for leading to an initial state.

A procedure for leading to the first initial state will be described with reference to FIG. 15. In the procedure for leading to the first initial state, at least a PDN connectivity procedure to the core network 90 through the access network A, as illustrated in (A) of FIG. 15, is performed. The first initial state is a state after at least the Attach procedure to the core network 90 through the access network A is performed, as illustrated in (A) of FIG. 15, is performed.

Next, details of the Attach procedure to the core network 90 through the access network A will be described.

The UE 10 performs an Attach procedure for establishing the second PDN connection with the core network 90 through the access network A. In more detail, the UE 10 establishes, via the eNB 45 located in the access network A and the SGW 35 located in the core network 90, the PDN connection with the PGW_B 1320 located in the core network 90. Note that the MME 40 located in the core network 90 is responsible for the establishment and management of the PDN connection. Furthermore, the MME 40 also performs the selection of the SGW 35, and the selection of the PGW 30 using the APN.

Specifically, when establishing the second PDN connection, the UE 10 transmits an Attach request to the MME 40 via the eNB 45. The MME 40 receives the Attach request transmitted by the UE 10. In response to the reception of the Attach request, the MME 40 performs a procedure for establishing a security association with the UE 10.

Here, the UE 10 may transmit the Attach request including the APN 2. Alternatively, the UE 10 may transmit the APN 2 to the MME 40 after the security association procedure between the UE 10 and the MME 40 (described below) is completed.

Based on the completion of the security association procedure, the MME 40 transmits an Attach accept to the UE 10 via the eNB 45. The MME 40 may transmit an Activate default EPS bearer context request including the APN 2.

The UE 10 receives the Attach accept transmitted by the MME 40. In response to the Attach accept, the UE 10 transmits an Attach complete to the MME 40 via the eNB 45.

The MME 40 receives the Attach request transmitted by the UE 10.

1.3.3. Description of Multi-Access PDN Connection Establishment Procedure

Next, an establishment procedure of the first PDN connection will be described. Here, the initial state may be the first initial state. In the present embodiment, after the establishment of the initial state, the UE 10 performs a PDN connectivity procedure for establishing the first PDN connection with the core network 90 through the access network A. In more detail, the UE 10 establishes, via the eNB 45 located in the access network A and the SGW 35 located in the core network 90, the first PDN connection with the PGW_A 1310 located in the core network 90.

Note that the first PDN connection may be constituted of a transfer path that is a combination of a transfer path between the UE 10 and the eNB 45, a transfer path between the eNB 45 and the SGW 35, and a transfer path between the eNB 45 and the PGW_A 1310. Here, the transfer path may be a bearer.

As illustrated in FIG. 15, the procedure for establishing the first PDN connection may be a PDN connectivity procedure using the APN 1.

A specific example of the PDN connectivity procedure will be described below.

1.4. Examples of PDN Connectivity Procedure

Figure 16:
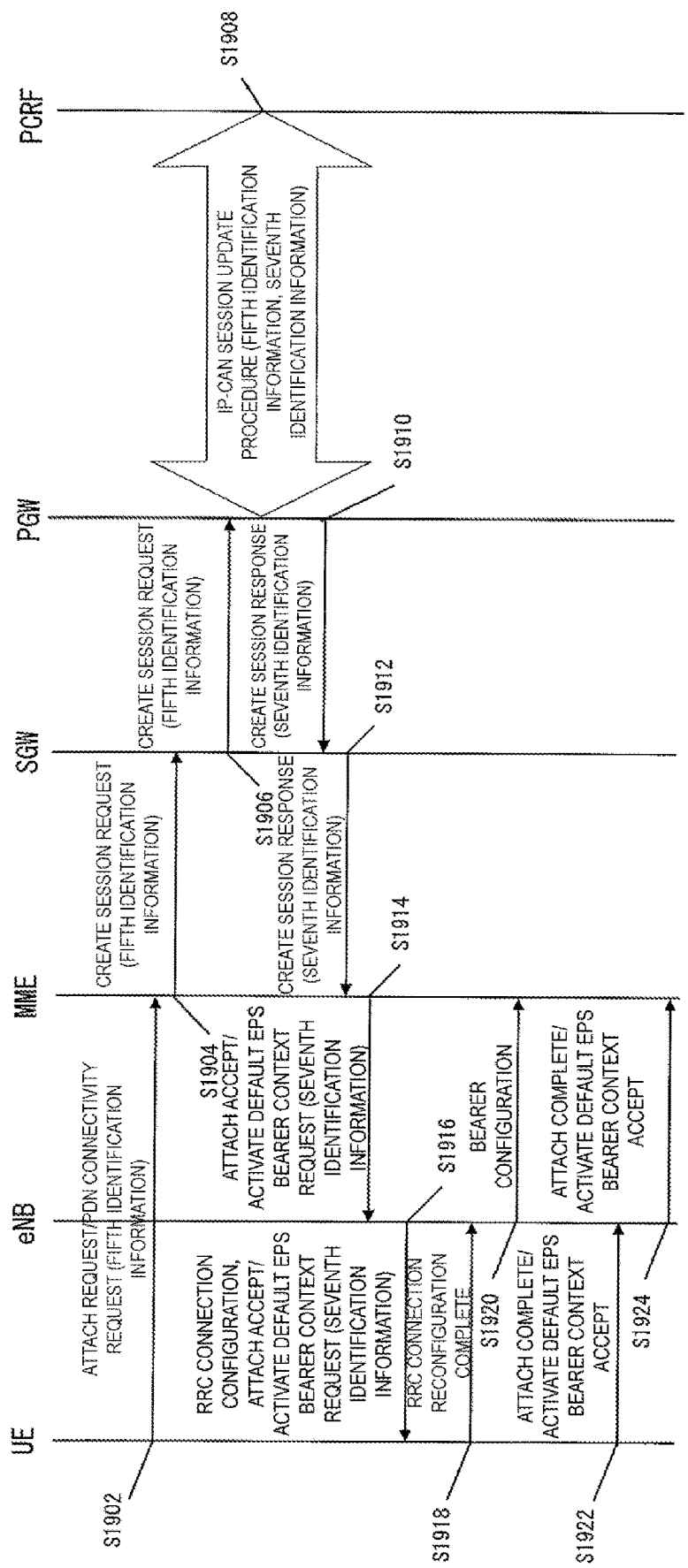
FIG. 16 is a diagram illustrating a first and third PDN connectivity procedure.
Figure 17:
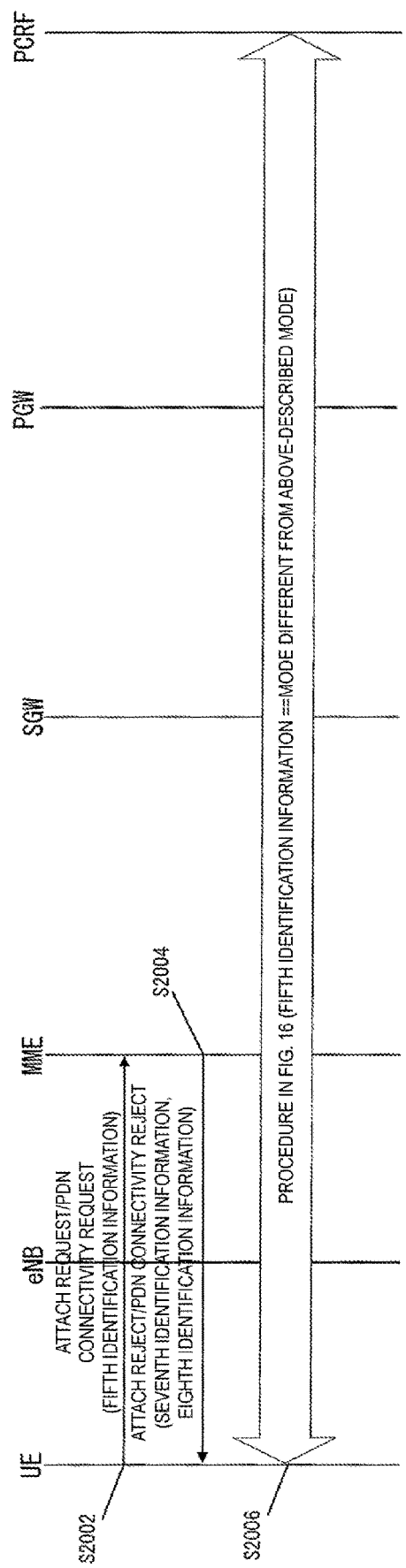
FIG. 17 is a diagram illustrating a second PDN connectivity procedure.
Figure 18:
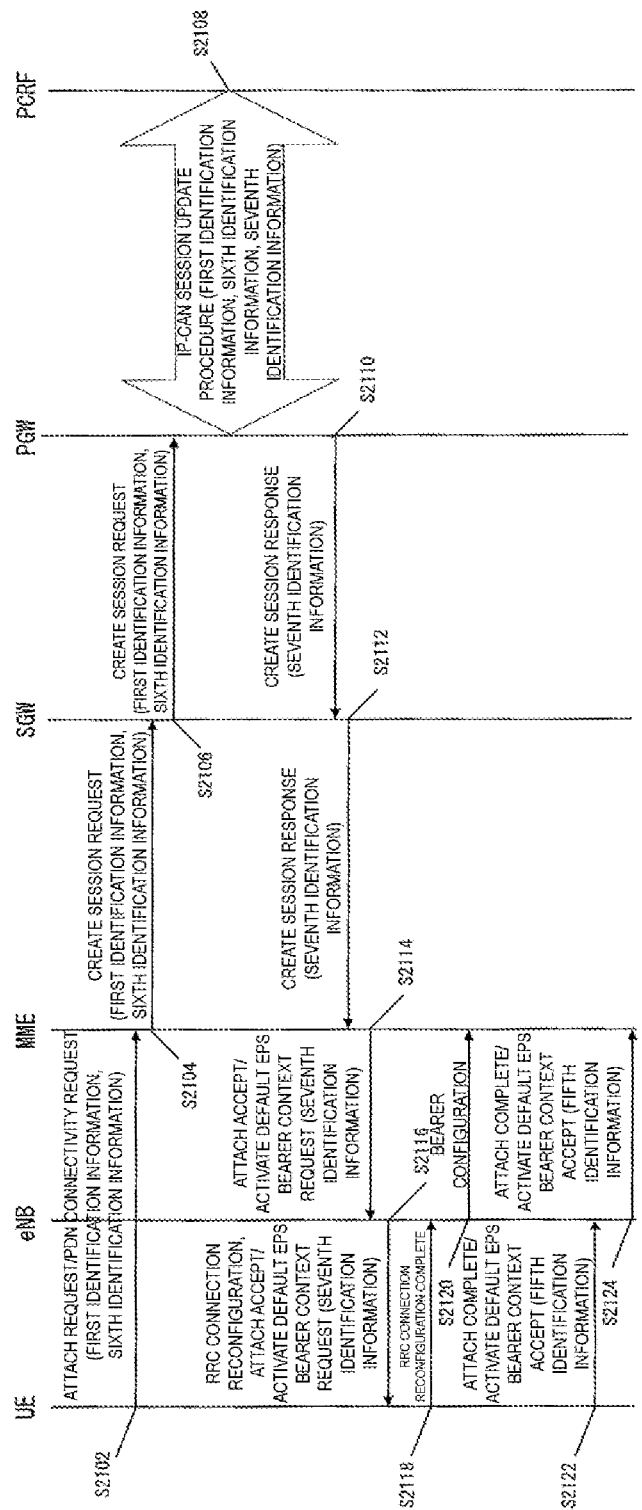
FIG. 18 is a diagram illustrating a fourth PDN connectivity procedure.

Examples of the first to fourth PDN connectivity procedures for establishing the first PDN connection will be described with reference to FIGS. 16 to 18.

1.4.1. Example of First PDN Connectivity Procedure

An example of the first PDN connectivity procedure will be described with reference to FIG. 16.

The UE 10 first transmits a PDN connectivity request to the MME 40 via the eNB 45 (S1902). The UE 10 may transmit the PDN connectivity request including at least a PDN connectivity request message identity (PDN connectivity request message ID), a Procedure transaction identity (Procedure transaction ID), a Request type (request type), a PDN type, a Protocol discriminator, and an EPS bearer identify (EPS bearer ID). Furthermore, the UE 10 may include at least first identification information and/or fifth identification information in the PDN connectivity request. Moreover, the UE 10 may include the Access Point Name (APN) and/or Protocol Configuration Options (PCOs) and/or the Traffic Flow Templates (TFTs) in the PDN connectivity request. Note that the UE 10 may transmit the PCO including the first identification information and/or the fifth identification information and/or the TFT.

Here, the first identification information may be the UE NBIFOM capability indicating that the UE 10 supports the NBIFOM. Note that the NBIFOM capability may be information indicating the possession of functionality for establishing the multi-access PDN connection.

Furthermore, the fifth identification information may be a Mode Indication representing an NBIFOM operation mode for the multi-access PDN connection whose establishment is requested by the UE 10. Note that the UE 10 may include the UE-Initiated mode or the Network-Initiated mode in the fifth identification information.

Note that the first identification information may be the fifth identification information. More specifically, the UE 10 may indicate, by transmitting the Mode Indication, that the UE 10 supports the NBIFOM.

As described above, the UE 10 may transmit the PDN connectivity request including the first identification information and/or fifth identification information to request the establishment of the multi-access PDN connection.

The PDN connectivity request message ID may be a message type representing the PDN connectivity request message.

The Procedure transaction ID may be information for identifying the PDN connectivity procedure.

The APN may be an APN to which the UE 10 requests a connection. More specifically, the APN may be the APN 1. The UE 10 may include the APN 1 to establish the multi-access PDN connection. Here, the APN 1 may be an APN that is allowed to establish the multi-access PDN connection and/or an APN that is allowed to perform communication based on the NBIFOM.

The request type may be information for identifying the type of the requested PDN connectivity procedure. For example, the UE 10 performs an initial connection by using the APN 1, so the request type may be the type indicating Attach, rather than the type indicating handover.

The PDN type may indicate an available IP version. For example, the PDN type may be IPv4, IPv6, or IPv4v6.

The Protocol discriminator may be a discriminator representing the type of protocol used for transmitting/receiving the PDN connectivity request.

The EPS bearer ID may be information for identifying the EPS bearer. The EPS bearer ID may be assigned by the MME 40.

The PCO may be protocol information associated with the PDN connection. Furthermore, the PCO may include identification information on the request. Note that the UE 10 may transmit the PCO including the first identification information.

The TFT may be information for identifying an IP flow that performs communication by using the PDN connection established in the present PDN connectivity procedure. Note that the IP flow to be identified may vary for each application. Thus, based on the TFT, user data of a specific application can be identified.

More specifically, the TFT may be constituted of five-tuple, or may be constituted of identification information such as the application ID. Note that the five-tuple may be constituted of a combination of one or more of a source IP address, a destination IP address, a source port number, a destination port number, and a protocol number.

In a case that the UE 10 requests the establishment of the multi-access PDN connection of the UE-Initiated mode, the UE 10 may include the TFT in the PDN connectivity request. Alternatively, in a case that the UE 10 requests the establishment of the multi-access PDN connection of the Network-Initiated mode, the UE 10 need not include the TFT in the PDN connectivity request.

In other words, in a case that the UE 10 includes the UE-Initiated mode in the fifth identification information, the UE 10 may include the TFT in the PDN connectivity request. Alternatively, in a case that the UE 10 includes the Network-Initiated mode in the fifth identification information, the UE 10 need not include the TFT in the PDN connectivity request.

Note that, in the related art, the UE 10 can perform transmission, with information indicating the IFOM support included in the PCO. Here, the IFOM support is identification information representing that the IP Flow Mobility (IFOM) is supported. Furthermore, the IFOM is a technique for switching a communication path of a specific IP flow by using the Dual Stack Mobile IPv6 (DSMIPv6) protocol. Thus, including the information indicating the IFOM support in the PCO allows the UE 10 to switch the access network through which the communication of a specific IP flow is performed.

In the present embodiment, in a case that the UE 10 includes the first identification information and/or fifth identification information in the PCO, the UE 10 does not include the IFOM support. In contrast, in a case that the UE 10 includes the IFOM support in the PCO, the UE 10 does not include either the first identification information or the fifth identification information. As described above, a configuration may be made in which whether to use the switching of the communication path based on the NBIFOM or to use the switching of the communication path based on the IFOM is clearly defined by disabling both of the first identification information and the IFOM support.

Thus, the UE 10 can establish either the PDN connection supporting the IFOM or the PDN connection supporting the NBIFOM in the establishment procedure of a single PDN connection. In other words, the single PDN connection is the PDN connection supporting the NBIFOM, the PDN connection supporting the IFOM, or the single-access PDN connection.

The MME 40 receives the PDN connectivity request transmitted by the UE 10. Based on the reception of the PDN connectivity request, and/or the first identification information included in the PDN connectivity request, and/or the fifth identification information included in the PDN connectivity request, the MME 40 transmits a Create Session Request to the SGW 35 (S1904).

Based on the reception of the PDN connectivity request and/or the first identification information included in the PDN connectivity request, the MME 40 may transmit the Create Session Request including at least the first identification information.

Based on the reception of the PDN connectivity request and/or the fifth identification information included in the PDN connectivity request, the MME 40 may transmit the Create Session Request including at least the fifth identification information. The MME 40 may include the TFT in the Create Session Request, based on the reception of the TFT transmitted by the UE 10.

Furthermore, the TFT may be information for identifying an IP flow that performs communication by using the PDN connection established in the present PDN connectivity procedure. Note that the IP flow to be identified may vary for each application. Thus, based on the TFT, user data of a specific application can be identified.

More specifically, the TFT may be constituted of five-tuple, or may be constituted of identification information such as the application ID. Note that the five-tuple may be constituted of a combination of one or more of a source IP address, a destination IP address, a source port number, a destination port number, and a protocol number.

In a case that the MME 40 requests the establishment of the multi-access PDN connection of the UE-Initiated mode, the MME 40 may include the TFT in the Create Session Request. Alternatively, in a case that the MME 40 requests the establishment of the multi-access PDN connection of the Network-Initiated mode, the MME 40 need not include the TFT in the Create Session Request.

In other words, in a case that the UE-Initiated mode is included in the fifth identification information included in the PDN connectivity request, the MME 40 may include the TFT in the Create Session Request. Alternatively, in a case that the Network-Initiated mode is included in the fifth identification information included in the PDN connectivity request, the MME 40 need not include the TFT in the Create Session Request.

Here, the MME 40 may determine, based on the fifth identification information, whether to request the establishment of the multi-access PDN connection of the UE-Initiated mode or request the establishment of the multi-access PDN connection of the Network-Initiated mode.

Note that in a case that the first identification information is not included in the PDN connectivity request, the MME 40 may transmit the Create Session Request without including the first identification information. Furthermore, in a case that the fifth identification information is not included in the PDN connectivity request, the MME 40 may transmit the Create Session Request without including the fifth identification information. Moreover, in a case that neither the first identification information nor the fifth identification information is included in the PDN connectivity request, the MME 40 may perform a procedure for establishing the single-access PDN connection.

The SGW 35 receives the Create Session Request transmitted by the MME 40. Based on the reception of the Create Session Request and/or the fifth identification information included in the Create Session Request, the SGW 35 transmits the Create Session Request to the PGW 30 (S1906).

Based on the reception of the Create Session Request and/or the fifth identification information included in the Create Session Request, the SGW 35 may transmit the Create Session Request including at least the fifth identification information. Furthermore, the SGW 35 may include the TFT in the Create Session Request.

Furthermore, the TFT may be information for identifying an IP flow that performs communication by using the PDN connection established in the present PDN connectivity procedure. Note that the IP flow to be identified may vary for each application. Thus, user data of a specific application can be identified by the TFT.

More specifically, the TFT may be constituted of five-tuple, or may be constituted of identification information such as the application ID. Note that the five-tuple may be constituted of a combination of one or more of a source IP address, a destination IP address, a source port number, a destination port number, and a protocol number.

In a case that the SGW 35 requests the establishment of the multi-access PDN connection of the UE-Initiated mode, the SGW 35 may include the TFT in the Create Session Request. Alternatively, in a case that the MME 40 requests the establishment of the multi-access PDN connection of the Network-Initiated mode, the MME 40 need not include the TFT in the Create Session Request.

In other words, in a case that the UE-Initiated mode is included in the fifth identification information included in the Create Session Request, the SGW 35 may include the TFT in the Create Session Request. Alternatively, in a case that the Network-Initiated mode is included in the fifth identification information included in the Create Session Request, the SGW 35 need not include the TFT in the Create Session Request.

Here, the SGW 35 may determine, based on the fifth identification information, whether to request the establishment of the multi-access PDN connection of the UE-Initiated mode or request the establishment of the multi-access PDN connection of the Network-Initiated mode.

Note that in a case that the first identification information is not included in the Create Session Request, the SGW 35 may transmit the Create Session Request without including the first identification information. Furthermore, in a case that the fifth identification information is not included in the Create Session Request, the SGW 35 may transmit the Create Session Request without including the fifth identification information. Moreover, in a case that neither the first identification information nor the fifth identification information is included in the Create Session Request, the SGW 35 may perform a procedure for establishing the single-access PDN connection.

The PGW 30 receives the Create Session Request transmitted by the SGW 35. Based on the reception of the Create Session Request and/or the fifth identification information included in the Create Session Request, the PGW 30 may perform an IP-CAN session update procedure with the PCRF 60 (S1908).

The PGW 30 may transmit, to the PCRF 60, a control message in the IP-CAN session procedure, the control message including information indicating whether the PDN connection to be established is a multi-access PDN connection or a single-access PDN connection, and/or the first identification information, and/or the fifth identification information.

More specifically, in a case that the multi-access PDN connection is to be established, the PGW 30 transmits, to the PCRF 60, the information indicating the access network A, the PDN connection ID, the information indicating that the PDN connection is the multi-access PDN connection, and the first identification information and/or fifth identification information. Alternatively, in a case that the single-access PDN connection is to be established, the PGW 30 transmits, to the PCRF 60, the information indicating the access network A, the PDN connection ID, and the information indicating that the PDN connection is the single-access PDN connection.

Note that the PDN connection ID may be an ID assigned when the PGW 30 establishes the PDN connection in the PDN connectivity procedure, or may be information for uniquely identifying the PDN connection that the UE 10 establishes with the PGW 30.

Note that the PGW 30 may perform the IP-CAN session update procedure to notify the PCRF 60 of information on the UE 10 and/or eNB 45 and/or MME 40 and/or SGW 35.

Furthermore, based on the reception of the fifth identification information, the PCRF 60 may transmit, to the PGW 30, a control message in the IP-CAN session update procedure with the PGW 30, the control message including at least seventh identification information. The detailed description of the seventh identification information will be described later.

Note that the PCRF 60 may perform the IP-CAN session update procedure to notify the PGW 30 of charging information and/or QoS control information and/or routing information.

Based on the reception of the Create Session Request or the completion of the IP-CAN session update procedure, and/or the fifth identification information included in the Create Session Request and/or the seventh identification information included in the IP-CAN session update procedure, the PGW 30 transmits a Create Session Response to the SGW 35 (S1910).

Based on the reception of the Create Session Request or the completion of the IP-CAN session update procedure, and/or the fifth identification information included in the Create Session Request and/or the seventh identification information included in the IP-CAN session update procedure, the PGW 30 may transmit the Create Session Response including at least the seventh identification information.

Note that a method by which the PGW 30 acquires the seventh identification information is not limited to the above-described method for acquiring the seventh identification information from the PCRF 60 in the IP-CAN session update procedure, and another example may be employed. For example, the PGW 30 may create the seventh identification information and transmit the Create Session Response including the seventh identification information, without acquiring the seventh identification information from the PCRF 60 in the IP-CAN session update procedure.

Here, the seventh identification information may be the Allowed Mode representing the NBIFOM operation mode that is allowed for the multi-access PDN connection to be established. In other words, the fifth identification information is an operation mode requested by the UE 10, whereas the seventh identification information may be an operation mode allowed by the operator.

Note that the PCRF 60 or the PGW 30 may determine the Allowed Mode and the seventh identification information based on an operator policy. For example, a policy that allows the establishment of only the PDN connection of the UE-Initiated mode, a policy that allows the establishment of only the PDN connection of the Network-Initiated mode, a policy that allows the establishment of the PDN connection of both of the modes, a policy that prohibits the establishment of the PDN connection of both of the modes, and the like may be managed.

Note that the PCRF 60 or the PGW 30 may acquire the operator policy from the HSS and the like. Alternatively, an operator policy created by an administrator may be stored.

In addition, for the operator policy, a policy different for each subscriber may be managed. Alternatively, a policy different for each APN may be managed. For example, a different Allowed Mode for the PDN connection to be established for each APN may be managed.

In the present example, a case will be described in which the establishment of the PDN connection of the NBIFOM operation mode included in the fifth identification information is allowed based on the Allowed Mode.

Thus, the PCRF 60 or the PGW 30 allows the establishment of the PDN connection based on the NBIFOM operation mode included in the fifth identification information, and includes, in the seventh identification information, the same operation mode as that of the fifth identification information.

In other words, in a case that the UE-Initiated mode is included in the fifth identification information, the PCRF 60 or the PGW 30 may include the UE-Initiated mode in the seventh identification information. Alternatively, in a case that the Network-Initiated mode is included in the fifth identification information, the PCRF 60 or the PGW 30 may include the Network-Initiated mode in the seventh identification information.

As described above, based on the Allowed Mode, in a case that the establishment of the PDN connection of the NBIFOM operation mode included in the fifth identification information is allowed, a mode requested by the UE 10 out of one or more operation modes allowed based on the Allowed Mode may be regarded as the seventh identification information.

The PGW 30 may include the PDN Address and/or the PDN connection ID and/or the TFT in the Create Session Response.

The PDN Address may be an IP address assigned to the UE 10. For example, the PDN Address may be an IPv4 address, or an IPv6 prefix and an interface ID for constituting an IPv6 address. Here, the PGW 30 may assign the IP address of the UE 10. Moreover, the PGW 30 may include the IP address assigned to the UE 10 in the PDN Address.

Furthermore, the PDN connection ID may be information for uniquely identifying the PDN connection established between the UE 10 and the PGW 30. The PDN connection ID may be assigned by the PGW 30, or may be assigned by the MME 40. In other words, the PGW 30 may assign the PDN connection ID.

The SGW 35 receives the Create Session Response transmitted by the PGW 30. Based on the reception of the Create Session Response and/or the seventh identification information included in the Create Session Response, the SGW 35 transmits the Create Session Response to the MME 40 (S1912).

Based on the reception of the Create Session Response and/or the seventh identification information included in the Create Session Response, the SGW 35 may transmit the Create Session Response including at least the seventh identification information.

Furthermore, the SGW 35 may include the PDN Address and/or the PDN connection ID and/or the TFT in the session request response.

The MME 40 receives the Create Session Response transmitted by the SGW 35. Based on the reception of the Create Session Response and/or the seventh identification information included in the Create Session Response, the MME 40 transmits an Activate default EPS bearer context request to the eNB 45 (S1914).

Based on the reception of the Create Session Response and/or the seventh identification information included in the Create Session Response, the MME 40 may transmit the Activate default EPS bearer context request including at least an Activate default EPS bearer context request message identity (Activate default EPS bearer context request message ID), the Procedure transaction ID, the APN, the PDN Address, the Protocol discriminator, the EPS bearer ID, and an EPS QoS. Furthermore, the MME 40 may include at least the seventh identification information in the Activate default EPS bearer context request. Moreover, the MME 40 may include the PCO and/or an ESM Cause and/or the TFT and/or the PDN connection ID and/or PDN connection attribute information in the Activate default EPS bearer context request. Note that the MME 40 may transmit the PCO including the seventh identification information and/or the TFT and/or the PDN connection ID.

Here, the Activate default EPS bearer context request message ID may be a message type representing the Activate default EPS bearer context request message.

The APN may be an APN to which the UE 10 is allowed to connect. More specifically, the APN may be the APN 1. The APN 1 may be an APN that is allowed to establish the multi-access PDN connection. The MME 40 may include the APN 1 in the Activate default EPS bearer context request.

The PDN Address may be an IP address assigned to the UE 10. For example, the PDN Address may be an IPv4 address, or an interface ID for constituting an IPv6 address.

The EPS QoS may be a state representing the QoS of the EPS bearer.

The PDN connection attribute information may be information indicating that the PDN connection established in the present PDN connectivity procedure is the multi-access PDN connection, and/or information indicating that user data transmitted/received by using the PDN connection established in the present PDN connectivity procedure is allowed to be transmitted/received through the access network A and the access network B, and/or information indicating that the PDN connection established in the present PDN connectivity procedure is the multi-access PDN connection of the operation mode indicated by the seventh identification information.

Note that the UE 10 may transmit the Activate default EPS bearer context request message that further includes a connectivity type indicating the type of PDN connection and/or WLAN offload permission information (WLAN offload acceptability) indicating whether or not the WLAN offload can be performed. Furthermore, the MME 40 may transmit the connectivity type or the WLAN offload permission information including the PDN connection attribute information.

The ESM Cause may be information representing that the PDN type of the PDN Address assigned to the UE 10 is different from the PDN type requested by the UE 10 in the PDN connectivity request.

Note that the MME 40 and/or the PGW 30 may include the seventh identification information in the PCO. However, in a case that the MME 40 and/or the PGW 30 includes the seventh identification information in the PCO, the MME 40 and/or the PGW 30 does not include the IFOM support. In contrast, in a case that the MME 40 and/or the PGW 30 includes the IFOM support in the PCO, the MME 40 and/or the PGW 30 does not include the seventh identification information. As described above, a configuration may be made in which whether to use the switching of the communication path based on the NBIFOM or to use the switching of the communication path based on the IFOM is clearly defined by disabling both of the seventh identification information and the IFOM support.

The eNB 45 receives the Activate default EPS bearer context request transmitted by the MME 40. Based on the reception of the Activate default EPS bearer context request, the eNB 45 transfers the Activate default EPS bearer context request to the UE 10.

The eNB 45 may transmit, to the UE 10, at least an RRC Connection Reconfiguration, together with the Activate default EPS bearer context request (S1916).

The UE 10 receives the RRC Connection Reconfiguration transmitted by the eNB 45. Furthermore, the UE 10 receives the Activate default EPS bearer context request that is transmitted by the MME 40 and transferred by the eNB 45.

Based on the reception of the RRC Connection Reconfiguration, the UE 10 transmits an RRC Connection Reconfiguration Complete to the eNB 45 (S1918).

The eNB 45 receives the RRC Connection Reconfiguration Complete transmitted by the UE 10. Based on the RRC Connection Reconfiguration Complete, the eNB 45 transmits a bearer configuration to the MME 40 (S1920).

The MME 40 receives the bearer configuration transmitted by the eNB 45.

Based on the reception of the Activate default EPS bearer context request and/or the seventh identification information included in the Activate default EPS bearer context request, the UE 10 transmits an Activate default EPS bearer context accept to the MME 40 (S1922) (S1924).

The UE 10 may transmit the Activate default EPS bearer context accept including at least an Activate default EPS bearer context accept message identity (Activate default EPS bearer context accept message ID), the Procedure transaction ID, the Protocol discriminator, and the EPS bearer ID.

Furthermore, the UE 10 may include the PCO in the Activate default EPS bearer context accept.

Here, the Activate default EPS bearer context accept message ID may be a message type representing the Activate default EPS bearer context accept mess age.

After the first PDN connectivity procedure is completed, the UE 10 and the PGW 30 establish the first PDN connection of the NBIFOM operation mode requested by the UE 10. Based on the reception of the Activate default EPS bearer context request and/or the PDN connection attribute information and/or the seventh identification information, the UE 10 may identify that the established PDN connection is the multi-access PDN connection of the NBIFOM operation mode requested by the UE 10. Based on the establishment of the first PDN connection, the UE 10 and the PGW 30 determine a PDN connection and/or a transfer path (such as an EPS bearer) for transmitting/receiving the IP flow by using the TFT, and transmit/receive user data corresponding to the IP flow identified by the TFT. More specifically, the UE 10 and the PGW 30 transmit/receive a flow identified by the TFT by using the first PDN connection.

Note that in the example of the first PDN connectivity procedure, a case has been described in which the transmission/reception of the TFT is included in the PDN connectivity procedure; however, the first PDN connectivity procedure is not limited to this case. The transmission/reception of the TFT may be performed after the multi-access PDN connection is established.

Therefore, the UE 10 and the MME 40 may transmit/receive the TFT that is not included in the PDN connectivity request and/or the Activate default EPS bearer context request, and establish the multi-access PDN connection. In other words, at a point in time when the PDN connection is established, there may be no IP flow transmitting/receiving user data by using the PDN connection. In this case, the UE 10 and the MME 40 transmit the TFT after the multi-access PDN connection is established. More specifically, in a case that the PDN connection of the UE-Initiated mode is established, the UE 10 may transmit the TFT to the MME 40 via the eNB 45. In addition, the MME 40 receives the TFT from the UE 10 and transmits the TFT to the PGW 30 via the SGW 35. Thus, the UE 10 and the PGW 30 can determine a PDN connection and/or a transfer path (such as an EPS bearer) for transmitting/receiving the IP flow by using the TFT, and transmit/receive user data corresponding to the IP flow identified by the TFT.

On the other hand, in a case that the PDN connection of the Network-Initiated mode is established, the PGW 30 may transmit the TFT to the MME 40 via the SGW 35. Here, the PGW 30 may receive, from the PCRF 60, the TFT determined based on the operator policy. In addition, the MME 40 receives the TFT from the PGW 30 via the SGW 35 and transmits the TFT to the UE 10 via the eNB 45. Thus, the UE 10 and the PGW 30 can determine a PDN connection and/or a transfer path (such as an EPS bearer) for transmitting/receiving the IP flow by using the TFT, and transmit/receive user data corresponding to the IP flow identified by the TFT.

Note that in a case that the multi PDN connection is established, a procedure for adding a new transfer path can be performed. On the other hand, in a case that the single-access PDN connection is established, the transfer path can be changed, but a procedure for adding a transfer path cannot be performed.

1.4.2. Example of Second PDN Connectivity Procedure

An example of the second PDN connectivity procedure will be described with reference to FIG. 17.

The UE 10 first transmits a PDN connectivity request to the MME 40 via the eNB 45 (S2002). The UE 10 may transmit the PDN connectivity request including at least a PDN connectivity request message identity (PDN connectivity request message ID), a Procedure transaction identity (Procedure transaction ID), a Request type (request type), a PDN type, a Protocol discriminator, and an EPS bearer identify (EPS bearer ID). Furthermore, the UE 10 may include at least the first identification information and/or the fifth identification information in the PDN connectivity request. Moreover, the UE 10 may include the Access Point Name (APN) and/or Protocol Configuration Options (PCOs) and/or the Traffic Flow Templates (TFTs) in the PDN connectivity request. Note that the UE 10 may transmit the PCO including the first identification information and/or the fifth identification information and/or the TFT.

Here, the first identification information may be the UE NBIFOM capability indicating that the UE 10 supports the NBIFOM. Note that the NBIFOM capability may be information indicating the possession of functionality for establishing the multi-access PDN connection.

Here, the fifth identification information may be the Mode Indication indicating an NBIFOM operation mode for the multi-access PDN connection whose establishment is requested by the UE 10. Note that the UE 10 may include the UE-Initiated mode or the Network-Initiated mode in the fifth identification information.

Note that the first identification information may be the fifth identification information. More specifically, the UE 10 may represent, by transmitting the Mode Indication, that the UE 10 supports the NBIFOM.

As described above, the UE 10 may transmit the PDN connectivity request including the first identification information and/or fifth identification information to request the establishment of the multi-access PDN connection.

The PDN connectivity request message ID may be a message type indicating the PDN connectivity request message.

The Procedure transaction ID may be information for identifying the PDN connectivity procedure.

The APN may be an APN to which the UE 10 requests a connection. More specifically, the APN may be the APN 1. The UE 10 may include the APN 1 to establish the multi-access PDN connection. Here, the APN 1 may be an APN that is allowed to establish the multi-access PDN connection and/or an APN that is allowed to perform communication based on the NBIFOM.

The request type may be information for identifying the type of the requested PDN connectivity procedure. For example, the UE 10 performs an initial connection by using the APN 1, so the request type may be the type indicating Attach, rather than the type indicating handover.

The PDN type may indicate an available IP version. For example, the PDN type may be IPv4, IPv6, or IPv4v6. The Protocol discriminator may be a discriminator representing the type of protocol used for transmitting/receiving the PDN connectivity request.

The EPS bearer ID may be information for identifying the EPS bearer. The EPS bearer ID may be assigned by the MME 40.

The PCO may be protocol information associated with the PDN connection. Furthermore, the PCO may include identification information on the request. Note that the UE 10 may transmit the PCO including the first identification information.

The TFT may be information for identifying an IP flow that performs communication by using the PDN connection established in the present PDN connectivity procedure. Note that the IP flow to be identified may vary for each application. Thus, user data of a specific application can be identified by the TFT.

More specifically, the TFT may be constituted of five-tuple, or may be constituted of identification information such as the application ID. Note that the five-tuple may be constituted of a combination of one or more of a source IP address, a destination IP address, a source port number, a destination port number, and a protocol number.

In a case that the UE 10 requests the establishment of the multi-access PDN connection of the UE-Initiated mode, the UE 10 may include the TFT in the PDN connectivity request. Alternatively, in a case that the UE 10 requests the establishment of the multi-access PDN connection of the Network-Initiated mode, the UE 10 need not include the TFT in the PDN connectivity request.

In other words, in a case that the UE 10 includes the UE-Initiated mode in the fifth identification information, the UE 10 may include the TFT in the PDN connectivity request. Alternatively, in a case that the UE 10 includes the Network-Initiated mode in the fifth identification information, the UE 10 need not include the TFT in the PDN connectivity request.

Note that, in the related art, the UE 10 can perform transmission with information indicating the IFOM support included in the PCO. Here, the IFOM support is identification information representing that the IP Flow Mobility (IFOM) is supported. Furthermore, the IFOM is a technique for switching a communication path of a specific IP flow by using the Dual Stack Mobile IPv6 (DSMIPv6) protocol. Thus, including the information indicating the IFOM support in the PCO allows the UE 10 to switch the access network through which the communication of a specific IP flow is performed.

In the present embodiment, in a case that the UE 10 includes the first identification information and/or fifth identification information in the PCO, the UE 10 does not include the IFOM support. In contrast, in a case that the UE 10 includes the IFOM support in the PCO, the UE 10 does not include the fifth identification information. As described above, a configuration may be made in which whether to use the switching of the communication path based on the NBIFOM or to use the switching of the communication path based on the IFOM is clearly defined by disabling both of the first identification information and the IFOM support.

Thus, the UE 10 can establish either the PDN connection supporting the IFOM or the PDN connection supporting the NBIFOM, in the establishment procedure of a single PDN connection. In other words, the single PDN connection is the PDN connection supporting the NBIFOM, the PDN connection supporting the IFOM, or the single-access PDN connection. The MME 40 receives the PDN connectivity request transmitted by the UE 10.

In response to the PDN connectivity request received from the UE 10, the MME 40 may transmit a PDN connectivity reject to the UE 10 via the eNB 45 (S2004).

The MME 40 may determine to transmit the PDN connectivity reject based on the operator policy. For example, in a case that the operator policy does not allow the UE 10 to establish the multi-access PDN connection, or in a case that the operator policy does not allow the NBIFOM operation mode requested by the UE 10, the MME 40 may transmit the PDN connectivity reject to the UE 10.

More specifically, in a case that the UE 10 requests the establishment of the PDN connection of the UE-Initiated mode but the operator policy does not allow the establishment of the PDN connection in the UE-Initiated mode, the MME 40 may transmit the PDN connectivity reject to the UE 10. Furthermore, in a case that the UE 10 requests the establishment of the PDN connection of the Network-Initiated mode but the operator policy does not allow the establishment of the PDN connection in the Network-Initiated mode, the MME 40 may transmit the PDN connectivity reject to the UE 10.

Based on the reception of the PDN connectivity request and/or the fifth identification information included in the PDN connectivity request, the MME 40 may transmit the PDN connectivity reject including at least a PDN connectivity reject message identity (PDN connectivity reject message ID), the Protocol discriminator, the EPS bearer ID, the Procedure transaction ID, and the ESM Cause. Furthermore, the MME 40 may include at least the seventh identification information and/or eighth identification information in the PDN connectivity reject. Moreover, the MME 40 may include the PCO and/or a T3396 value in the PDN connectivity reject. Note that the MME 40 may transmit the PCO including the seventh identification information and/or the eighth identification information.

Here, the seventh identification information may be the Allowed Mode representing the NBIFOM operation mode that is allowed for the multi-access PDN connection to be established. In other words, the fifth identification information is an operation mode requested by the UE 10, whereas the seventh identification information may be an operation mode allowed by the operator.

Note that the MME 40 may determine the Allowed Mode and the seventh identification information based on the operator policy. For example, a policy that allows the establishment of only the PDN connection of the UE-Initiated mode, a policy that allows the establishment of only the PDN connection of the Network-Initiated mode, a policy that allows the establishment of the PDN connection of both of the modes, a policy that prohibits the establishment of the PDN connection of both of the modes, and the like may be managed.

Note that the MME 40 may acquire the operator policy from the AAA 55, the HSS, and the like. Alternatively, an operator policy created by an administrator may be stored.

In addition, for the operator policy, a policy different for each subscriber may be managed. Alternatively, a policy different for each APN may be managed. For example, a different Allowed Mode for the PDN connection to be established for each APN may be managed.

In the present example, based on the Allowed Mode, a case will be described in which the establishment of the PDN connection of the NBIFOM operation mode included in the fifth identification information is not allowed.

Thus, the MME 40 does not allow the establishment of the PDN connection based on the NBIFOM operation mode included in the fifth identification information, and includes, in the seventh identification information, an operation mode that is a mode allowed by the Allowed Mode and is different from the fifth identification information.

In other words, in a case that the UE-Initiated mode is included in the fifth identification information and the Network-Initiated mode is allowed, the MME 40 may include the Network-Initiated mode in the seventh identification information. Alternatively, in a case that the Network-Initiated mode is included in the fifth identification information and the UE-Initiated mode is allowed, the MME 40 may include the UE-Initiated mode in the seventh identification information.

Note that in a case that the establishment of the PDN connection based on the operation mode different from the fifth identification information is not allowed, the MME 40 need not include the seventh identification information. In such a case, the MME 40 may transmit the PDN connectivity reject including cause information indicating that the Requested Operation Mode is not allowed.

As described above, based on the Allowed Mode, in a case that the establishment of the PDN connection of the NBIFOM operation mode included in the fifth identification information is not allowed, an operation mode that is different from the NBIFOM operation mode included in the fifth identification information and is allowed to establish the PDN connection may be regarded as the seventh identification information based on the Allowed Mode.

Furthermore, the eighth identification information may be a Rejected Mode representing the NBIFOM operation mode for the multi-access PDN connection rejected by the MME 40. Note that the MME 40 may include, in the eighth identification information, the same mode as the NBIFOM operation mode included in the fifth identification information.

In other words, in a case that the UE-Initiated mode is included in the fifth identification information, the PGW 30 and/or the PCRF 60 may include the UE-Initiated mode in the eighth identification information. Alternatively, in a case that the Network-Initiated mode is included in the fifth identification information, the PGW 30 and/or the PCRF 60 may include the Network-Initiated mode in the eighth identification information.

The PDN connectivity reject message ID may be a message type representing the PDN connectivity reject message. The ESM Cause may be information representing a reason why the PDN connectivity request is rejected.

The T3396 value may be a value of a T3396 timer included in a case that the ESM Cause represents insufficient resources or an inappropriate APN (missing or unknown APN).

The UE 10 receives the PDN connectivity reject transmitted by the MME 40. Based on the reception of the PDN connectivity reject and/or the seventh identification information and/or eighth identification information included in the PDN connectivity reject, the UE 10 may newly perform the PDN connectivity procedure (S2006).

The UE 10 may perform the PDN connectivity procedure including a mode different from the NBIFOM operation mode that is included in the fifth identification information in the PDN connectivity request.

Note that the UE 10 may regard the seventh identification information received from the MME 40 as the fifth identification information.

Alternatively, the UE 10 may regard the eighth identification information received from the MME 40 as the fifth identification information.

In other words, in a case that the UE 10 includes the UE-Initiated mode in the fifth identification information in the PDN connectivity request of the first time, the UE 10 may perform the PDN connectivity procedure including the Network-Initiated mode. Alternatively, in a case that the UE 10 includes the UE-Initiated mode in the fifth identification information in the PDN connectivity request of the first time, the UE 10 may perform the PDN connectivity procedure including the Network-Initiated mode.

In addition, in a case that the seventh identification information included in the PDN connectivity reject is the UE-Initiated mode, the UE 10 may perform the PDN connectivity procedure including the UE-Initiated mode. Alternatively, in a case that the seventh identification information included in the PDN connectivity reject is the Network-Initiated mode, the UE 10 may perform the PDN connectivity procedure including the Network-Initiated mode.

In addition, in a case that the eighth identification information included in the PDN connectivity reject is the UE-Initiated mode, the UE 10 may perform the PDN connectivity procedure including the Network-Initiated mode. Alternatively, in a case that the seventh identification information included in the PDN connectivity reject is the Network-Initiated mode, the UE 10 may perform the PDN connectivity procedure including the UE-Initiated mode.

Note that in a case that the UE 10 does not receive the seventh identification information and/or in a case that there is no any other operation mode allowed for the PDN connection and/or in a case that the establishment of the PDN connection of the other operation mode is not requested, the UE 10 need not newly initiate the PDN connectivity procedure.

Note that details of the PDN connectivity procedure may be similar to those of the PDN connectivity procedure described with reference to FIG. 16 in 1.4.1. Example of First PDN Connectivity Procedure. Therefore, the detailed description will be omitted.

After the second PDN connectivity procedure is completed, the UE 10 and the PGW 30 establish the first PDN connection of a mode different from the NBIFOM operation mode that the UE 10 initially requests. Based on the establishment of the first PDN connection, the UE 10 and the PGW 30 determine a PDN connection and/or a transfer path (such as an EPS bearer) for transmitting/receiving the IP flow by using the TFT, and transmit/receive user data corresponding to the IP flow identified by the TFT. More specifically, the UE 10 and the PGW 30 transmit/receive a flow identified by the TFT by using the first PDN connection.

Note that in the example of the second PDN connectivity procedure, a case has been described in which the transmission/reception of the TFT is included in the PDN connectivity procedure; however, the second PDN connectivity procedure is not limited to this case. The transmission/reception of the TFT may be performed after the multi-access PDN connection is established.

Therefore, the UE 10 and the MME 40 may transmit/receive the TFT that is not included in the PDN connectivity request and/or the Activate default EPS bearer context request, and establish the multi-access PDN connection. In other words, at a point in time when the PDN connection is established, there may be no IP flow transmitting/receiving user data by using the PDN connection. In this case, the UE 10 and the MME 40 transmit the TFT after the multi-access PDN connection is established.

More specifically, in a case that the PDN connection of the UE-Initiated mode is established, the UE 10 may transmit the TFT to the MME 40 via the eNB 45. In addition, the MME 40 receives the TFT from the UE 10 and transmits the TFT to the PGW 30 via the SGW 35. Thus, the UE 10 and the PGW 30 can determine a PDN connection and/or a transfer path (such as an EPS bearer) for transmitting/ receiving the IP flow by using the TFT, and transmit/receive user data corresponding to the IP flow identified by the TFT.

On the other hand, in a case that the PDN connection of the Network-Initiated mode is established, the PGW 30 may transmit the TFT to the MME 40 via the SGW 35. Here, the PGW 30 may receive, from the PCRF 60, the TFT determined based on the operator policy. In addition, the MME 40 receives the TFT from the PGW 30 via the SGW 35 and transmits the TFT to the UE 10 via the eNB 45. Thus, the UE 10 and the PGW 30 can determine a PDN connection and/or a transfer path (such as an EPS bearer) for transmitting/ receiving the IP flow by using the TFT, and transmit/receive user data corresponding to the IP flow identified by the TFT.

Note that in a case that the multi PDN connection is established, a procedure for adding a new transfer path can be performed. On the other hand, in a case that the single-access PDN connection is established, the transfer path can be changed, but a procedure for adding a transfer path cannot be performed.

1.4.3. Example of Third PDN Connectivity Procedure

An example of the third PDN connectivity procedure will be described with reference to FIG. 16.

The UE 10 first transmits a PDN connectivity request to the MME 40 MME 40 via the eNB 45 (S1902). The UE 10 may transmit the PDN connectivity request including at least a PDN connectivity request message identity (PDN connectivity request message ID), a Procedure transaction identity (Procedure transaction ID), a Request type (request type), a PDN type, a Protocol discriminator, and an EPS bearer identify (EPS bearer ID). Furthermore, the UE 10 may include at least the first identification information and/or the fifth identification information in the PDN connectivity request. Moreover, the UE 10 may include the Access Point Name (APN) and/or Protocol Configuration Options (PCOs) and/or the Traffic Flow Templates (TFTs) in the PDN connectivity request. Note that the UE 10 may transmit the PCO including the first identification information and/or the fifth identification information and/or the TFT.

Here, the first identification information may be the UE NBIFOM capability representing that the UE 10 supports the NBIFOM. Note that the NBIFOM capability may be information indicating the possession of functionality for establishing the multi-access PDN connection.

Furthermore, the fifth identification information may be a Mode Indication representing an NBIFOM operation mode for the multi-access PDN connection whose establishment is requested by the UE 10. Note that the UE 10 may include the UE-Initiated mode or the Network-Initiated mode in the fifth identification information.

Note that the first identification information may be the fifth identification information. More specifically, the UE 10 may represent, by transmitting the Mode Indication, that the UE 10 supports the NBIFOM.

As described above, the UE 10 may transmit the PDN connectivity request including the first identification information and/or fifth identification information to request the establishment of the multi-access PDN connection.

The PDN connectivity request message ID may be a message type representing the PDN connectivity request message.

The Procedure transaction ID may be information for identifying the PDN connectivity procedure.

The APN may be an APN to which the UE 10 requests a connection. More specifically, the APN may be the APN 1. The UE 10 may include the APN 1 to establish the multi-access PDN connection. Here, the APN 1 may be an APN that is allowed to establish the multi-access PDN connection and/or an APN that is allowed to perform communication based on the NBIFOM.

The request type may be information for identifying the type of the requested PDN connectivity procedure. For example, the UE 10 performs an initial connection by using the APN 1, so the request type may be the type indicating Attach, rather than the type indicating handover.

The PDN type may indicate an available IP version. For example, the PDN type may be IPv4, IPv6, or IPv4v6. The Protocol discriminator may be a discriminator representing the type of protocol used for transmitting/receiving the PDN connectivity request.

The EPS bearer ID may be information for identifying the EPS bearer. The EPS bearer ID may be assigned by the MME 40.

The PCO may be protocol information associated with the PDN connection. Furthermore, the PCO may include identification information on the request. Note that the UE 10 may transmit the PCO including the first identification information.

The TFT may be information for identifying an IP flow that performs communication by using the PDN connection established in the present PDN connectivity procedure. Note that the IP flow to be identified may vary for each application. Thus, user data of a specific application can be identified by the TFT.

More specifically, the TFT may be constituted of five-tuple, or may be constituted of identification information such as the application ID. Note that the five-tuple may be constituted of a combination of one or more of a source IP address, a destination IP address, a source port number, a destination port number, and a protocol number.

In a case that the UE 10 requests the establishment of the multi-access PDN connection of the UE-Initiated mode, the UE 10 may include the TFT in the PDN connectivity request. Alternatively, in a case that the UE 10 requests the establishment of the multi-access PDN connection of the Network-Initiated mode, the UE 10 need not include the TFT in the PDN connectivity request.

In other words, in a case that the UE 10 includes the UE-Initiated mode in the fifth identification information, the UE 10 may include the TFT in the PDN connectivity request. Alternatively, in a case that the UE 10 includes the Network-Initiated mode in the fifth identification information, the UE 10 need not include the TFT in the PDN connectivity request.

Note that, in the related art, the UE 10 can perform transmission, with information indicating the IFOM support included in the PCO. Here, the IFOM support is identification information indicating that the IP Flow Mobility (IFOM) is supported. Furthermore, the IFOM is a technique for switching a communication path of a specific IP flow by using the Dual Stack Mobile IPv6 (DSMIPv6) protocol. Thus, including the information indicating the IFOM support in the PCO allows the UE 10 to switch the access network through which the communication of a specific IP flow is performed.

In the present embodiment, in a case that the UE 10 includes the first identification information and/or fifth identification information in the PCO, the UE 10 does not include the IFOM support. In contrast, in a case that the UE 10 includes the IFOM support in the PCO, the UE 10 does not include either the first identification information or the fifth identification information. As described above, a configuration may be made in which whether to use the switching of the communication path based on the NBIFOM or to use the switching of the communication path based on the IFOM is clearly defined by disabling both of the first identification information and the IFOM support.

Thus, the UE 10 can establish either the PDN connection supporting the IFOM or the PDN connection supporting the NBIFOM, in the establishment procedure of a single PDN connection. In other words, the single PDN connection is the PDN connection supporting the NBIFOM, the PDN connection supporting the IFOM, or the single-access PDN connection.

The MME 40 receives the PDN connectivity request transmitted by the UE 10. Based on the reception of the PDN connectivity request, and/or the first identification information included in the PDN connectivity request, and/or the fifth identification information included in the PDN connectivity request, the MME 40 transmits a Create Session Request to the SGW 35 (S1904).

Based on the reception of the PDN connectivity request and/or the first identification information included in the PDN connectivity request, the MME 40 may transmit the Create Session Request including at least the first identification information.

Based on the reception of the PDN connectivity request and/or the fifth identification information included in the PDN connectivity request, the MME 40 may transmit the Create Session Request including at least the fifth identification information. The MME 40 may include the TFT in the Create Session Request, based on the reception of the TFT transmitted by the UE 10.

Furthermore, the TFT may be information for identifying an IP flow that performs communication by using the PDN connection established in the present PDN connectivity procedure. Note that the IP flow to be identified may vary for each application. Thus, user data of a specific application can be identified by the TFT.

More specifically, the TFT may be constituted of five-tuple, or may be constituted of identification information such as the application ID. Note that the five-tuple may be constituted of a combination of one or more of a source IP address, a destination IP address, a source port number, a destination port number, and a protocol number.

In a case that the MME 40 requests the establishment of the multi-access PDN connection of the UE-Initiated mode, the MME 40 may include the TFT in the Create Session Request. Alternatively, in a case that the MME 40 requests the establishment of the multi-access PDN connection of the Network-Initiated mode, the MME 40 need not include the TFT in the Create Session Request.

In other words, in a case that the UE-Initiated mode is included in the fifth identification information included in the PDN connectivity request, the MME 40 may include the TFT in the Create Session Request. Alternatively, in a case that the Network-Initiated mode is included in the fifth identification information included in the PDN connectivity request, the MME 40 need not include the TFT in the Create Session Request.

Here, the MME 40 may determine, based on the fifth identification information, whether to request the establishment of the multi-access PDN connection of the UE-Initiated mode or request the establishment of the multi-access PDN connection of the Network-Initiated mode.

Note that in a case that the first identification information is not included in the PDN connectivity request, the MME 40 may transmit the Create Session Request without including the first identification information. Furthermore, in a case that the fifth identification information is not included in the PDN connectivity request, the MME 40 may transmit the Create Session Request without including the fifth identification information. Moreover, in a case that neither the first identification information nor the fifth identification information is included in the PDN connectivity request, the MME 40 may perform a procedure for establishing the single-access PDN connection.

The SGW 35 receives the Create Session Request transmitted by the MME 40. Based on the reception of the Create Session Request and/or the fifth identification information included in the Create Session Request, the SGW 35 transmits the Create Session Request to the PGW 30 (S1906).

Based on the reception of the Create Session Request and/or the fifth identification information included in the Create Session Request, the SGW 35 may transmit the Create Session Request including at least the fifth identification information. Furthermore, the SGW 35 may include the TFT in the Create Session Request.

Furthermore, the TFT may be information for identifying an IP flow that performs communication by using the PDN connection established in the present PDN connectivity procedure. Note that the IP flow to be identified may vary for each application. Thus, user data of a specific application can be identified by the TFT.

More specifically, the TFT may be constituted of five-tuple, or may be constituted of identification information such as the application ID. Note that the five-tuple may be constituted of a combination of one or more of a source IP address, a destination IP address, a source port number, a destination port number, and a protocol number.

In a case that the SGW 35 requests the establishment of the multi-access PDN connection of the UE-Initiated mode, the SGW 35 may include the TFT in the Create Session Request. Alternatively, in a case that the MME 40 requests the establishment of the multi-access PDN connection of the Network-Initiated mode, the MME 40 need not include the TFT in the Create Session Request.

In other words, in a case that the UE-Initiated mode is included in the fifth identification information included in the Create Session Request, the SGW 35 may include the TFT in the Create Session Request. Alternatively, in a case that the Network-Initiated mode is included in the fifth identification information included in the Create Session Request, the SGW 35 need not include the TFT in the Create Session Request.

Here, the SGW 35 may determine, based on the fifth identification information, whether to request the establishment of the multi-access PDN connection of the UE-Initiated mode or request the establishment of the multi-access PDN connection of the Network-Initiated mode.

Note that in a case that the first identification information is not included in the Create Session Request, the SGW 35 may transmit the Create Session Request without including the first identification information. Furthermore, in a case that the fifth identification information is not included in the Create Session Request, the SGW 35 may transmit the Create Session Request without including the fifth identification information. Moreover, in a case that neither the first identification information nor the fifth identification information is included in the Create Session Request, the SGW 35 may perform a procedure for establishing the single-access PDN connection.

The PGW 30 receives the Create Session Request transmitted by the SGW 35. Based on the reception of the Create Session Request and/or the fifth identification information included in the Create Session Request, the PGW 30 may perform an IP-CAN session update procedure with the PCRF 60 (S1908).

The PGW 30 may transmit, to the PCRF 60, a control message in the IP-CAN session procedure, the control message including information indicating whether the PDN connection to be established is the multi-access PDN connection or the single-access PDN connection, and/or the fifth identification information.

More specifically, in a case that the multi-access PDN connection is to be established, the PGW 30 transmits, to the PCRF 60, the information indicating the access network A, the PDN connection ID, the information indicating that the PDN connection is the multi-access PDN connection, and the first identification information and/or fifth identification information. Alternatively, in a case that the single-access PDN connection is to be established, the PGW 30 transmits, to the PCRF 60, the information indicating the access network A, the PDN connection ID, and the information indicating that the PDN connection is the single-access PDN connection.

Note that the PDN connection ID may be an ID assigned when the PGW 30 establishes the PDN connection in the PDN connectivity procedure, or may be information for uniquely identifying the PDN connection that the UE 10 establishes with the PGW 30.

Note that the PGW 30 may perform the IP-CAN session update procedure to notify the PCRF 60 of information on the UE 10 and/or eNB 45 and/or MME 40 and/or SGW 35.

Furthermore, based on the reception of the fifth identification information, the PCRF 60 may transmit, to the PGW 30, a control message in the IP-CAN session update procedure with the PGW 30, the control message including at least seventh identification information. The detailed description of the seventh identification information will be described below.

Note that the PCRF 60 may perform the IP-CAN session update procedure to notify the PGW 30 of the charging information and/or the QoS control information and/or the routing information.

Based on the reception of the Create Session Request or the completion of the IP-CAN session update procedure, and/or the fifth identification information included in the Create Session Request and/or the seventh identification information included in the IP-CAN session update procedure, the PGW 30 transmits a Create Session Response to the MME 40 (S1910).

Based on the reception of the Create Session Request or the completion of the IP-CAN session update procedure, and/or the fifth identification information included in the Create Session Request and/or the seventh identification information included in the IP-CAN session update procedure, the PGW 30 may transmit the Create Session Response including at least the seventh identification information.

Note that a method by which the PGW 30 acquires the seventh identification information is not limited to the above-described method for acquiring the seventh identification information from the PCRF 60 in the IP-CAN session update procedure, and another example may be employed. For example, the PGW 30 may create the seventh identification information and transmit the Create Session Response including the seventh identification information, without acquiring the seventh identification information from the PCRF 60 in the IP-CAN session update procedure. Here, the seventh identification information may be the Allowed Mode indicating the NBIFOM operation mode that is allowed for the multi-access PDN connection to be established. In other words, the fifth identification information is an operation mode requested by the UE 10, whereas the seventh identification information may be an operation mode allowed by the operator.

Note that the PCRF 60 or the PGW 30 may determine the Allowed Mode and the seventh identification information based on the operator policy. For example, a policy that allows the establishment of only the PDN connection of the UE-Initiated mode, a policy that allows the establishment of only the PDN connection of the Network-Initiated mode, a policy that allows the establishment of the PDN connection of both of the modes, a policy that prohibits the establishment of the PDN connection of both of the modes, and the like may be managed.

Note that the PCRF 60 or the PGW 30 may acquire the operator policy from the HSS and the like. Alternatively, an operator policy created by an administrator may be stored. In addition, for the operator policy, a policy different for each subscriber may be managed. Alternatively, a policy different for each APN may be managed. For example, a different Allowed Mode for the PDN connection to be established for each APN may be managed.

In the present example, based on the Allowed Mode, a case will be described in which the establishment of the PDN connection of the NBIFOM operation mode included in the fifth identification information is not allowed.

Thus, the PCRF 60 or the PGW 30 does not allow the establishment of the PDN connection based on the NBIFOM operation mode included in the fifth identification information, and includes, in the seventh identification information, an operation mode that is a mode allowed by the Allowed Mode and is different from the fifth identification information.

In other words, in a case that the UE-Initiated mode is included in the fifth identification information and the Network-Initiated mode is allowed, the PCRF 60 or the PGW 30 may include the Network-Initiated mode in the seventh identification information. Alternatively, in a case that the Network-Initiated mode is included in the fifth identification information and the UE-Initiated mode is allowed, the PCRF 60 or the PGW 30 may include the UE-Initiated mode in the seventh identification information.

In a case that the establishment of the PDN connection based on the operation mode different from the fifth identification information is not allowed, the PCRF 60 need not notify the PGW 30 of the seventh identification information.

In a case that the establishment of the PDN connection based on the operation mode different from the fifth identification information is not allowed, the PCRF 60 may notify the PGW 30 that there is no allowed operation.

In a case that the establishment of the PDN connection based on the operation mode different from the fifth identification information is not allowed, the PCRF 60 may transmit, to the PGW 30, the cause information indicating that the Requested Operation Mode is not allowed.

In a case that the establishment of the PDN connection based on the operation mode different from the fifth identification information is not allowed, the PGW 30 need not notify, via the SGW 35, the MME 40 of the seventh identification information.

In a case that the establishment of the PDN connection based on the operation mode different from the fifth identification information is not allowed, the PGW 30 may transmit, to the MME 40 via the SGW 35, the Create Session Response including the cause information indicating that the Requested Operation Mode is not allowed.

In a case that the establishment of the PDN connection based on the operation mode different from the fifth identification information is not allowed, the PGW 30 may notify the MME 40 that there is no allowed operation.

As described above, based on the Allowed Mode, in a case that the establishment of the PDN connection of the NBIFOM operation mode included in the fifth identification information is not allowed, an operation mode that is different from the NBIFOM operation mode included in the fifth identification information and is allowed to establish the PDN connection may be regarded as the seventh identification information based on the Allowed Mode.

Furthermore, the PGW 30 may include the PDN Address and/or the PDN connection ID and/or the TFT in the Create Session Response.

The PDN Address may be an IP address assigned to the UE 10. For example, the PDN Address may be an IPv4 address, or an IPv6 prefix and an interface ID for constituting an IPv6 address. Here, the PGW 30 may assign the IP address of the UE 10. Moreover, the PGW 30 may include the IP address assigned to the UE 10 in the PDN Address.

Furthermore, the PDN connection ID may be information for uniquely identifying the PDN connection established between the UE 10 and the PGW 30. The PDN connection ID may be assigned by the PGW 30, or may be assigned by the MME 40. In other words, the PGW 30 may assign the PDN connection ID.

The SGW 35 receives the Create Session Response transmitted by the PGW 30. Based on the reception of the Create Session Response and/or the seventh identification information included in the Create Session Response, the SGW 35 transmits the Create Session Response to the MME 40 (S1912).

Based on the reception of the Create Session Response and/or the seventh identification information included in the Create Session Response, the SGW 35 may transmit the Create Session Response including at least the seventh identification information.

Furthermore, the SGW 35 may include the PDN Address and/or the PDN connection ID and/or the TFT in the session request response.

The MME 40 receives the Create Session Response transmitted by the SGW 35. Based on the reception of the Create Session Response and/or the seventh identification information included in the Create Session Response, the MME 40 transmits an Activate default EPS bearer context request to the eNB 45 (S1914).

Based on the reception of the Create Session Response and/or the seventh identification information included in the Create Session Response, the MME 40 may transmit the Activate default EPS bearer context request including at least the Activate default EPS bearer context request message identity (Activate default EPS bearer context request message ID), the Procedure transaction ID, the APN, the PDN Address, the Protocol discriminator, the EPS bearer ID, and the EPS QoS. Furthermore, the MME 40 may include at least the seventh identification information in the Activate default EPS bearer context request. Moreover, the MME 40 may include the PCO and/or an ESM Cause and/or the TFT and/or the PDN connection ID and/or PDN connection attribute information in the Activate default EPS bearer context request. Note that the MME 40 may transmit the PCO including the seventh identification information and/or the TFT and/or the PDN connection ID. Here, the Activate default EPS bearer context request message ID may be a message type representing the Activate default EPS bearer context request message.

The APN may be an APN to which the UE 10 is allowed to connect. More specifically, the APN may be the APN 1. The APN 1 may be an APN that is allowed to establish the multi-access PDN connection. The MME 40 may include the APN 1 in the Activate default EPS bearer context request.

The PDN Address may be an IP address assigned to the UE 10. For example, the PDN Address may be an IPv4 address, or an interface ID for constituting an IPv6 address. The EPS QoS may be a state indicating the QoS of the EPS bearer.

The PDN connection attribute information may be information indicating that the PDN connection established in the present PDN connectivity procedure is the multi-access PDN connection, and/or information indicating that user data transmitted/received by using the PDN connection established in the present PDN connectivity procedure is allowed to be transmitted/received through the access network A and the access network B, and/or information indicating that the PDN connection established in the present PDN connectivity procedure is the multi-access PDN connection of the operation mode indicated by the seventh identification information.

Note that the UE 10 may transmit the Activate default EPS bearer context request message that further includes a connectivity type indicating the type of PDN connection and/or WLAN offload permission information (WLAN offload acceptability) indicating whether or not the WLAN offload can be performed. Furthermore, the MME 40 may transmit the connectivity type or the WLAN offload permission information including the PDN connection attribute information.

The ESM Cause may include information indicating that the PDN type of the PDN Address assigned to the UE 10 is different from the PDN type requested by the UE 10 in the PDN connectivity request. Additionally/alternatively, the EMS Cause may include information representing that the PDN connection established in the present PDN connectivity procedure is the multi-access PDN connection of an NBIFOM operation mode different from the NBIFOM operation mode requested by the UE 10.

Note that the MME 40 and/or the PGW 30 may include the seventh identification information in the PCO. However, in a case that the MME 40 and/or the PGW 30 includes the seventh identification information in the PCO, the MME 40 and/or the PGW 30 does not include the IFOM support. In contrast, in a case that the MME 40 and/or the PGW 30 includes the IFOM support in the PCO, the MME 40 and/or the PGW 30 does not include the seventh identification information. As described above, a configuration may be made in which whether to use the switching of the communication path based on the NBIFOM or to use the switching of the communication path based on the IFOM is clearly defined by disabling both of the seventh identification information and the IFOM support.

Note that the UE 10 may transmit the Activate default EPS bearer context request message that further includes a connectivity type indicating the type of PDN connection and/or WLAN offload permission information (WLAN offload acceptability) indicating whether or not the WLAN offload can be performed. Furthermore, the MME 40 may transmit the connectivity type or the WLAN offload permission information including the PDN connection attribute information.

The eNB 45 receives the Activate default EPS bearer context request transmitted by the MME 40. Based on the reception of the Activate default EPS bearer context request, the eNB 45 transfers the Activate default EPS bearer context request to the UE 10.

The eNB 45 may transmit, to the UE 10, at least an RRC Connection Reconfiguration, together with the Activate default EPS bearer context request (S1916).

The UE 10 receives the RRC Connection Reconfiguration transmitted by the eNB 45. Furthermore, the UE 10 receives the Activate default EPS bearer context request that is transmitted by the MME 40 and transferred by the eNB 45.

Based on the reception of the RRC Connection Reconfiguration, the UE 10 transmits an RRC Connection Reconfiguration Complete to the eNB 45 (S1918).

The eNB 45 receives the RRC Connection Reconfiguration Complete transmitted by the UE 10. Based on the RRC Connection Reconfiguration Complete, the eNB 45 transmits a bearer configuration to the MME 40 (S1920).

The MME 40 receives the bearer configuration transmitted by the eNB 45. Based on the reception of the Activate default EPS bearer context request and/or the seventh identification information included in the Activate default EPS bearer context request, the UE 10 may transmit an Activate default EPS bearer context accept to the MME 40 (S1922) (S1924).

The UE 10 may transmit the Activate default EPS bearer context accept including at least an Activate default EPS bearer context accept message identity (Activate default EPS bearer context accept message ID), the Procedure transaction ID, the Protocol discriminator, and the EPS bearer ID.

Furthermore, the UE 10 may include the PCO in the Activate default EPS bearer context accept and/or an Activate default EPS bearer context reject.

Here, the Activate default EPS bearer context accept message ID may be a message type representing the Activate default EPS bearer context accept mess age.

After the third PDN connectivity procedure is completed, the UE 10 and the PGW 30 establish the first PDN connection of a mode different from the NBIFOM operation mode requested by the UE 10. Based on the reception of the Activate default EPS bearer context request and/or the PDN connection attribute information and/or the seventh identification information and/or the ESM Cause, the UE 10 may identify that the established PDN connection is the multi-access PDN connection of an operation mode different from the NBIFOM operation mode requested by the UE 10. Based on the establishment of the first PDN connection, the UE 10 and the PGW 30 determine a PDN connection and/or a transfer path (such as an EPS bearer) for transmitting/receiving the IP flow by using the TFT, and transmit/receive user data corresponding to the IP flow identified by the TFT. More specifically, the UE 10 and the PGW 30 transmit/receive a flow identified by the TFT by using the first PDN connection.

Note that in the example of the third PDN connectivity procedure, a case has been described in which the transmission/reception of the TFT is included in the PDN connectivity procedure; however, the third PDN connectivity procedure is not limited to this case. The transmission/reception of the TFT may be performed after the multi-access PDN connection is established.

Therefore, the UE 10 and the MME 40 may transmit/receive the TFT that is not included in the PDN connectivity request and/or the Activate default EPS bearer context request, and establish the multi-access PDN connection. In other words, at a point in time when the PDN connection is established, there may be no IP flow transmitting/receiving user data by using the PDN connection. In this case, the UE 10 and the MME 40 transmit the TFT after the multi-access PDN connection is established.

More specifically, in a case that the PDN connection of the UE-Initiated mode is established, the UE 10 may transmit the TFT to the MME 40 via the eNB 45. In addition, the MME 40 receives the TFT from the UE 10 and transmits the TFT to the PGW 30 via the SGW 35. Thus, the UE 10 and the PGW 30 can determine a PDN connection and/or a transfer path (such as an EPS bearer) for transmitting/receiving the IP flow by using the TFT, and transmit/receive user data corresponding to the IP flow identified by the TFT.

On the other hand, in a case that the PDN connection of the Network-Initiated mode is established, the PGW 30 may transmit the TFT to the MME 40 via the SGW 35. Here, the PGW 30 may receive, from the PCRF 60, the TFT determined based on the operator policy. In addition, the MME 40 receives the TFT from the PGW 30 via the SGW 35 and transmits the TFT to the UE 10 via the eNB 45. Thus, the UE 10 and the PGW 30 can determine a PDN connection and/or a transfer path (such as an EPS bearer) for transmitting/receiving the IP flow by using the TFT, and transmit/receive user data corresponding to the IP flow identified by the TFT.

Furthermore, in the example of the third PDN connectivity procedure, a case has been described in which the UE 10 and the PGW 30 establish the first PDN connection of a mode different from the NBIFOM operation mode requested by the UE 10; however, the third PDN connectivity procedure is not limited to this case. The UE 10 may reject the establishment of the first PDN connection of the NBIFOM operation mode different from the request.

For example, in a case that the UE 10 does not support the NBIFOM operation mode for the established first PDN connection and/or in a case that the NBIFOM operation mode for the established first PDN connection does not comply with the policy of the UE 10, the UE 10 may reject the establishment of the first PDN connection of the NBIFOM operation mode different from the request.

In more detail, based on the reception of the Activate default EPS bearer context request and/or the seventh identification information included in the Activate default EPS bearer context request and/or the PDN connection attribute information and/or the policy of the UE 10, the UE 10 may transmit the Activate default EPS bearer context reject to the MME 40 via the eNB 45.

The UE 10 may transmit the Activate default EPS bearer context reject including at least an Activate default EPS bearer context reject message identity (Activate default EPS bearer context reject message ID), the Procedure transaction ID, the Protocol discriminator, the EPS bearer ID, and the ESM Cause. Furthermore, the UE 10 may further include fourth identification information in the Activate default EPS bearer context reject. Furthermore, the UE 10 may further include the PCO in the Activate default EPS bearer context reject. Note that the UE 10 may transmit the PCO including the fourth identification information.

The fourth identification information may be information representing that the UE 10 does not support the NBIFOM operation mode for the established first PDN connection and/or information representing that the NBIFOM operation mode for the established first PDN connection does not comply with the policy of the UE 10.

The Activate default EPS bearer context reject message ID may be the message type representing the Activate default EPS bearer context reject message.

The ESM Cause may be information representing a reason why the Activate default EPS bearer context request is rejected. Here, the UE 10 may notify the UE 10 of the fourth identification information included in the ESM Cause.

The MME 40 may receive the Activate default EPS bearer context reject transmitted by the UE 10. Based on the reception of the Activate default EPS bearer context reject and/or the fourth identification information included in the Activate default EPS bearer context reject, the MME 40 may delete the EPS bearer context, held by the MME 40, relating to the established PDN connection. Furthermore, the MME 40 may transmit, to the SGW 35, the fourth identification information included in the Activate default EPS bearer context reject.

The SGW 35 may receive the fourth identification information transmitted by the MME 40. Based on the reception of the fourth identification information and/or the operator policy, the SGW 35 may delete the EPS bearer context, held by the SGW 35, relating to the established PDN connection. Furthermore, the SGW 35 may transmit, to the PGW 30, the fourth identification information received from the MME 40.

The PGW 30 may receive the fourth identification information transmitted by the SGW 35. Based on the reception of the fourth identification information and/or the operator policy, the PGW 30 may delete the EPS bearer context, held by the PGW 30, relating to the established PDN connection.

Furthermore, the PGW 30 may perform the IP-CAN session update procedure with the PCRF 60, based on the reception of the fourth identification information. The PGW 30 may include the fourth identification information in the IP-CAN session update procedure.

The PCRF 60 may change the operator policy, based on the IP-CAN session update procedure. Note that based on the change of the operator policy, the PGW 30 may delete the EPS bearer context, held by the PGW 30, relating to the established PDN connection.

Note that in a case that the multi PDN connection is established, a procedure for adding a new transfer path can be performed. On the other hand, in a case that the single-access PDN connection is established, the transfer path can be changed, but a procedure for adding a transfer path cannot be performed.

1.4.4. Example of Fourth PDN Connectivity Procedure

An example of the fourth PDN connectivity procedure will be described with reference to FIG. 18.

The UE 10 first transmits a PDN connectivity request to the MME 40 via the eNB 45 (S2102). The UE 10 may transmit the PDN connectivity request including at least a PDN connectivity request message identity (PDN connectivity request message ID), a Procedure transaction identity (Procedure transaction ID), a Request type (request type), a PDN type, a Protocol discriminator, and an EPS bearer identify (EPS bearer ID). Furthermore, the UE 10 may include at least the first identification information and/or sixth identification information in the PDN connectivity request. Moreover, the UE 10 may include the Access Point Name (APN) and/or Protocol Configuration Options (PCOs) and/or the Traffic Flow Templates (TFTs) in the PDN connectivity request. Note that the UE 10 may transmit the PCO including the first identification information and/or the sixth identification information and/or the TFT.

Here, the first identification information may be the UE NBIFOM capability representing that the UE 10 supports the NBIFOM. Note that the NBIFOM capability may be information indicating the possession of functionality for establishing the multi-access PDN connection.

In addition, the sixth identification information may be a Request NBIFOM indicating that a request to determine the NBIFOM operation mode for the multi-access PDN connection. Additionally/alternatively, the sixth identification information may be information indicating that a request for an NBIFOM operation mode allowed for the multi-access PDN connection to be established.

As described above, the UE 10 may transmit the PDN connectivity request including the first identification information and/or sixth identification information to request the establishment of the multi-access PDN connection, without requesting a specific NBIFOM operation mode.

The PDN connectivity request message ID may be a message type representing the PDN connectivity request message.

The Procedure transaction ID may be information for identifying the PDN connectivity procedure.

The APN may be an APN to which the UE 10 requests a connection. More specifically, the APN may be the APN 1. The UE 10 may include the APN 1 to establish the multi-access PDN connection. Here, the APN 1 may be an APN that is allowed to establish the multi-access PDN connection and/or an APN that is allowed to perform communication based on the NBIFOM.

The request type may be information for identifying the type of the requested PDN connectivity procedure. For example, the UE 10 performs an initial connection by using the APN 1, so allows the request type may be the type indicating Attach, rather than the type indicating handover.

The PDN type may indicate an available IP version. For example, the PDN type may be IPv4, IPv6, or IPv4v6.

The Protocol discriminator may be a discriminator representing the type of protocol used for transmitting/receiving the PDN connectivity request.

The EPS bearer ID may be information for identifying the EPS bearer. The EPS bearer ID may be assigned by the MME 40.

The PCO may be protocol information associated with the PDN connection. Furthermore, the PCO may include identification information on the request. Note that the UE 10 may transmit the PCO including the first identification information.

The TFT may be information for identifying an IP flow that performs communication by using the PDN connection established in the present PDN connectivity procedure. Note that the IP flow to be identified may vary for each application. Thus, user data of a specific application can be identified by the TFT.

More specifically, the TFT may be constituted of five-tuple, or may be constituted of identification information such as the application ID. Note that the five-tuple may be constituted of a combination of one or more of a source IP address, a destination IP address, a source port number, a destination port number, and a protocol number.

Note that in the present example, when transmitting the PDN connectivity request, the UE 10 does not request a specific NBIFOM operation mode, and thus, the UE 10 may transmit the PDN connectivity request without including the TFT. In other words, in a case that the UE 10 requests the establishment of the multi-access PDN connection without requesting the specific NBIFOM operation mode, the UE 10 may transmit the PDN connectivity request without including the TFT. More specifically, in a case that the UE 10 includes the first identification information and/or the sixth identification information, the UE 10 may transmit the PDN connectivity request without including the TFT.

Note that in the related art, the UE 10 can perform transmission, with information indicating the IFOM support included in the PCO. Here, the IFOM support is identification information representing that the IP Flow Mobility (IFOM) is supported. Furthermore, the IFOM is a technique for switching a communication path of a specific IP flow by using the Dual Stack Mobile IPv6 (DSMIPv6) protocol. Thus, including the information indicating the IFOM support in the PCO allows the UE 10 to switch the access network through which the communication of a specific IP flow is performed.

In the present embodiment, in a case that the UE 10 includes the first identification information and the sixth identification information in the PCO, the UE 10 does not include the IFOM support. In contrast, in a case that the UE 10 includes the IFOM support in the PCO, the UE 10 does not include the first identification information and/or the sixth information. As described above, a configuration may be made in which whether to use the switching of the communication path based on the NBIFOM or to use the switching of the communication path based on the IFOM is clearly defined by disabling both of the first identification information and the IFOM support.

Thus, the UE 10 can establish either the PDN connection supporting the IFOM or the PDN connection supporting the NBIFOM, in the establishment procedure of a single PDN connection. In other words, the single PDN connection is the PDN connection supporting the NBIFOM, the PDN connection supporting the IFOM, or the single-access PDN connection.

The MME 40 receives the PDN connectivity request transmitted by the UE 10. Based on the reception of the PDN connectivity request, and/or and/or the first identification information and/or sixth identification information included in the PDN connectivity request, the MME 40 transmits a Create Session Request to the SGW 35 (S2104).

Based on the reception of the PDN connectivity request and/or the first identification information and/or sixth identification information included in the PDN connectivity request, the MME 40 may transmit the Create Session Request including at least the first identification information and/or sixth identification information.

Furthermore, the MME 40 may include the TFT in the Create Session Request, based on the reception of the TFT transmitted by the UE 10.

Furthermore, the TFT may be information for identifying an IP flow that performs communication by using the PDN connection established in the present PDN connectivity procedure. Note that the IP flow to be identified may vary for each application. Thus, user data of a specific application can be identified by the TFT.

More specifically, the TFT may be constituted of five-tuple, or may be constituted of identification information such as the application ID. Note that the five-tuple may be constituted of a combination of one or more of a source IP address, a destination IP address, a source port number, a destination port number, and a protocol number.

Note that in a case that neither the first identification information nor the sixth identification information is included in the PDN connectivity request, the MME 40 may transmit the Create Session Request without including the first identification information and/or the sixth identification information. Moreover, in a case that the first identification information and/or the sixth identification information is not included in the PDN connectivity request, the MME 40 may perform a procedure for establishing the single-access PDN connection.

The SGW 35 receives the Create Session Request transmitted by the MME 40. Based on the reception of the Create Session Request, and/or the first identification information and/or sixth identification information included in the Create Session Request, the SGW 35 transmits the Create Session Request to the PGW 30 (S2106).

Based on the reception of the Create Session Request and/or the first identification information and/or sixth identification information included in the Create Session Request, the SGW 35 may transmit the Create Session Request including at least the first identification information and/or the sixth identification information.

Furthermore, the SGW 35 may include the TFT in the Create Session Request.

Furthermore, the TFT may be information for identifying an IP flow that performs communication by using the PDN connection established in the present PDN connectivity procedure. Note that the IP flow to be identified may vary for each application. Thus, user data of a specific application can be identified by the TFT.

More specifically, the TFT may be constituted of five-tuple, or may be constituted of identification information such as the application ID. Note that the five-tuple may be constituted of a combination of one or more of a source IP address, a destination IP address, a source port number, a destination port number, and a protocol number.

Note that in a case that neither the first identification information nor the sixth identification information is included in the PDN connectivity request, the SGW 35 may transmit the Create Session Request without including the first identification information and/or the sixth identification information. Moreover, in a case that the first identification information and/or the sixth identification information is not included in the PDN connectivity request, the MME 40 may perform a procedure for establishing the single-access PDN connection.

The PGW 30 receives the Create Session Request transmitted by the SGW 35. Based on the reception of the Create Session Request, and/or the first identification information and/or sixth identification information included in the Create Session Request, the PGW 30 may perform the IP-CAN session update procedure with the PCRF 60 (S2108).

Based on the reception of the Create Session Request and/or the first identification information and/or sixth identification information included in the Create Session Request, the PGW 30 may perform the IP-CAN session update procedure including at least the first identification information and/or the sixth identification information.

Note that the PGW 30 may perform the IP-CAN session update procedure to notify the PCRF 60 of information on the UE 10 and/or eNB 45 and/or MME 40 and/or SGW 35.

The PGW 30 may transmit, to the PCRF 60, a control message in the IP-CAN session procedure, the control message including information indicating whether the PDN connection to be established is the multi-access PDN connection or the single-access PDN connection, and/or the first identification information, and/or the sixth identification information.

More specifically, in a case that the multi-access PDN connection is to be established, the PGW 30 transmits, to the PCRF 60, the information indicating the access network A, the PDN connection ID, the information indicating that the PDN connection is the multi-access PDN connection, and the first identification information and/or sixth identification information. Alternatively, in a case that the single-access PDN connection is to be established, the PGW 30 transmits, to the PCRF 60, the information indicating the access network A, the PDN connection ID, and the information indicating that the PDN connection is the single-access PDN connection.

Note that the PDN connection ID may be an ID assigned when the PGW 30 establishes the PDN connection in the PDN connectivity procedure, or may be information for uniquely identifying the PDN connection that the UE 10 establishes with the PGW 30.

Furthermore, based on the reception of the first identification information and/or the sixth identification information, the PCRF 60 may transmit, to the PGW 30, a control message in the IP-CAN session update procedure with the PGW 30, the control message including at least the seventh identification information. The detailed description of the seventh identification information will be described later.

Note that the PCRF 60 may perform the IP-CAN session update procedure to notify the PGW 30 of the charging information and/or the QoS control information and/or the routing information.

Based on the reception of the Create Session Request or the completion of the IP-CAN session update procedure, and/or the first identification information and/or sixth identification information included in the Create Session Request and/or the seventh identification information included in the IP-CAN session update procedure, the PGW 30 transmits a Create Session Response to the SGW 35 (S2110).

Based on the reception of the Create Session Request or the completion of the IP-CAN session update procedure, and/or the first identification information and/or sixth identification information included in the Create Session Request and/or the seventh identification information included in the IP-CAN session update procedure, the PGW 30 may transmit the Create Session Response including at least the seventh identification information.

Furthermore, the PGW 30 may include the PDN Address and/or the PDN connection ID and/or the TFT in the Create Session Response.

Note that a method by which the PGW 30 acquires the seventh identification information is not limited to the above-described method for acquiring the seventh identification information from the PCRF 60 in the IP-CAN session update procedure, and another example may be employed. For example, the PGW 30 may create the seventh identification information and transmit the Create Session Response including the seventh identification information, without acquiring the seventh identification information from the PCRF 60 in the IP-CAN session update procedure. Here, the seventh identification information may be the Allowed Mode representing the NBIFOM operation mode that is allowed for the multi-access PDN connection to be established. In other words, the seventh identification information may be an operation mode allowed by the operator.

Note that the PCRF 60 or the PGW 30 may determine the Allowed Mode and the seventh identification information based on the operator policy. For example, a policy that allows the establishment of only the PDN connection of the UE-Initiated mode, a policy that allows the establishment of only the PDN connection of the Network-Initiated mode, a policy that allows the establishment of the PDN connection of both of the modes, a policy that prohibits the establishment of the PDN connection of both of the modes, and the like may be managed.

Note that the PCRF 60 or the PGW 30 may acquire the operator policy from the HSS and the like. Alternatively, an operator policy created by an administrator may be stored.

In addition, for the operator policy, a policy different for each subscriber may be managed. Alternatively, a policy different for each APN may be managed. For example, a different allowed mode for the PDN connection to be established for each APN may be managed.

Based on the Allowed Mode, the PCRF 60 or the PGW 30 may include the allowed operation mode in the seventh identification information.

In other words, in a case that only the Network-Initiated mode is allowed, the PCRF 60 or the PGW 30 may include the Network-Initiated mode in the seventh identification information. Alternatively, in a case that only the UE-Initiated mode is allowed, the PCRF 60 or the PGW 30 may include the UE-Initiated mode in the seventh identification information.

Note that in a case that both of the UE-Initiated mode and the Network-Initiated mode are allowed, the seventh identification information may include both the operation modes. Alternatively, in a case that both of the UE-Initiated mode and the Network-Initiated mode are allowed and a default operation mode is configured, the seventh identification information may include only the default operation mode. Note that which of the UE-Initiated mode and the Network-Initiated mode is defined as the default operation mode may be configured based on the operator policy.

Note that, in a case that none of the operation modes is allowed for establishment of the PDN connection, the PCRF 60 may transmit, to the PGW 30, the cause information indicating that the requested operation mode is not allowed.

In a case that none of the operation modes is allowed for establishment of the PDN connection, the PGW 30 need not notify the MME 40 of the seventh identification information via the SGW 35.

In a case that none of the operation modes is allowed for establishment of the PDN connection, the PGW 30 may transmit, to the MME 40, the Create Session Response including the cause information indicating that the requested operation mode is not allowed.

In a case that none of the operation modes is allowed for establishment of the PDN connection, the PGW 30 may notify, via the SGW 35, the TWAG 74 that there is no allowed operation.

As described above, based on the Allowed Mode, the PCRF 60 or the PGW 30 may regard an operation mode that is allowed for establishment of the PDN connection as the seventh identification information.

Note that in a case that the Network-Initiated mode is not included in the seventh identification information, the PCRF 60 need not transmit the TFT to the PGW 30.

In other words, only in a case that the Network-Initiated mode is included in the seventh identification information, the PCRF 60 may transmit the TFT to the PGW 30.

Note that in a case that the Network-Initiated mode is not included in the seventh identification information, the PGW 30 need not transmit the TFT to the MME 40 via the SGW 35. Thus, in this case, the PGW 30 need not include the TFT in the Create Session Response.

In other words, only in a case that the Network-Initiated mode is included in the seventh identification information, the PGW 30 may transmit the TFT to the MME 40 via the SGW 35. Thus, in this case, the PGW 30 may include the TFT in the Create Session Response.

The PDN Address may be an IP address assigned to the UE 10. For example, the PDN Address may be an IPv4 address, or an IPv6 prefix and an interface ID for constituting an IPv6 address. Here, the PGW 30 may assign the IP address of the UE 10. Moreover, the PGW 30 may include the IP address assigned to the UE 10 in the PDN Address.

Furthermore, the PDN connection ID may be information for uniquely identifying the PDN connection established between the UE 10 and the PGW 30. The PDN connection ID may be assigned by the PGW 30, or may be assigned by the MME 40. In other words, the PGW 30 may assign the PDN connection ID.

The SGW 35 receives the Create Session Response transmitted by the PGW 30. Based on the reception of the Create Session Response and/or the seventh identification information included in the Create Session Response, the SGW 35 transmits the Create Session Response to the MME 40 (S2112).

Based on the reception of the Create Session Response and/or the seventh identification information included in the Create Session Response, the SGW 35 may transmit the Create Session Response including at least the seventh identification information.

Furthermore, the SGW 35 may include the PDN Address and/or the PDN connection ID and/or the TFT in the session request response.

The MME 40 receives the Create Session Response transmitted by the SGW 35. Based on the reception of the Create Session Response and/or the seventh identification information included in the Create Session Response, the MME 40 transmits an Activate default EPS bearer context request to the eNB 45 (S2114).

Based on the reception of the Create Session Response and/or the seventh identification information included in the Create Session Response, the MME 40 may transmit the Activate default EPS bearer context request including at least an Activate default EPS bearer context request message identity (Activate default EPS bearer context request message ID), the Procedure transaction ID, the APN, the PDN Address, the Protocol discriminator, the EPS bearer ID, and an EPS QoS. Furthermore, the MME 40 may include at least the seventh identification information in the Activate default EPS bearer context request. Moreover, the MME 40 may include the PCO and/or an ESM Cause and/or the TFT and/or the PDN connection ID and/or PDN connection attribute information in the Activate default EPS bearer context request. Note that the MME 40 may transmit the PCO including the seventh identification information and/or the TFT and/or the PDN connection ID.

Here, the Activate default EPS bearer context request message ID may be a message type representing the Activate default EPS bearer context request message.

The APN may be an APN to which the UE 10 is allowed to connect. More specifically, the APN may be the APN 1. The APN 1 may be an APN that is allowed to establish the multi-access PDN connection. The MME 40 may include the APN 1 in the Activate default EPS bearer context request.

The PDN Address may be an IP address assigned to the UE 10. For example, the PDN Address may be an IPv4 address, or an interface ID for constituting an IPv6 address.

The EPS QoS may be a state representing QoS of the EPS bearer.

The PDN connection attribute information may be information indicating that the PDN connection established in the present PDN connectivity procedure is the multi-access PDN connection, and/or information indicating that user data transmitted/received by using the PDN connection established in the present PDN connectivity procedure is allowed to be transmitted/received through the access network A and the access network B, and/or information indicating that the PDN connection established in the present PDN connectivity procedure is the multi-access PDN connection of the operation mode indicated by the seventh identification information.

Note that the UE 10 may transmit the Activate default EPS bearer context request message that further includes a connectivity type indicating the type of PDN connection and/or WLAN offload permission information (WLAN offload acceptability) indicating whether or not the WLAN offload can be performed. Furthermore, the MME 40 may transmit the connectivity type or the WLAN offload permission information including the PDN connection attribute information.

The ESM Cause may be information indicating that the PDN type of the PDN Address assigned to the UE 10 is different from the PDN type requested by the UE 10 in the PDN connectivity request.

Note that the MME 40 and/or the PGW 30 may include the seventh identification information in the PCO. However, in a case that the MME 40 and/or the PGW 30 includes the seventh identification information in the PCO, the MME 40 and/or the PGW 30 does not include the IFOM support. In contrast, in a case that the MME 40 and/or the PGW 30 includes the IFOM support in the PCO, the MME 40 and/or the PGW 30 does not include the seventh identification information. As described above, a configuration may be made in which whether to use the switching of the communication path based on the NBIFOM or to use the switching of the communication path based on the IFOM is clearly defined by disabling both of the seventh identification information and the IFOM support.

The eNB 45 receives the Activate default EPS bearer context request transmitted by the MME 40. Based on the reception of the Activate default EPS bearer context request, the eNB 45 transfers the Activate default EPS bearer context request to the UE 10.

The eNB 45 may transmit, to the UE 10, at least an RRC Connection Reconfiguration together with the Activate default EPS bearer context request (S2116).

The UE 10 receives the RRC Connection Reconfiguration transmitted by the eNB 45. Furthermore, the UE 10 receives the Activate default EPS bearer context request that is transmitted by the MME 40 and transferred by the eNB 45.

Based on the reception of the RRC Connection Reconfiguration, the UE 10 transmits an RRC Connection Reconfiguration Complete to the eNB 45 (S2118).

The eNB 45 receives the RRC Connection Reconfiguration Complete transmitted by the UE 10. Based on the RRC Connection Reconfiguration Complete, the eNB 45 transmits a bearer configuration to the MME 40.

The MME 40 receives the bearer configuration transmitted by the eNB 45 (S2120).

Based on the reception of the Activate default EPS bearer context request and/or the seventh identification information included in the Activate default EPS bearer context request, the UE 10 transmits an Activate default EPS bearer context accept to the MME 40 (S2122) (S2124).

The UE 10 may transmit the Activate default EPS bearer context accept including at least an Activate default EPS bearer context accept message identity (Activate default EPS bearer context accept message ID), the Procedure transaction ID, the Protocol discriminator, and the EPS bearer ID.

Furthermore, the UE 10 may include the PCO in the Activate default EPS bearer context accept.

Furthermore, in a case that multiple INFOM operation modes are included in the seventh identification information, the UE 10 may include at least the fifth identification information in the Activate default EPS bearer context accept. In other words, in a case that multiple INFOM operation modes are allowed, the UE 10 may select one of the allowed modes and transmit the fifth identification information including the selected mode.

Specifically, in a case that the UE-Initiated mode and the Network-Initiated mode are included in the seventh identification information included in the Activate default EPS bearer context request, the UE 10 may include the UE-Initiated mode or the Network-Initiated mode in the fifth identification information.

Which of the UE-Initiated mode and the Network-Initiated mode is to be included in the fifth identification information may be determined based on the UE policy.

Note that the UE policy may be any information configured to the UE 10. For example, the UE policy may be information configured by a user.

Here, the Activate default EPS bearer context accept message ID may be a message type representing the Activate default EPS bearer context accept message.

After the fourth PDN connectivity procedure is completed, the UE 10 and the PGW 30 establish the first PDN connection of the operation mode determined based on the operator policy. Alternatively, the UE 10 establishes the first PDN connection of an operation mode selected from the operation modes allowed based on the operator policy. Note that based on the reception of the Activate default EPS bearer context request and/or the PDN connection attribute information and/or the seventh identification information and/or the operation mode selected based on the seventh identification information, the UE 10 may identify the NBIFOM operation mode for the established PDN connection. Based on the establishment of the first PDN connection, the UE 10 and the PGW 30 determine a PDN connection and/or a transfer path (such as an EPS bearer) for transmitting/receiving the IP flow by using the TFT, and transmit/receive user data corresponding to the IP flow identified by the TFT. More specifically, the UE 10 and the PGW 30 transmit/receive a flow identified by the TFT by using the first PDN connection.

Note that in the example of the fourth PDN connectivity procedure, a case has been described in which the transmission/reception of the TFT is included in the PDN connectivity procedure; however, the fourth PDN connectivity procedure is not limited to this case. The transmission/reception of the TFT may be performed after the multi-access PDN connection is established.

Therefore, the UE 10 and the MME 40 may transmit/receive the TFT that is not included in the PDN connectivity request and/or the Activate default EPS bearer context request, and establish the multi-access PDN connection. In other words, at a point in time when the PDN connection is established, there may be no IP flow transmitting/receiving user data by using the PDN connection. In this case, the UE 10 and the MME 40 transmit the TFT after the multi-access PDN connection is established.

More specifically, in a case that the PDN connection of the UE-Initiated mode is established, the UE 10 may transmit the TFT to the MME 40 via the eNB 45. In addition, the MME 40 receives the TFT from the UE 10 and transmits the TFT to the PGW 30 via the SGW 35. Thus, the UE 10 and the PGW 30 can determine a PDN connection and/or a transfer path (such as an EPS bearer) for transmitting/receiving the IP flow by using the TFT, and transmit/receive user data corresponding to the IP flow identified by the TFT.

On the other hand, in a case that the PDN connection of the Network-Initiated mode is established, the PGW 30 may transmit the TFT to the MME 40 via the SGW 35. Here, the PGW 30 may receive, from the PCRF 60, the TFT determined based on the operator policy. In addition, the MME 40 receives the TFT from the PGW 30 via the SGW 35 and transmits the TFT to the UE 10 via the eNB 45. Thus, the UE 10 and the PGW 30 can determine a PDN connection and/or a transfer path (such as an EPS bearer) for transmitting/receiving the IP flow by using the TFT, and transmit/receive user data corresponding to the IP flow identified by the TFT.

Furthermore, in the example of the fourth PDN connectivity procedure, a case has been described in which the UE 10 and the PGW 30 establish the first PDN connection of the operation mode selected by the UE 10 from the operation mode determined based on the operator policy and the operation mode allowed based on the operator policy; however, the fourth PDN connectivity procedure is not limited to this case. The UE 10 may reject the establishment of the first PDN connection.

For example, if the UE 10 does not support the operation mode allowed by the operator policy and/or if the operation mode allowed by the operator policy does not comply with the policy of the UE 10, the UE 10 may reject the establishment of the first PDN connection.

In more detail, based on the reception of the Activate default EPS bearer context request and/or the seventh identification information included in the Activate default EPS bearer context request and/or the PDN connection attribute information and/or the policy of the UE 10, the UE 10 may transmit the Activate default EPS bearer context reject to the MME 40 via the eNB 45.

The UE 10 may transmit the Activate default EPS bearer context reject including at least an Activate default EPS bearer context reject message identity (Activate default EPS bearer context reject message ID), the Procedure transaction ID, the Protocol discriminator, the EPS bearer ID, and the ESM Cause. Furthermore, the UE 10 may further include fourth identification information in the Activate default EPS bearer context reject. Furthermore, the UE 10 may further include the PCO in the Activate default EPS bearer context reject. Note that the UE 10 may transmit the PCO including the fourth identification information.

The fourth identification information may be information representing that the UE 10 does not support the operation mode allowed based on the operator policy and/or information representing that the operation mode allowed based on the operator policy does not comply with the policy of the UE 10.

The Activate default EPS bearer context reject message ID may be the message type representing the Activate default EPS bearer context reject message.

The ESM Cause may be information indicating a reason why the Activate default EPS bearer context request is rejected. Here, the UE 10 may notify the UE 10 of the fourth identification information included in the ESM Cause.

The MME 40 may receive the Activate default EPS bearer context reject transmitted by the UE 10. Based on the reception of the Activate default EPS bearer context reject and/or the fourth identification information included in the Activate default EPS bearer context reject, the MME 40 may delete the EPS bearer context, held by the MME 40, relating to the established PDN connection. Furthermore, the MME 40 may transmit, to the SGW 35, the fourth identification information included in the Activate default EPS bearer context reject.

The SGW 35 may receive the fourth identification information transmitted by the MME 40. Based on the reception of the fourth identification information and/or the operator policy, the SGW 35 may delete the EPS bearer context, held by the SGW 35, relating to the established PDN connection. Furthermore, the SGW 35 may transmit, to the PGW 30, the fourth identification information received from the MME 40.

The PGW 30 may receive the fourth identification information transmitted by the SGW 35. Based on the reception of the fourth identification information and/or the operator policy, the PGW 30 may delete the EPS bearer context, held by the PGW 30, relating to the established PDN connection.

Furthermore, the PGW 30 may perform the IP-CAN session update procedure with the PCRF 60, based on the reception of the fourth identification information. The PGW 30 may include the fourth identification information in the IP-CAN session update procedure.

The PCRF 60 may change the operator policy, based on the IP-CAN session update procedure. Note that based on the change of the operator policy, the PGW 30 may delete the EPS bearer context, held by the PGW 30, relating to the established PDN connection.

Note that in a case that the multi PDN connection is established, a procedure for adding a new transfer path can be performed. On the other hand, in a case that the single-access PDN connection is established, the transfer path can be changed, but a procedure for adding a transfer path cannot be performed.

1.4.5. Description of State After PDN Connectivity Establishment Procedure

Performing the above-described first to fourth PDN connectivity procedures leads to a first state and a second state described below.

Note that an initial state in an additional Attach procedure may be the second state. The initial state in the additional Attach procedure may not be limited to the second state.

1.4.6. Description of First State

Figure 13:
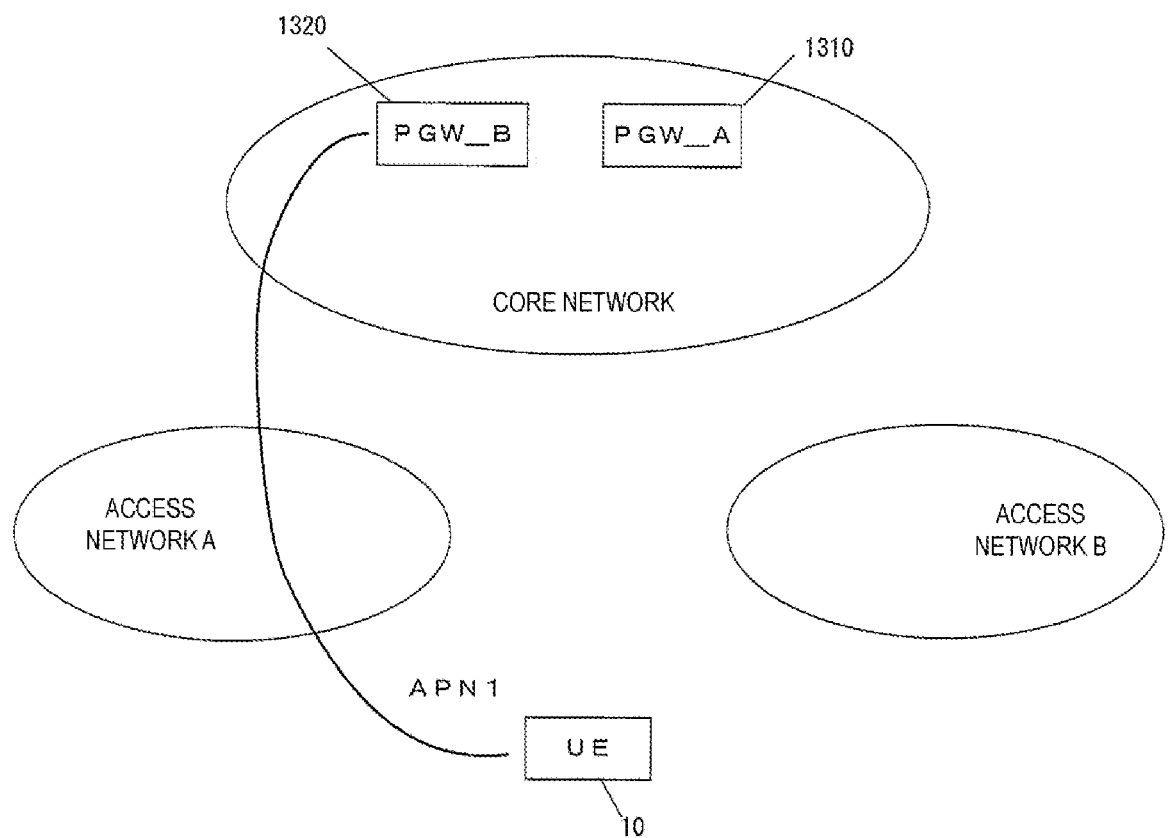
FIG. 13 is a diagram illustrating a state from a first initial state to a state after a PDN connectivity procedure is completed.

The first state will be described with reference to FIG. 13. In the first state, the UE 10 has already established the first PDN connection with the core network 90. However, the UE 10 has not yet established the second PDN connection. In more detail, the UE 10 has already established the first PDN connection with the PGW_A 1310. However, the UE 10 has not yet established the second PDN connection with the PGW_B 1320.

Note that the PGW_A 1310 may be a gateway device selected by using the APN 1. The PGW_B 1320 may be a gateway device selected by using the APN 2. Moreover, the PGW_A 1310 and the PGW_B 1320 may be the PGW 30. Furthermore, the selection of a gateway using the APN 1 and/or the APN 2 may be performed by the TWAG 74 included and located in the access network B and/or the MME 40 included and located in the core network 90.

In addition, the gateway device selected by using the APN 1 and the gateway device selected by using the APN 2 may be the same gateway device. In this case, the PGW_A 1310 and the PGW_B 1320 may be the same device.

Note that the first PDN connection may be constituted of a transfer path between the UE 10 and the PGW 30 through the access network A. Thus, the first PDN connection may be constituted of a transfer path that is a combination of a transfer path between the UE 10 and the eNB 45, a transfer path between the eNB 45 and the SGW 35, and a transfer path between the SGW 35 and the PGW_A 1310. Here, the transfer path may be a bearer.

As described above, in the first state, the UE 10 may be in a state of having the multi-access PDN connection established via the access network A. In addition, in the first state, the UE 10 may be in a state of not being connected to the core network 90 via the access network B.

Note that the UE 10 need not have the single-access PDN connection established via the access network A.

Alternatively, the UE 10 may be in a state in which the single-access PDN connection has been established via the access network A. In this case, the UE 10 performs, over the LTE access network, the Attach procedure or the PDN connectivity procedure in the single-access PDN connection initiated by the UE 10 to establish the third PDN connection.

Note that the third PDN connection may be established with the gateway selected by using the APN 2. Alternatively, the third PDN connection may be established with a gateway selected by using another APN different from either the APN 1 or the APN 2.

The first state has been described above; however, the first state is not limited to the above-described state, and only needs to be a state in which the multi-access PDN connection has been established through the access network A and the PDN connection has not been established through the access network A, for example.

1.4.7. Description of Second State

Figure 14:
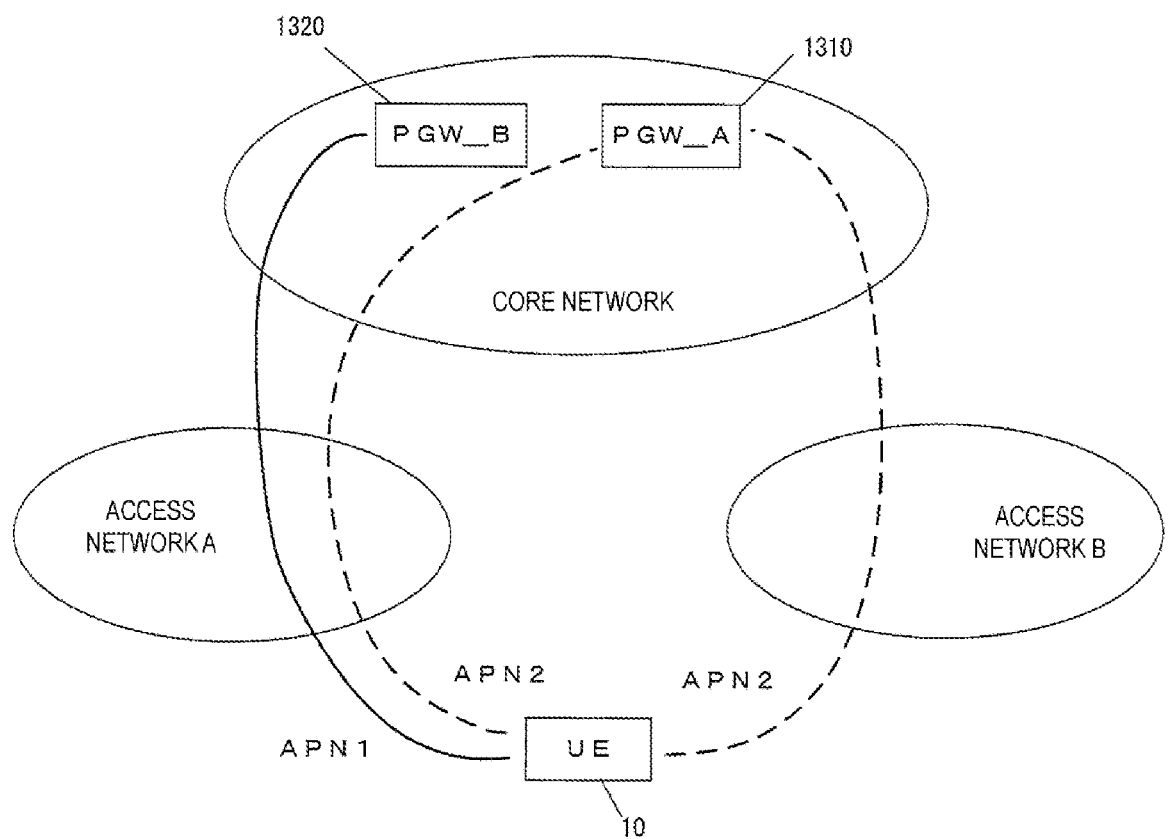
FIG. 14 is a diagram illustrating a state from a second initial state to a state after the PDN connectivity procedure is completed.

The second state will be described with reference to FIG. 14. In the second state, the UE 10 has established the first PDN connection with the core network 90. Furthermore, the UE 10 has established the second PDN connection with the core network 90. In more detail, the UE 10 has established the first PDN connection with the PGW_A 1310. Furthermore, the UE 10 has established the second PDN connection with the PGW_B 1320.

Note that the PGW_A 1310 may be a gateway device selected by using the APN 1. The PGW_B 1320 may be a gateway device selected by using the APN 2. Moreover, the PGW_A 1310 and the PGW_B 1320 may be the PGW 30. Furthermore, the selection of a gateway using the APN 1 and/or the APN 2 may be performed by the TWAG 74 included and located in the access network B and/or the MME 40 included and located in the core network 90.

In addition, the gateway device selected by using the APN 1 and the gateway device selected by using the APN 2 may be the same gateway device. In this case, the PGW_A 1310 and the PGW_B 1320 may be the same device.

Note that the first PDN connection may be constituted of a transfer path between the UE 10 and the PGW 30 through the access network A. Thus, the first PDN connection may be constituted of a transfer path that is a combination of a transfer path between the UE 10 and the eNB 45, a transfer path between the eNB 45 and the SGW 35, and a transfer path between the SGW 35 and the PGW_A 1310. Here, the transfer path may be a bearer.

In addition, the second PDN connection may be constituted of a transfer path between the UE 10 and the PGW 30 through the access network B. Thus, the second PDN connection may be constituted of a transfer path between the UE 10 and the TWAG 74 and a transfer path between the TWAG 74 and the PGW_B 1320. Here, the transfer path may be a bearer.

As described above, in the first state, the UE 10 may be in a state of having the multi-access PDN connection established via the access network A. Furthermore, the UE 10 may be in a state of having the single-access PDN connection established via the access network B.

Note that the UE 10 need not have the single-access PDN connection established via the access network A.

Alternatively, the UE 10 may be in a state in which the single-access PDN connection has been established via the access network A. In this case, the UE 10 performs, over the LTE access network, the Attach procedure or the PDN connectivity procedure in the single-access PDN connection initiated by the UE 10 to establish the third PDN connection.

Note that the third PDN connection may be established with the gateway selected by using the APN 2. Alternatively, the third PDN connection may be established with a gateway selected by using another APN different from either the APN 1 or the APN 2.

The second state has been described above; however, the second state is not limited to the above-described state, and only needs to be a state in which the multi-access PDN connection has been established through the access network B and the single-access PDN connection has been established through the access network A, for example.

2. Second Embodiment

Hereinafter, a radio communication technology according to an embodiment of the present invention will be described in detail with reference to the drawings.
2.1. System Overview
FIG. 1 is a diagram illustrating an overview of a mobile communication system according to the present embodiment. As illustrated in FIG. 1, a mobile communication system 9 is constituted of a mobile terminal device UE 10, an LTE base station eNB 45 included in an access network A, a Trusted WLAN Access Gateway 74 (gateway TWAG) 74 included in an access network B, a Mobility Management Entity (MME) 40 included in a core network 90, a Serving Gateway (SGW) 35, and a PDN Gateway (PGW) 30.

Here, the UE 10 may be any mobile terminal device, and may be a User equipment (UE) 10 or a Mobile equipment (ME) or a Mobile Station (MS).

Furthermore, the access network A may be an LTE access network, and the eNB 45 included in the access network A may be an LTE radio base station. Note that the access network A may include multiple radio base stations.

Furthermore, the access network B may be a WLAN access network. The TWAG 74 may be a gateway that connects to the PGW 30 in the core network 90 to connect the core network 90 and the WLAN access network.

In the present embodiment, the UE 10 can establish a PDN connection using an EPS bearer through the access network A.

Furthermore, the UE 10 can establish a PDN connection by using a GTP/PMIPv6 transfer path between the PGW 30 and the UE 10. Note that the transfer path may be a bearer.

Here, the core network 90 refers to an IP mobile communication network run by a mobile operator.

For example, the core network 90 may be a core network 90 for the mobile operator that runs and manages the mobile communication system 9, or may be a core network 90 for a virtual mobile operator such as a Mobile Virtual Network Operator (MVNO).

The MME 40 is a control device configured to perform location management and access control of the UE 10 through the access network A. Details of the MME 40 will be described below.

Furthermore, the SGW 35 is a gateway device between the core network 90 and the access network A, and is configured to transfer user data between the UE 10 and the PGW 30.

The PGW 30 is a gateway device of a packet data service network (Packet Data Network (PDN)) that provides a communication service to the UE 10.

In the present embodiment, the UE 10 can establish a first PDN connection and/or a second PDN connection.

Furthermore, in the present embodiment, an NBIFOM is a technique that enables establishment of a multi-access PDN connection.

Furthermore, in the present embodiment, the multi-access PDN connection refers to a PDN connection capable of accommodating, in one PDN connection, a transfer path and/or a bearer over 3GPP access and/or WLAN access. In other words, the multi-access PDN connection can accommodate both a transfer path through the 3GPP access and a transfer path through the WLAN access. Note that the multi-access PDN connection may be a PDN connection accommodating only a bearer through the 3GPP access or may be a PDN connection accommodating only a transfer path through the WLAN access. In other words, the multi-access PDN connection is a PDN connection capable of constituting one or multiple transfer paths.

Note that in the present embodiment, unlike the first embodiment, the multi-access PDN connection may be a PDN connection established based on the NBIFOM or a PDN connection established based on the IP Flow Mobility (IFOM). Thus, in the present embodiment, the multi-access PDN connection may be either the multi-access PDN connection corresponding to the PDN connection in which a transfer path of a specific flow can be selected based on the NBIFOM, or the multi-access PDN connection corresponding to the PDN connection in which a transfer path of a specific flow can be selected based on the IFOM.

Note that the IFOM is a technique for switching a communication path of a specific IP flow by using the Dual Stack Mobile IPv6 (DSMIPv6) protocol. On the other hand, the NBIFOM is a technique for switching a communication path of a specific IP flow by using a network-based mobility management protocol such as a General Packet Radio System Tunneling Protocol (GTP) and a Proxy Mobile IP (PMIP).

Furthermore, the first PDN connection may be the above-described multi-access PDN connection.

In detail, the first PDN connection is a PDN connection in which, as one PDN connection, a communication path EPS bearer through the access network A and a communication path constituted of a GTP/PMIPv6 tunnel through the access network B can be used. That is, this PDN connection can transmit/receive data through the 3GPP access, the WLAN access, or both thereof. The first PDN connection may be the multi-access PDN connection.

Furthermore, the second PDN connection may be the PDN connection of the related art, rather than the multi-access PDN connection. Note that the second PDN connection may be the single-access PDN connection.

Here, the "single-access PDN connection" refers to one PDN connection constituting only a transfer path of either the 3GPP access or the WLAN access, unlike the multi-access PDN connection. In detail, the single-access PDN connection is a PDN connection established by the Attach of the related art.

That is, the second PDN connection is a PDN connection constituted of the EPS bearer through the access network A or a PDN connection constituted of the GTP/PMIPv6 transfer path through the access network B. The second PDN connection accommodates a transfer path and/or a communication path through either one of the access networks.

As described above, the single-access PDN connection is a PDN connection different from the multi-access PDN connection. Moreover, the single-access PDN connection refers to a PDN connection that is also different from a PDN connection for a Local IP Access (LIPA). Here, the LIPA refers to communication control for performing offload to a home network. More specifically, the base station to which the terminal device connects performs the offload by transmitting, to a home network to which the base station connects, user data that is delivered to the core network 90 in the related art. The PDN connection for the LIPA is a PDN connection for performing such communication based on the LIPA.

Next, an example of the constitution of the core network 90 will be described. FIG. 2A illustrates an example of the constitution of the IP mobile communication network. As illustrated in FIG. 2A, the core network 90 is constituted of a Home Subscriber Server (HSS) 50, an Authentication, Authorization, Accounting (AAA) 55, a Policy and Charging Rules Function (PCRF) 60, the PGW 30, an enhanced Packet Data Gateway (ePDG) 65, the SGW 35, the MME 40, and a Serving GPRS Support Node (SGSN) 45.

Furthermore, the core network 90 can be connected to multiple radio access networks (the LTE AN 80, the WLAN ANb 75, the WLAN ANa 70, the UTRAN 20, and the GERAN 25).

Such a radio access network may be constituted of connections to multiple different access networks, or may be constituted of a connection to any one of the access networks. Moreover, the UE 10 can be wirelessly connected to the radio access network.

Moreover, the WLAN access network b (WLAN ANb 75) that connects to the core network 90 via the ePDG 65 and the WLAN access network a (WLAN ANa 75) that connects to the PGW 30, the PCRF 60, and the AAA 55 can be constituted as the access network connectable in the WLAN access system.

Note that each device has a similar constitution to those of the devices of the related art in a mobile communication system using EPS, and thus detailed descriptions thereof will be omitted. Each device will be described briefly hereinafter.

The PGW 30 connects to the PDN 100, the SGW 35, the ePDG 65, the WLAN ANa 70, the PCRF 60, and the AAA 55 and is a relay device configured to transfer user data by functioning as a gateway device between the PDN 100 and the core network 90.

The SGW 35 connects to the PGW 30, the MME 40, the LTE AN 80, the SGSN 45, and the UTRAN 20 and is a relay device configured to transfer user data by functioning as a gateway device between the core network 90 and the 3GPP access network (the UTRAN 20, the GERAN 25, and the LTE AN 80).

The MME 40 connects to the SGW 35, the LTE AN 80, and the HSS 50 and is an access control device configured to perform location information management and access control for the UE 10 via the LTE AN 80. Furthermore, the core network 90 may include multiple location management devices. For example, a location management device different from the MME 40 may be constituted. As with the MME 40, the location management device different from the MME 40 may be connected to the SGW 35, the LTE AN 80, and the HSS 50.

Furthermore, in a case that multiple MMEs 40 are included in the core network 90, the MMEs 40 may be connected to each other. With this configuration, the context of the UE 10 may be transmitted/received between the MMEs 40.

The HSS 50 is connected to the MME 40 and the AAA 55 and is a managing node configured to manage subscriber information. The subscriber information of the HSS 50 is referenced during access control for the MME 40, for example. Moreover, the HSS 50 may be connected to the location management device different from the MME 40.

The AAA 55 is connected to the PGW 30, the HSS 50, the PCRF 60, and the WLAN ANa 70 and is configured to perform access control for the UE 10 connected to the AAA 55 via the WLAN ANa 70.

The PCRF 60 is connected to the PGW 30, the WLAN ANa 75, the AAA 55, and the PDN 100 and is configured to perform QoS management on data delivery. For example, the PCRF 60 manages the QoS of a communication path between the UE 10 and the PDN 100.

The ePDG 65 is connected to the PGW 30 and the WLAN ANb 75 and is configured to deliver user data by functioning as a gateway device between the core network 90 and the WLAN ANb 75.

The SGSN 45 is connected to the UTRAN 20, the GERAN 25, and the SGW 35 and is a control device for location management between a 3G/2G access network (UTRAN/GERAN) and the LTE access network (E-UTRAN). In addition, the SGSN 45 has the functions of: selecting the PGW 30 and the SGW 35; managing a time zone of the UE 10; and selecting the MME 40 at the time of handover to the E-UTRAN.

Also, as illustrated in FIG. 2B, each radio access network includes devices to which the UE 10 is actually connected (for example, a base station device and an access point device), and the like. The devices used in these connections are assumed to adapt to the radio access networks.

In the present embodiment, the LTE AN 80 includes the eNB 45. The eNB 45 is a radio base station to which the UE 10 connects in the LTE access system, and the LTE AN 80 may include one or multiple radio base stations.

The WLAN ANa 70 includes the WLAN APa 72 and the TWAG 74. The WLAN APa 72 is a radio base station to which the UE 10 connects in the WLAN access system trusted by the operator running the core network 90, and the WLAN ANa 70 may include one or multiple radio base stations. The TWAG 74 is a gateway device between the core network 90 and the WLAN ANa 70. Furthermore, the WLAN APa 72 and the TWAG 74 may be constituted as a single device.

Even in a case where the operator running the core network 90 and the operator running the WLAN ANa 70 are different, such a constitution can be implemented through a contract or an agreement between the operators.

Furthermore, the WLAN ANb 75 includes the WLAN APb 76. The WLAN APb 76 is a radio base station to which the UE 10 connects in the WLAN access system in a case where no trusting relationship is established with the operator running the core network 90. The WLAN ANb 75 may include one or multiple radio base stations.

In this manner, the WLAN ANb 75 is connected to the core network 90 via the ePDG 65 serving as a gateway. The ePDG 65 is a device included in the core network 90 and having security functionality for ensuring security.

The UTRAN 20 includes the Radio Network Controller (RNC) 24 and the eNB (UTRAN) 22. The eNB (UTRAN) 22 is a radio base station to which the UE 10 connects through a UMTS Terrestrial Radio Access (UTRA), and the UTRAN 20 may include one or multiple radio base stations. Furthermore, the RNC 24 is a control unit configured to connect the core network 90 and the eNB (UTRAN) 22, and the UTRAN 20 may include one or multiple RNCs. Moreover, the RNC 24 may be connected to one or multiple eNBs (UTRANs) 22. In addition, the RNC 24 may be connected to a radio base station (Base Station Subsystem (BSS) 26) included in the GERAN 25.

The GERAN 25 includes the BSS 26. The BSS 26 is a radio base station to which the UE 10 connects through a GSM/EDGE Radio Access (GERA), and the GERAN 25 may be constituted of one or multiple radio base station BSSs. Furthermore, the one or more BSSs 26 may be connected to each other. Moreover, the BSS 26 may be connected to the RNC 24.

Note that in the present specification, the UE 10 being connected to each radio access network refers to the UE 10 being connected to a base station device, an access point, or the like included in each radio access network, and data, signals, and the like being transmitted/received also pass through those base station devices, access points, or the like.

2.2 Device Constitution

The constitution of each device will be described below.

2.2.1. TWAG Constitution

FIG. 3 illustrates a device configuration of the TWAG 74. As illustrated in FIG. 3, the TWAG 74 is constituted of an IP mobile communication network interface unit 320, a control unit 300, and a storage 340. The IP mobile communication network interface unit 320 and the storage 340 are connected to the control unit 300 via a bus.

The control unit 300 is a function unit for controlling the TWAG 74. The control unit 300 implements various processes by reading out and executing various programs stored in the storage 340.

The IP mobile communication network interface unit 320 is a function unit through which the TWAG 74 is connected to the PGW 30.

The storage 340 is a function unit for storing programs, data, and the like necessary for each operation of the TWAG 74. The storage 340 is constituted of, for example, a semiconductor memory, a Hard Disk Drive (HDD), or the like.

As illustrated in FIG. 3, the storage 340 stores a TWAG capability 342, a Network capability 344, and an EPS bearer context 346. Hereinafter, information elements stored in the storage 340 will be described.

FIGS. 4A to 4E illustrate the information elements stored in the storage 340. FIG. 4A illustrates an example of the TWAG capability stored by the TWAG 74. In the TWAG capability, identification information (NBIFOM capability) is stored for each TWAG 74, the identification information indicating whether or not the capability of establishing the first PDN connection is supported. In other words, the identification information indicates whether or not the TWAG 74 supports NBIFOM functionality. Specifically, the NBIFOM capability may include "allowed" or "Not allowed."

Note that the NBIFOM functionality may be information indicating the possession of functionality for establishing the multi-access PDN connection based on the NBIFOM.

Alternatively, the NBIFOM capability may be identification information indicating the possession of capability of establishing the first PDN connection. That is, the existence of the NBIFOM capability in the storage may mean that the TWAG 74 is a gateway having functionality for establishing the first PDN connection. In other words, the existence of the NBIFOM capability in the storage may mean that the TWAG 74 is a gateway supporting the NBIFOM functionality.

As illustrated in FIG. 4A, the NBIFOM capability may be stored being associated with the TWAG ID that is the identification information on the TWAG 74. In a case that the NBIFOM capability is not associated with the TWAG ID, the NBIFOM capability may refer to the capability of the TWAG 74 to be stored.

In a case that the TWAG ID and the NBIFOM capability are stored being associated with each other, the TWAG 74 may store the TWAG capabilities of multiple TWAGs 74.

In this case, when the UE 10 performs handover to another TWAG 74, the TWAG 74 may select a TWAG 74 to which the handover is made, based on the TWAG capability.

Next, the Network capability 344 will be described. FIG. 4B illustrates an example of the Network capability stored by the TWAG 74. In the Network capability, the NBIFOM capability is stored for each network, i.e., for each PGW 30.

Here, the NBIFOM capability is identification information on each network indicating whether or not the capability of establishing the first PDN connection is supported. In other words, the identification information indicates whether or not the PGW 30 supports the NBIFOM functionality. More specifically, for example, the NBIFOM capability may include "allowed" or "Not allowed."

Note that the NBIFOM functionality may be information indicating the possession of functionality for establishing the multi-access PDN connection based on the NBIFOM.

Alternatively, the NBIFOM capability may be identification information indicating the possession of capability of establishing the first PDN connection. In other words, the NBIFOM capability may be identification information indicating that it is a gateway supporting the NBIFOM functionality. That is, the existence of the NBIFOM capability in the storage may mean that the PGW 30 is a gateway having functionality for establishing the first PDN connection. In other words, the existence of the NBIFOM capability in the storage may mean that the PGW 30 is a gateway supporting the NBIFOM functionality.

As illustrated in FIG. 4B, the TWAG 74 stores the NBIFOM capability associated with the PGW ID. Furthermore, as illustrated in FIG. 4B, the NBIFOM capability may be stored being associated with each of the multiple PGWs 30.

The PGW ID may be any information for identifying the PGW 30, and may be an Access Point Name (APN), for example.

Next, the EPS bearer context will be described. The EPS bearer context may be classified into the EPS bearer context for each UE 10 stored for each UE 10, the EPS bearer context for each PDN connection, and the EPS bearer context for each bearer and/or transfer path.

FIG. 4C illustrates information elements included in the EPS bearer context for each UE 10. As is obvious from FIG. 4C, the TWAG 74 stores, for each UE 10, a UE NBIFOM capability and an NBIFOM allowed.

The UE NBIFOM capability is the NBIFOM capability of the UE 10. The UE NBIFOM capability is identification information on each UE 10 indicating whether or not the capability of establishing the first PDN connection is supported. In other words, the UE NBIFOM capability is identification information indicating whether or not the UE 10 supports the NBIFOM functionality. More specifically, for example, the UE NBIFOM capability may include "allowed" or "Not allowed."

Note that the NBIFOM functionality may be information indicating the possession of functionality for establishing the multi-access PDN connection based on the NBIFOM.

Alternatively, the UE NBIFOM capability may be identification information indicating that the UE 10 has the capability of establishing the first PDN connection. That is, the existence of the UE NBIFOM capability may mean that the UE 10 has functionality for establishing the first PDN connection.

In other words, the UE NBIFOM capability may be identification information indicating that the UE 10 supports the NBIFOM functionality. That is, the existence of the UE NBIFOM capability in the storage may mean that the UE 10 supports the NBIFOM functionality.

Furthermore, the NBIFOM allowed is identification information indicating an APN that is allowed to establish a PDN connection using the NBIFOM. The NBIFOM may be associated with at least the APN. The NBIFOM allowed may be associated with multiple APNs.

In the present embodiment, the APN 1 is associated with the NBIFOM allowed. That is, the APN 1 is allowed to establish the multi-access PDN connection based on the NBIFOM. In other words, in the present embodiment, the UE 10 is allowed to establish the multi-access PDN connection based on the NBIFOM by using the APN 1. Note that the APN 1 is also allowed to establish the PDN connection of the related art, rather than the multi-access PDN connection based on the NBIFOM.

In addition, in the present embodiment, the APN 2 is not associated with the NBIFOM allowed. That is, in the present embodiment, the APN 2 is not allowed to establish the multi-access PDN connection based on the NBIFOM. That is, in the present embodiment, the UE 10 cannot establish the multi-access PDN connection based on the NBIFOM by using the APN 2. The NBIFOM allowed may be stored before the PDN connection is established. The TWAG 74 may access the HSS 50 to acquire the NBIFOM allowed before the PDN connection is established and/or during the establishment procedure.

Furthermore, the EPS bearer context for each UE 10 may include the identification information on the UE 10. The identification information on the UE 10 may be an IMSI.

Furthermore, FIG. 4D illustrates the EPS bearer context for each PDN connection. The EPS bearer context for each PDN connection includes a PDN connection ID, a Network allowed mode, an Operation mode, a User plane connection ID, a TWAG MAC address, and an NBIFOM Permission.

The PDN connection ID is identification information for identifying a PDN connection. The UE 10, the TWAG 74, and the PGW 30 may store the same identification information.

The Operation mode is identification information on a mode that indicates which of the UE 10 and the network takes an initiative in transmitting/receiving data or is allowed to initiate communication control in a case that the PDN connection is the first PDN connection.

More specifically, for example, an Operation mode that allows the UE 10 to initiate the communication control may be a UE-Initiated mode.

Furthermore, an Operation mode that allows the network and/or the PGW 30 and/or the PCRF 60 to initiate the communication control may be a Network Initiated mode.

The Network allowed mode indicates an Operation mode allowed by the network. The Network allowed mode may include the UE Initiated mode, the Network Initiated mode, or both thereof.

The User plane connection ID is identification information for identifying a connection used for transmission of user data in a case that the UE 10 has established a transfer path via the TWAG 74.

The TWAG MAC address is a physical address of the TWAG 74.

The NBIFOM permission is information indicating that this PDN connection has established the multi-access PDN connection based on the NBIFOM. In other words, the NBIFOM permission indicates that the first PDN connection has been established.

That is, the fact that the TWAG 74 has stored the NBIFOM permission means that this PDN connection is the first PDN connection.

The NBIFOM permission is identification information that is stored by the TWAG 74 upon the PDN connection being established.

The TWAG 74 may access the HSS 50 to acquire the NBIFOM permission during the establishment of the PDN connection. Alternatively, the TWAG 74 may store the NBIFOM permission based on the establishment of the multi-access PDN connection based on the NBIFOM.

Next, the EPS bearer context for each bearer and/or transfer path will be described. As illustrated in FIG. 4E, the EPS bearer context for each bearer and/or transfer path may include the transfer path identification information and the Routing Rule.

The transfer path identification information is information for identifying a transfer path and/or bearer. The transfer path identification information may be an EPS bearer ID, for example.

The Routing Rule indicates an association of a Routing Filter, and a Routing address or Routing access type. Based on this association, whether using a communication path through the 3GPP access network or using a communication path through the WLAN access network is determined.

Here, the Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the TWAG 74. Alternatively, the Routing address may be an IP address of a Mobile Access Gateway (MAG).

The Routing Rule may be notified from the PGW 30 or the PCRF 60, or may be notified from the UE 10. Alternatively, the Routing Rule may be a value that the TWAG 74 prestores as a default value.

The Routing Filter may include an IP header to switch an IP flow. Alternatively, the Routing Filter may include an application ID to switch the flow for each application. Alternatively, the Routing Filter may include a TFT.

The Routing Rule may store multiple rules. Furthermore, the Routing Rule may include a priority for each rule.

The TWAG capability and the Network capability may be included in the EPS bearer context.

2.2.2. HSS Constitution

Next, the constitution of the HSS 50 will be described. FIG. 5 illustrates a device constitution of the HSS 50. As illustrated in FIG. 5, the HSS 50 is constituted of an IP mobile communication network interface unit 520, a control unit 500, and a storage 540. The IP mobile communication network interface unit 520 and the storage 540 are connected to the control unit 500 via a bus.

The control unit 500 is a function unit for controlling the HSS 50. The control unit 500 implements various processes by reading out and executing various programs stored in the storage 540.

The IP mobile communication network interface unit 520 is a function unit through which the HSS 50 is connected to the MME 40 and/or another MME 40, and the AAA 55.

The storage 540 is a function unit for storing programs, data, and the like necessary for each operation of the HSS 50. The storage 540 is constituted of, for example, a semiconductor memory, a Hard Disk Drive (HDD), or the like.

As illustrated in FIG. 5, the storage 540 stores HSS data 542. Hereinafter, information elements stored in the storage 540 will be described.

FIGS. 6A and 6B illustrate the information elements stored in the storage 540. FIG. 6A illustrates an example of HSS data for each UE 10 stored by the HSS 50.

As is obvious from FIG. 6A, the HSS data for each UE 10 includes an IMSI, an MSISDN, an IMEI/IMEISV, an Access Restriction, a UE NBIFOM capability, and an NBIFOM allowed.

The IMSI is identification information assigned to a user (subscriber) using the UE 10. The MSISDN represents the phone number of the UE 10. The IMEI/IMISV is identification information assigned to the UE 10. The Access Restriction indicates registration information for access restriction.

The UE NBIFOM capability is the NBIFOM capability of the UE 10. The UE NBIFOM capability is identification information on each UE 10 indicating whether or not the capability of establishing the first PDN connection is supported. In other words, the UE NBIFOM capability indicates whether or not the UE 10 supports the NBIFOM functionality. More specifically, for example, the NBIFOM capability may include "allowed" or "Not allowed."

Alternatively, the UE NBIFOM capability may be identification information indicating that the UE 10 has the capability of establishing the first PDN connection. That is, the existence of the UE NBIFOM capability may mean that the UE 10 has functionality for establishing the first PDN connection.

Furthermore, the NBIFOM allowed is identification information indicating an APN that is allowed to establish a PDN connection using the NBIFOM. The NBIFOM may be associated with at least the APN. The NBIFOM allowed may be associated with multiple APNs.

In the present embodiment, the APN 1 is associated with the NBIFOM allowed. That is, the APN 1 is allowed to establish the multi-access PDN connection based on the NBIFOM. In other words, in the present embodiment, the UE 10 is allowed to establish the multi-access PDN connection based on the NBIFOM by using the APN 1. Note that the APN 1 is also allowed to establish the PDN connection of the related art, rather than the multi-access PDN connection based on the NBIFOM.

In addition, in the present embodiment, the APN 2 is not associated with the NBIFOM allowed. That is, in the present embodiment, the APN 2 is not allowed to establish the multi-access PDN connection based on the NBIFOM. That is, in the present embodiment, the UE 10 cannot establish the multi-access PDN connection based on the NBIFOM by using the APN 2. The NBIFOM allowed may be stored before the PDN connection is established.

FIG. 6B illustrates an example of HSS data for each PDN connection stored by the HSS 50. As is obvious from FIG. 6B, the HSS data for each PDN connection includes at least a Context ID, a PDN address, a PDN Type, an Access Point Name (APN), a WLAN offload ability, a PDN GW ID, and an NBIFOM Permission.

The Context ID is identification information on the context storing the HSS data for each PDN connection.

The PDN Address represents a registered IP address. The PDN Address is an IP address of the UE 10.

The PDN Type indicates the type of PDN Address. That is, the PDN Type is identification information for identifying IPv4, IPv6, or IPv4v6, for example. The APN is a label indicating an access destination in the network, in accordance with DNS naming convention.

The WLAN offload ability is identification information indicating whether traffic connected through this APN can perform offload to the WLAN or maintains the 3GPP connection by utilizing a cooperative function between the WLAN and the 3GPP. The WLAN offload ability may vary for each RAT type. Specifically, the LTE (E-UTRA) and the 3G (UTRA) may have different WLAN offload abilities.

The PDN GW identity is identification information for identifying the PGW 30 utilized in this APN. This identification information may be a Fully Qualified Domain Name (FQDN) or an IP address.

The NBIFOM permission is information indicating that this PDN connection has established the multi-access PDN connection based on the NBIFOM. In other words, the NBIFOM permission indicates that the first PDN connection has been established.

That is, the fact that the TWAG 74 has stored the NBIFOM permission means that this PDN connection is the first PDN connection.

The NBIFOM permission is identification information stored by the TWAG 74 upon the PDN connection based on the NBIFOM being established.

Specifically, for example, the HSS data for each PDN connection including the APN 1 may include the NBIFOM Permission, and the HSS data for each PDN connection including the APN 2 need not include the NBIFOM permission.

In other words, the PDN connection based on the APN 1 may be the first PDN connection, and the PDN connection based on the APN 2 must not be the first PDN connection.

2.2.3. UE Constitution

Next, the constitution of the UE 10 will be described. FIG. 7 illustrates a device constitution of the UE 10. As illustrated in FIG. 7, the UE 10 is constituted of an LTE interface unit 720, a WLAN interface unit 740, a control unit 700, and a storage 750.

The LTE interface unit 720, the WLAN interface unit 740, and the storage 750 are connected to the control unit 700 via a bus.

The control unit 700 is a function unit for controlling the UE 10. The control unit 700 implements various processes by reading out and executing various programs stored in the storage 750.

The LTE interface unit 720 is a function unit through which the UE 10 connects to an IP access network via an LTE base station. Furthermore, an external antenna 710 is connected to the LTE interface unit 720.

The WLAN interface unit 740 is a function unit through which the UE 10 connects to the IP access network via a WLAN AP. Furthermore, an external antenna 730 is connected to the WLAN interface unit 740.

The control unit 700 is a function unit for controlling the UE 10. The control unit 700 implements various processes by reading out and executing various programs stored in the storage 750.

The storage 750 is a function unit for storing programs, data, and the like necessary for each operation of the UE 10. The storage 750 is constituted of, for example, a semiconductor memory, a Hard Disk Drive (HDD), or the like.

As illustrated in FIG. 7, the storage 750 stores a UE context 752. Hereinafter, information elements stored in the storage 750 will be described. Note that the UE context 752 is classified into a UE context for each UE 10, a UE context for each PDN connection, and a UE context for each transfer path and/or bearer.

FIG. 8A is an example of the UE context stored for each UE 10. As illustrated in FIG. 8A, the UE context for each UE 10 includes an IMSI, an EMM State, a GUTI, an ME Identity, and a UE NBIFOM capability.

The IMSI is identification information assigned to a user (subscriber) using the UE 10. The EMM State indicates a mobility management state of the UE 10. For example, the EMM state may be EMM-REGISTERED in which the UE 10 is registered with the network (registered state) or EMM-DEREGISTERD in which the UE 10 is not registered with the network (deregistered state).

The GUTI is an abbreviation of "Globally Unique Temporary Identity," and is temporary identification information on the UE 10. The GUTI is constituted of identification information on the MME 40 (Globally Unique MME Identifier (GUMMEI)) and identification information on the UE 10 in a specific MME 40 (M-TMSI).

The ME identity is an ID of ME, and may be the IMEI/IMISV, for example.

The UE NBIFOM capability is the NBIFOM capability of the UE 10. The UE NBIFOM capability is identification information on each UE 10 indicating whether or not the capability of establishing the first PDN connection is supported. In other words, the UE NBIFOM capability is identification information on each UE 10 indicating whether or not the NBIFOM functionality is supported. More specifically, for example, the NBIFOM capability may include "allowed" or "Not allowed."

Note that the NBIFOM functionality may be information indicating the possession of functionality for establishing the multi-access PDN connection based on the NBIFOM.

Alternatively, the UE NBIFOM capability may be identification information indicating that the UE 10 has the capability of establishing the first PDN connection. That is, the existence of the UE NBIFOM capability in the storage of the UE 10 may mean that the UE 10 has functionality for establishing the first PDN connection.

In other words, the UE NBIFOM capability may be identification information indicating that the UE 10 supports the NBIFOM functionality. That is, the existence of the UE NBIFOM capability in the storage of the UE 10 may mean that the UE 10 supports the NBIFOM functionality.

FIG. 8B illustrates an example of the UE context for each PDN connection. As illustrated in FIG. 8B, the UE context for each PDN connection includes at least a PDN connection ID, an APN in Use, an IP address, a Default Bearer, a WLAN offload ability, a UE allowed mode, and an Operation mode.

The PDN connection ID is identification information for identifying a PDN connection. The UE 10, the TWAG 74, and the PGW 30 may store the same identification information.

The APN in Use is an APN utilized by the UE 10 most recently. This APN may be constituted of identification information on the network and identification information on a default operator.

The IP Address is an IP address assigned to the UE 10 through the PDN connection, and may be an IPv4 address or an IPv6 prefix.

The Default Bearer is EPS bearer identification information for identifying a default bearer in this PDN connection.

The WLAN offloadability is WLAN offload permission information indicating whether or not a communication associated with this PDN connection allows offload to the WLAN using an interworking function between the WLAN and the 3GPP, or maintains the 3GPP access.

The UE allowed mode is an Operation mode allowed by the UE 10. This identification information may indicate the UE Initiated mode, the Network Initiated mode, or both thereof.

The Operation mode is identification information on a mode that indicates which of the UE 10 and the network takes an initiative in transmitting/receiving data or is allowed to initiate communication control in a case that the current PDN connection is the first PDN connection.

FIG. 8C illustrates the UE context for each bearer. The UE context for each bearer includes transfer path identification information and a Routing Rule.

The transfer path identification information is information for identifying a transfer path and/or bearer. The transfer path identification information may be an EPS bearer ID, for example. Furthermore, the transfer path identification information may be associated with the TFT.

Here, the Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the TWAG 74. Alternatively, the Routing address may be an IP address of a Mobile Access Gateway (MAG).

The Routing Rule may be notified from the PGW 30 or the PCRF 60. Alternatively, the Routing Rule may be a value that the UE 10 stores beforehand as a default value.

The Routing Filter may include an IP header to switch an IP flow. Alternatively, the UE 10 may include an application ID in the Routing Filter to switch the flow for each application. Alternatively, the Routing Filter may include the TFT.

The Routing Rule may store multiple rules (regulations). Furthermore, the Routing Rule may include a priority for each rule.

FIG. 8D illustrates the TWAG capability. In the TWAG capability, identification information (NBIFOM capability) is stored for each TWAG 74, the identification information indicating whether or not the capability of establishing the first PDN connection is supported. In other words, the identification information indicates whether or not the TWAG 74 supports the NBIFOM functionality. Specifically, the NBIFOM capability may include "allowed" or "Not allowed."

Note that the NBIFOM functionality may be information indicating the possession of functionality for establishing the multi-access PDN connection based on the NBIFOM.

Alternatively, the NBIFOM capability may be identification information indicating the possession of capability of establishing the first PDN connection. That is, the existence of the NBIFOM capability in the storage may mean that the TWAG 74 is a gateway having functionality for establishing the first PDN connection. In other words, the existence of the NBIFOM capability in the storage may mean that the TWAG 74 is a gateway supporting the NBIFOM functionality.

The UE 10 may store the NBIFOM capability associated with the TWAG ID. Furthermore, the NBIFOM capability of a plurality of TWAGs 74 may be stored.

FIG. 8E illustrates an example of the Network capability. In the Network capability, the NBIFOM capability is stored for each network, i.e., for each PGW 30.

Here, the NBIFOM capability is identification information on each network indicating whether or not the capability of establishing the first PDN connection is supported. More specifically, for example, the NBIFOM capability may include "allowed" or "Not allowed."

Alternatively, the NBIFOM capability may be identification information indicating having capability of establishing the first PDN connection. That is, the existence of the NBIFOM capability may mean that the PGW 30 and/or the network is a gateway having a function of establishing the first PDN connection.

As illustrated in FIG. 8E, the TWAG 74 stores the NBIFOM capability associated with the PGW ID. Furthermore, as illustrated in FIG. 8E, the NBIFOM capability may be stored being associated with each of the multiple PGWs 30.

The PGW ID is information for identifying the PGW 30. The PGW ID may be an APN, for example.

FIG. 8F illustrates the MME capability. The MME capability stores, for each MME 40, identification information (NBIFOM capability) indicating whether or not the capability of establishing the first PDN connection is supported. In other words, the identification information indicates whether or not the MME 40 supports the NBIFOM functionality. Specifically, the NBIFOM capability may include "allowed" or "Not allowed."

Note that the NBIFOM functionality may be information indicating the possession of functionality for establishing the multi-access PDN connection based on the NBIFOM.

Alternatively, the NBIFOM capability may be identification information indicating the possession of capability of establishing the first PDN connection. That is, the existence of the NBIFOM capability in the storage may mean that the MME 40 is a gateway having functionality for establishing the first PDN connection. In other words, the existence of the NBIFOM capability in the storage may mean that the MME 40 is a gateway supporting the NBIFOM functionality.

The UE 10 may store the NBIFOM capability associated with the MME ID.

FIG. 8G illustrates the SGW capability. The SGW capability stores, for each SGW 35, identification information (NBIFOM capability) indicating whether or not the capability of establishing the first PDN connection is supported. In other words, it is identification information indicating whether or not the SGW 35 supports the NBIFOM functionality. Specifically, the NBIFOM capability may include "allowed" or "Not allowed."

Note that the NBIFOM functionality may be information indicating the possession of functionality for establishing the multi-access PDN connection based on the NBIFOM.

Alternatively, the NBIFOM capability may be identification information indicating the possession of capability of establishing the first PDN connection. That is, the existence of the NBIFOM capability in the storage may mean that the SGW 35 is a gateway having functionality for establishing the first PDN connection. In other words, the existence of the NBIFOM capability in the storage may mean that the SGW 35 is a gateway supporting the NBIFOM functionality.

The UE 10 may store the NBIFOM capability associated with the SGW ID.

The TWAG capability, the Network capability, the MME capability, and the SGW capability may be included in the UE context, or may be separated from the UE context.

That is, the UE 10 may store the TWAG capability and the network capability included in the UE context, or may store the TWAG capability and the Network capability separately from the UE context.

2.2.4. PGW Components

Next, the components of the PGW 30 will be described. FIG. 9 illustrates a device constitution of the PGW 30. As illustrated in FIG. 9, the PGW 30 is constituted of an IP mobile communication network interface unit 920, a control unit 900, and a storage 940. The IP mobile communication network interface unit 920 and the storage 940 are connected to the control unit 900 via a bus.

The control unit 900 is a function unit for controlling the PGW 30. The control unit 900 implements various processes by reading out and executing various programs stored in the storage 940.

The IP mobile communication network interface unit 920 is a function unit through which the PGW 30 is connected to the SGW 35 and/or the PCRF 60 and/or the ePDG 65 and/or the AAA 55 and/or the GW 74.

The storage 940 is a function unit for storing programs, data, and the like necessary for each operation of the PGW 30. The storage 940 is constituted of, for example, a semiconductor memory, a Hard Disk Drive (HDD), or the like.

As illustrated in FIG. 9, the storage 940 stores an EPS bearer context 942. Note that the EPS bearer context includes an EPS bearer context stored for each UE 10, an EPS bearer context stored for each APN, an EPS bearer context stored for each PDN connection, and an EPS bearer context stored for each transfer path and/or bearer.

First, the EPS bearer context for each UE 10 will be described. FIG. 10A illustrates an example of the EPS bearer context for each UE 10. As illustrated in FIG. 10A, the EPS bearer context includes at least an IMSI, an ME identity, an MSISDN, and a UE NBIFOM capability. The IMSI is information for identifying a user of the UE 10.

The ME identity is an ID of ME, and may be the IMEI/IMISV, for example.

The MSISDN represents the phone number of the UE 10.

The UE NBIFOM capability is the NBIFOM capability of the UE 10. The UE NBIFOM capability is identification information on each UE 10 indicating whether or not the capability of establishing the first PDN connection is supported. More specifically, for example, the NBIFOM capability may include "allowed" or "Not allowed."

Alternatively, the UE NBIFOM capability may be identification information indicating that the UE 10 has the capability of establishing the first PDN connection. That is, the existence of the UE NBIFOM capability may mean that the UE 10 has functionality for establishing the first PDN connection.

Next, the EPS bearer context for each PDN connection will be described. FIG. 10B illustrates an example of the EPS bearer context for each PDN connection.

As illustrated in FIG. 10B, the context includes at least a PDN connection ID, an IP address, a PDN type, an APN, a Network allowed mode, and an Operation mode.

The PDN connection ID is identification information for identifying a PDN connection. The UE 10, the TWAG 74, the MME 40, and the PGW 30 may store the same identification information.

The IP Address indicates an IP address assigned to the UE 10 for this PDN connection. The IP address may be an IPv4 and/or IPv6 prefix.

The PDN type indicates the type of IP address. The PDN type indicates IPv4, IPv6 or IPv4v6, for example. The APN is a label indicating an access destination in the network, in accordance with DNS naming convention.

The Network allowed mode indicates an Operation mode allowed by the network. The Network allowed mode may include the UE Initiated mode, the Network Initiated mode, or both thereof.

The Operation mode is identification information on a mode that indicates which of the UE 10 and the network takes an initiative in transmitting/receiving data or is allowed to initiate communication control in a case that the current PDN connection is the first PDN connection.

More specifically, for example, the UE Initiated mode that allows the UE 10 to initiate the communication control or the Network Initiated mode that allows the network to initiate the communication control may be identified.

Next, an example of the EPS bearer context for each transfer path and/or bearer will be described with reference to FIG. 10C. As illustrated in FIG. 10C, the context includes at least transfer path identification information and a Routing Rule.

The transfer path identification information is information for identifying a transfer path and/or bearer. The transfer path identification information may be an EPS bearer ID, for example.

Furthermore, the transfer path identification information may be associated with the TFT.

The Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the TWAG 74. Alternatively, the Routing address may be an IP address of a Mobile Access Gateway (MAG).

The Routing Rule may be notified from the PGW 30 or the PCRF 60. Alternatively, the Routing Rule may be a value that the UE 10 prestores as a default value.

The PGW 30 may include an IP header in the Routing Filter to switch the IP flow. Alternatively, the PGW 30 may include an application ID in the Routing Filter to switch the flow for each application. Alternatively, the Routing Filter may include the TFT.

The Routing Rule may store multiple rules. Furthermore, the Routing Rule may include a priority for each rule.

FIG. 10D illustrates the TWAG capability. In the TWAG capability, identification information (NBIFOM capability) is stored for each TWAG 74, the identification information indicating whether or not the capability of establishing the first PDN connection is supported. In other words, the identification information indicates whether or not the TWAG 74 supports the NBIFOM functionality. Specifically, the NBIFOM capability may include "allowed" or "Not allowed."

Note that the NBIFOM functionality may be information indicating the possession of functionality for establishing the multi-access PDN connection based on the NBIFOM.

Alternatively, the NBIFOM capability may be identification information indicating the possession of capability of establishing the first PDN connection. That is, the existence of the NBIFOM capability in the storage may mean that the TWAG 74 is a gateway having functionality for establishing the first PDN connection. In other words, the existence of the NBIFOM capability in the storage may mean that the TWAG 74 is a gateway supporting the NBIFOM functionality.

The PGW 30 may store the NBIFOM capability associated with the TWAG ID.

FIG. 10E illustrates an example of the Network capability. In the Network capability, the NBIFOM capability is stored for each network, i.e., for each PGW 30.

Here, the NBIFOM capability is identification information on each network indicating whether or not the capability of establishing the first PDN connection is supported. More specifically, for example, the NBIFOM capability may include "allowed" or "Not allowed."

Alternatively, the NBIFOM capability may be identification information indicating the possession of capability of establishing the first PDN connection. That is, the existence of the NBIFOM capability may mean that the PGW 30 and/or the network is a gateway having functionality for establishing the first PDN connection.

As illustrated in FIG. 10E, the PGW 30 stores the NBIFOM capability associated with the PGW ID. Furthermore, as illustrated in FIG. 8E, the NBIFOM capability may be stored being associated with each of the multiple PGWs 30.

The PGW ID may be any information for identifying the PGW 30, and may be an APN, for example.

FIG. 10F illustrates the MME capability. The MME capability stores, for each MME 40, identification information (NBIFOM capability) indicating whether or not the capability of establishing the first PDN connection is supported. In other words, it is identification information indicating whether or not the MME 40 supports the NBIFOM functionality. Specifically, the NBIFOM capability may include "allowed" or "Not allowed."

Note that the NBIFOM functionality may be information indicating the possession of functionality for establishing the multi-access PDN connection based on the NBIFOM.

Alternatively, the NBIFOM capability may be identification information indicating the possession of capability of establishing the first PDN connection. That is, the existence of the NBIFOM capability in the storage may mean that the MME 40 is a gateway having functionality for establishing the first PDN connection. In other words, the existence of the NBIFOM capability in the storage may mean that the MME 40 is a gateway supporting the NBIFOM functionality.

The PGW 30 may store the NBIFOM capability associated with the MME ID.

FIG. 10G illustrates the SGW capability. The SGW capability stores, for each SGW 35, identification information (NBIFOM capability) indicating whether or not the capability of establishing the first PDN connection is supported. In other words, it is identification information indicating whether or not the SGW 35 supports the NBIFOM functionality. Specifically, the NBIFOM capability may include "allowed" or "Not allowed."

Note that the NBIFOM functionality may be information indicating the possession of functionality for establishing the multi-access PDN connection based on the NBIFOM.

Alternatively, the NBIFOM capability may be identification information indicating the possession of capability of establishing the first PDN connection. That is, the existence of the NBIFOM capability in the storage may mean that the SGW 35 is a gateway having functionality for establishing the first PDN connection. In other words, the existence of the NBIFOM capability in the storage may mean that the SGW 35 is a gateway supporting the NBIFOM functionality.

The PGW 30 may store the NBIFOM capability associated with the SGW ID.

The TWAG capability, the Network capability, the MME capability, and the SGW capability may be included in the EPS bearer context, or may be separated from the UE context.

2.2.5. PCRF Components

Next, components of the PCRF 60 will be described. FIG. 11 illustrates a device constitution of the PCRF 60. As illustrated in FIG. 11, the PCRF 60 is constituted of an IP mobile communication network interface unit 1120, a control unit 1100, and a storage 1140. The IP mobile communication network interface unit 1120 and the storage 1140 are connected to the control unit 1100 via a bus.

The control unit 1100 is a function unit for controlling the PCRF 60. The control unit 1100 implements various processes by reading out and executing various programs stored in the storage 1140.

The IP mobile communication network interface unit 1120 is a function unit through which the PCRF 60 is connected to the PGW 30 and/or the TWAG 74 and/or the AAA 55.

The storage 1140 is a function unit for storing programs, data, and the like necessary for each operation of the PCRF 60. The storage 940 is constituted of, for example, a semiconductor memory, a Hard Disk Drive (HDD), or the like.

As illustrated in FIG. 11, the storage 1140 stores UE context 1142. Note that the UE context may be classified into the UE context stored for each UE 10 and the UE context stored for each PDN connection.

FIG. 12A illustrates the UE context for each UE 10. As illustrated in FIG. 12A, the context includes at least a Subscriber ID and UE NBIFOM capability.

The Subscriber ID is identification information on a user. For example, the Subscriber ID may be an IMSI.

The UE NBIFOM capability is the NBIFOM capability of the UE 10. The UE NBIFOM capability is identification information on each UE 10 indicating whether or not the capability of establishing the first PDN connection is supported. In other words, the UE NBIFOM capability is identification information indicating whether or not the UE 10 supports the NBIFOM functionality. More specifically, for example, the NBIFOM capability may include "allowed" or "Not allowed."

Alternatively, the UE NBIFOM capability may be identification information indicating that the UE 10 has the capability of establishing the first PDN connection. That is, the existence of the UE NBIFOM capability may mean that the UE 10 has functionality for establishing the first PDN connection.

In other words, the UE NBIFOM capability may be identification information indicating that the UE 10 supports the NBIFOM functionality. That is, the existence of the UE NBIFOM capability in the storage may mean that the UE 10 supports the NBIFOM functionality.

Next, the UE context for each PDN connection will be described. FIG. 12B illustrates an example of the UE context for each PDN connection. As illustrated in FIG. 12B, the context may include at least an APN, an Operation mode, a Network Policy, a Charging Rule, a PCC Rule, and a QoS Rule. The APN is a label indicating an access destination in the network, in accordance with DNS naming convention.

The Operation mode is identification information on a mode that indicates which of the UE 10 and the network takes an initiative in transmitting/receiving data or is allowed to initiate communication control in a case that the PDN connection is the first PDN connection.

More specifically, for example, an Operation mode that allows the UE 10 to initiate the communication control may be a UE Initiated mode.

Furthermore, an Operation mode that allows the network and/or the PGW 30 and/or the PCRF 60 to initiate the communication control may be a Network Initiated mode.

The Network Policy is a communication control policy on the network side, and may include the Network allowed mode. Alternatively, the PCRF 60 may store the Network allowed mode separately from the Network Policy.

The Charging Rule is a regulation on charging. In accordance with the Charging Rule determined by the PCRF 60, the PCEF 60 performs charging.

The PCC Rule is a regulation relating to control of the Network Policy and Charging Rule. In accordance with the PCC Rule, the PCEF performs communication control and charging.

The QoS Rule is a regulation relating to QoS of the flow. The QoS Rule may be associated with the PCC Rule.

FIG. 12C illustrates the UE context for each transfer path and/or bearer. As illustrated in FIG. 12C, the UE context for each transfer path and./or bearer includes at least the Routing Rule.

The Routing Rule indicates an association of a Routing Filter, and a Routing address or Routing access type. Based on this association, whether using a communication path through the 3GPP access network or using a transfer path through the WLAN access network is determined.

Here, the Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the TWAG 74. Alternatively, the Routing address may be an IP address of a Mobile Access Gateway (MAG).

The Routing Rule may be notified from the UE 10 and/or the TWAG 74 and/or the PGW 30. Alternatively, the Routing Rule may be a value that the PCRF 60 prestores as a default value. In this case, the PCRF 60 may determine the default value of the Routing Rule based on the PCC Rule.

The Routing Filter may include an IP header to switch an IP flow. Alternatively, the Routing Filter may include an application ID to switch the flow for each application. Alternatively, the Routing Filter may include a TFT.

The Routing Rule may store multiple rules. Furthermore, the Routing Rule may include a priority for each rule.

FIG. 12D illustrates an example of the TWAG capability stored by the TWAG 74. In the TWAG capability, identification information (NBIFOM capability) is stored for each TWAG 74, the identification information indicating whether or not the capability of establishing the first PDN connection is supported. In other words, the identification information indicates whether or not the TWAG 74 supports the NBIFOM functionality. Specifically, the NBIFOM capability may include "allowed" or "Not allowed."

Note that the NBIFOM functionality may be information indicating the possession of functionality for establishing the multi-access PDN connection based on the NBIFOM.

Alternatively, the NBIFOM capability may be identification information indicating the possession of capability of establishing the first PDN connection. That is, the existence of the NBIFOM capability in the storage may mean that the TWAG 74 is a gateway having functionality for establishing the first PDN connection. In other words, the existence of the NBIFOM capability in the storage may mean that the TWAG 74 is a gateway supporting the NBIFOM functionality.

As illustrated in FIG. 12D, the NBIFOM capability may be stored being associated with the TWAG ID that is the identification information on the TWAG 74. In a case that the NBIFOM capability is not associated with the TWAG ID, the NBIFOM capability may refer to the capability of the TWAG 74 to be stored.

In a case that the TWAG ID and the NBIFOM capability are stored being associated with each other, the PCRF 60 may store the TWAG capabilities of multiple TWAGs 74.

FIG. 12E illustrates an example of the Network capability stored by the PCRF 60. In the Network capability, the NBIFOM capability is stored for each network, i.e., for each PGW 30.

Here, the NBIFOM capability is identification information on each network indicating whether or not the capability of establishing the first PDN connection is supported. In other words, the identification information indicates whether or not the PGW 30 supports the NBIFOM functionality. More specifically, for example, the NBIFOM capability may include "allowed" or "Not allowed."

Note that the NBIFOM functionality may be information indicating the possession of functionality for establishing the multi-access PDN connection based on the NBIFOM.

Alternatively, the NBIFOM capability may be identification information indicating the possession of capability of establishing the first PDN connection. In other words, the NBIFOM capability may be identification information indicating that it is a gateway supporting the NBIFOM functionality. That is, the existence of the NBIFOM capability in the storage may mean that the PGW 30 is a gateway having functionality for establishing the first PDN connection. In other words, the existence of the NBIFOM capability in the storage may mean that the PGW 30 is a gateway supporting the NBIFOM functionality.

FIG. 12F illustrates the MME capability. The MME capability stores, for each MME 40, identification information (NBIFOM capability) indicating whether or not the capability of establishing the first PDN connection is supported. In other words, it is identification information indicating whether or not the MME 40 supports the NBIFOM functionality. Specifically, the NBIFOM capability may include "allowed" or "Not allowed."

Note that the NBIFOM functionality may be information indicating the possession of functionality for establishing the multi-access PDN connection based on the NBIFOM.

Alternatively, the NBIFOM capability may be identification information indicating the possession of capability of establishing the first PDN connection. That is, the existence of the NBIFOM capability in the storage may mean that the MME 40 is a gateway having functionality for establishing the first PDN connection. In other words, the existence of the NBIFOM capability in the storage may mean that the MME 40 is a gateway supporting the NBIFOM functionality.

The PCRF 60 may store the NBIFOM capability associated with the MME ID.

FIG. 12G illustrates the SGW capability. The SGW capability stores, for each SGW 35, identification information (NBIFOM capability) indicating whether or not the capability of establishing the first PDN connection is supported. In other words, it is identification information indicating whether or not the SGW 35 supports the NBIFOM functionality. Specifically, the NBIFOM capability may include "allowed" or "Not allowed."

Note that the NBIFOM functionality may be information indicating the possession of functionality for establishing the multi-access PDN connection based on the NBIFOM.

Alternatively, the NBIFOM capability may be identification information indicating the possession of capability of establishing the first PDN connection. That is, the existence of the NBIFOM capability in the storage may mean that the SGW 35 is a gateway having functionality for establishing the first PDN connection. In other words, the existence of the NBIFOM capability in the storage may mean that the SGW 35 is a gateway supporting the NBIFOM functionality.

The PCRF 60 may store the NBIFOM capability associated with the SGW ID.

2.2.6. MME Constitution

A device constitution of the MME 40 will be described. The MME 40 is constituted of the IP mobile communication network interface unit 320, the control unit 300, and the storage 340. The IP mobile communication network interface unit 320 and the storage 340 are connected to the control unit 300 via a bus.

The control unit 300 is a function unit for controlling the MME 40. The control unit 300 implements various processes by reading out and executing various programs stored in the storage 340.

The IP mobile communication network interface unit 320 is a function unit through which the MME 40 is connected to the PGW 30.

The storage 340 is a function unit for storing programs, data, and the like necessary for each operation of the MME 40. The storage 340 is constituted of, for example, a semiconductor memory, a Hard Disk Drive (HDD), or the like.

The storage 340 stores an MME capability 342, the network capability 344, and the EPS bearer context 346. Hereinafter, information elements stored in the storage 340 will be described.

Information elements stored in the storage 340 will be described. An example of the MME capability stored by the MME 40 will be illustrated. The MME capability stores, for each MME 40, identification information (NBIFOM capability) indicating whether or not the capability of establishing the first PDN connection is supported. In other words, it is identification information indicating whether or not the MME 40 supports the NBIFOM functionality. Specifically, the NBIFOM capability may include "allowed" or "Not allowed."

Note that the NBIFOM functionality may be information indicating the possession of functionality for establishing the multi-access PDN connection based on the NBIFOM.

Alternatively, the NBIFOM capability may be identification information indicating the possession of capability of establishing the first PDN connection. That is, the existence of the NBIFOM capability in the storage may mean that the MME 40 is a location management device having functionality for establishing the first PDN connection. In other words, the existence of the NBIFOM capability in the storage may mean that the MME 40 is a location management device supporting the NBIFOM functionality.

The NBIFOM capability may be stored being associated with the MME ID that is the identification information on the MME 40. In a case that the NBIFOM capability is not associated with the MME ID, the NBIFOM capability may refer to the capability of the MME 40 to be stored.

In a case that the MME ID and the NBIFOM capability are stored being associated with each other, the MME 40 may store the MME capabilities of multiple MMEs 40.

In this case, when the UE 10 performs handover to another MME 40, the MME 40 may select an MME 40 to which the handover is made, based on the MME capability.

Next, the Network capability 344 will be described. An example of the Network capability stored by the MME 40 will be described. The Network capability stores the NBIFOM capability for each network, i.e., for each PGW 30.

Here, the NBIFOM capability is identification information on each network indicating whether or not the capability of establishing the first PDN connection is supported. In other words, the identification information indicates whether or not the PGW 30 supports the NBIFOM functionality. More specifically, for example, the NBIFOM capability may include "allowed" or "Not allowed."

Note that the NBIFOM functionality may be information indicating the possession of functionality for establishing the multi-access PDN connection based on the NBIFOM.

Alternatively, the NBIFOM capability may be identification information indicating the possession of capability of establishing the first PDN connection. In other words, the NBIFOM capability may be identification information indicating that it is a location management device supporting the NBIFOM functionality. That is, the existence of the NBIFOM capability in the storage may mean that the PGW 30 is a gateway having functionality for establishing the first PDN connection. In other words, the existence of the NBIFOM capability in the storage may mean that the PGW 30 is a location management device supporting the NBIFOM functionality.

The MME 40 stores the NBIFOM capability associated with the PGW ID. Furthermore, the NBIFOM capability may be stored being associated with each of the multiple PGWs 30.

The PGW ID may be any information for identifying the PGW 30, and may be an Access Point Name (APN), for example.

Next, the EPS bearer context will be described. The EPS bearer context may be classified into the EPS bearer context for each UE 10 stored for each UE 10, the EPS bearer context for each PDN connection, and the EPS bearer context for each bearer and/or transfer path.

Information elements included in the EPS bearer context for each UE 10 will be described. The MME 40 stores, for each UE 10, the UE NBIFOM capability and the NBIFOM allowed.

The UE NBIFOM capability is the NBIFOM capability of the UE 10. The UE NBIFOM capability is identification information on each UE 10 indicating whether or not the capability of establishing the first PDN connection is supported. In other words, the UE NBIFOM capability is identification information indicating whether or not the UE 10 supports the NBIFOM functionality. More specifically, for example, the UE NBIFOM capability may include "allowed" or "Not allowed."

Note that the NBIFOM functionality may be information indicating the possession of functionality for establishing the multi-access PDN connection based on the NBIFOM.

Alternatively, the UE NBIFOM capability may be identification information indicating that the UE 10 has the capability of establishing the first PDN connection. That is, the existence of the UE NBIFOM capability may mean that the UE 10 has functionality for establishing the first PDN connection.

In other words, the UE NBIFOM capability may be identification information indicating that the UE 10 supports the NBIFOM functionality. That is, the existence of the UE NBIFOM capability in the storage may mean that the UE 10 supports the NBIFOM functionality.

Furthermore, the NBIFOM allowed is identification information indicating an APN that is allowed to establish a PDN connection using the NBIFOM. The NBIFOM may be associated with at least the APN. The NBIFOM allowed may be associated with multiple APNs.

In the present embodiment, the APN 1 is associated with the NBIFOM allowed. That is, the APN 1 is allowed to establish the multi-access PDN connection. In other words, in the present embodiment, the UE 10 is allowed to establish the multi-access PDN connection based on the NBIFOM by using the APN 1. Note that the APN 1 is also allowed to establish the PDN connection of the related art, rather than the multi-access PDN connection.

In addition, in the present embodiment, the APN 2 is not associated with the NBIFOM allowed. That is, in the present embodiment, the APN 2 is not allowed to establish the multi-access PDN connection based on the NBIFOM. That is, in the present embodiment, the UE 10 cannot establish the multi-access PDN connection based on the NBIFOM by using the APN 2. The NBIFOM allowed may be stored before the PDN connection is established.

The MME 40 may access the HSS 50 to acquire the NBIFOM allowed before the PDN connection is established and/or during the establishment procedure.

Furthermore, the EPS bearer context for each UE 10 may include the identification information on the UE 10. The identification information on the UE 10 may be an IMSI.

The EPS bearer context for each PDN connection will be described. The EPS bearer context for each PDN connection includes a PDN connection ID, a Network allowed mode, an Operation mode, a User plane connection ID, an MME MAC address, and an NBIFOM Permission.

The PDN connection ID is identification information for identifying a PDN connection. The UE 10, the MME 40, and the PGW 30 may store the same identification information.

The Operation mode is identification information on a mode that indicates which of the UE 10 and the network takes an initiative in transmitting/receiving data or is allowed to initiate communication control in a case that the PDN connection is the first PDN connection.

More specifically, for example, an Operation mode that allows the UE 10 to initiate the communication control may be a UE-Initiated mode.

Furthermore, an Operation mode that allows the network and/or the PGW 30 and/or the PCRF 60 to initiate the communication control may be a Network Initiated mode.

The Network allowed mode indicates an Operation mode allowed by the network. The Network allowed mode may include the UE-Initiated mode, the Network Initiated mode or both thereof.

The User plane connection ID is identification information for identifying a connection used for transmission of user data in a case that the UE 10 has established a transfer path via the MME 40.

The NBIFOM permission is information indicating that this PDN connection has established the multi-access PDN connection. In other words, the NBIFOM permission indicates that the first PDN connection has been established.

That is, the fact that the MME 40 stores the NBIFOM permission means that this PDN connection is the first PDN connection.

The NBIFOM permission is identification information stored by the MME 40 upon the PDN connection being established.

The MME 40 may access the HSS 50 to acquire the NBIFOM permission during the establishment of the PDN connection. Alternatively, the MME 40 may store the NBIFOM Permission based on the fact that the multi-access PDN connection has been established.

Next, the EPS bearer context for each bearer and/or transfer path will be described. The EPS bearer context for each bearer and/or transfer path may include the transfer path identification information and the Routing Rule.

The transfer path identification information is information for identifying a transfer path and/or bearer. The transfer path identification information may be an EPS bearer ID, for example.

The Routing Rule indicates an association of a Routing Filter, and a Routing address or Routing access type. Based on this association, whether using a communication path through the 3GPP access network or using a communication path through the WLAN access network is determined.

Here, the Routing access type indicates an access network through which the flow passes. For example, the Routing access type indicates the 3GPP or the WLAN.

Furthermore, the Routing address indicates an IP address through which the flow can pass. For example, the Routing address may be an IP address of the SGW 35. Alternatively, the Routing address may be an IP address of the MME 40. Alternatively, the Routing address may be an IP address of a Mobile Access Gateway (MAG).

The Routing Rule may be notified from the PGW 30 or the PCRF 60, or may be notified from the UE 10. Alternatively, the Routing Rule may be a value that the MME 40 prestores as a default value.

The Routing Filter may include an IP header to switch an IP flow. Alternatively, the Routing Filter may include an application ID to switch the flow for each application. Alternatively, the Routing Filter may include a TFT.

The Routing Rule may store multiple rules. Furthermore, the Routing Rule may include a priority for each rule.

The SGW capability stores, for each SGW 35, identification information (NBIFOM capability) indicating whether or not the capability of establishing the first PDN connection is supported. In other words, it is identification information indicating whether or not the SGW 35 supports the NBIFOM functionality. Specifically, the NBIFOM capability may include "allowed" or "Not allowed."

Note that the NBIFOM functionality may be information indicating the possession of functionality for establishing the multi-access PDN connection based on the NBIFOM.

Alternatively, the NBIFOM capability may be identification information indicating the possession of capability of establishing the first PDN connection. That is, the existence of the NBIFOM capability in the storage may mean that the SGW 35 is a gateway having functionality for establishing the first PDN connection. In other words, the existence of the NBIFOM capability in the storage may mean that the SGW 35 is a gateway supporting the NBIFOM functionality.

The MME 40 may store the NBIFOM capability associated with the SGW ID.

The MME capability and the Network capability may be included in the EPS bearer context.

2.3. Description of Initial State

An initial state in the present embodiment will be described. The initial state in the present embodiment may be a first initial state described below.

Note that the initial state in the present embodiment may not be limited to the first initial state.

2.3.1. Description of First Initial State

The first initial state will be described. In the first state, the UE 10 has not yet established the first PDN connection with the core network 90. However, the UE 10 has already established the second PDN connection. In more detail, the UE 10 has not yet established the first PDN connection with a PGW_A 1310. However, the UE 10 has already established the second PDN connection with a PGW_B 1320.

Note that the PGW_A 1310 may be a gateway device selected by using the APN 1. The PGW_B 1320 may be a gateway device selected by using the APN 2. Moreover, the PGW_A 1310 and the PGW_B 1320 may be the PGW 30. Furthermore, the selection of gateway using the APN 1 and/or the APN 2 may be performed by the TWAG 74 included and located in the access network B and/or the MME 40 included and located in the core network 90.

In addition, the gateway device selected by using the APN 1 and the gateway device selected by using the APN 2 may be the same gateway device. In this case, the PGW_A 1310 and the PGW_B 1320 may be the same device.

Note that the second PDN connection may be constituted of a transfer path between the UE 10 and the PGW 30 through the access network A. Thus, the second PDN connection may be constituted of a transfer path that is a combination of a transfer path between the UE 10 and the eNB 45, a transfer path between the eNB 45 and the SGW 35, and a transfer path between the SGW 35 and the PGW_B 1320. Here, the transfer path may be a bearer.

As described above, in the first initial state, the UE 10 may be in a state of being connected to the core network 90 via the access network A.

Note that the UE 10 need not have a connection to the core network 90 via the access network B. In other words, the UE 10 need not have Attach established through the WLAN access network.

Alternatively, the UE 10 may be in a state of being connected to the core network 90 via the access network B. In this case, the UE 10 may perform an Attach procedure initiated by the UE 10 to establish the third PDN connection.

Note that the third PDN connection may be established with the gateway selected by using the APN 2. Alternatively, the third PDN connection may be established with a gateway selected by using another APN different from the APN 1 or the APN 2.

The first initial state has been described above; however, the first initial state is not limited to the above-described state, and only needs to be a state in which the multi-access PDN connection based on the NBIFOM has not been established through the access network B, for example.

2.3.2. Description of Procedure for Leading to First Initial State

A procedure for leading to the first initial state will be described with reference to FIG. 15. In the procedure for leading to the first initial state, at least a PDN connectivity procedure to the core network 90 through the access network A, illustrated in (A) of FIG. 15, is performed. The first initial state is a state after at least the Attach procedure to the core network 90 through the access network A, illustrated in (A) of FIG. 15, is performed.

Next, details of the Attach procedure to the core network 90 through the access network A will be described.

The UE 10 performs an Attach procedure for establishing the second PDN connection with the core network 90 through the access network A. In more detail, the UE 10 establishes, via the eNB 45 located in the access network A and the SGW 35 located in the core network 90, the PDN connection with the PGW_B 1320 located in the core network 90. Note that the establishment and management of the PDN connection are performed by the MME 40 located in the core network 90. Furthermore, the MME 40 also performs the selection of the SGW 35 and the selection of the PGW 30 using the APN.

Specifically, when establishing the second PDN connection, the UE 10 transmits an Attach request to the MME 40 via the eNB 45. The MME 40 receives the Attach request transmitted by the UE 10. Based on the reception of the Attach request, the MME 40 performs a procedure for establishing a security association with the UE 10.

Here, the UE 10 may transmit the Attach request including the APN 2. Alternatively, the UE 10 may transmit the APN 2 to the MME 40 after a security association procedure between the UE 10 and the MME 40 (described below) is completed.

Based on the completion of the security association procedure, the MME 40 transmits an Attach accept to the UE 10 via the eNB 45. The MME 40 may transmit an Activate default EPS bearer context request including the APN 2.

The UE 10 receives the Attach accept transmitted by the MME 40. Based on the Attach accept, the UE 10 transmits an Attach complete to the MME 40 via the eNB 45.

The MME 40 receives the Attach request transmitted by the UE 10.

2.3.3. Description of Multi-Access PDN Connection Establishment Procedure

Next, an establishment procedure of the first PDN connection will be described. Here, the initial state may be the first initial state. In the present embodiment, after the establishment of the initial state, the UE 10 performs a PDN connectivity procedure for establishing the first PDN connection with the core network 90 through the access network A. In more detail, the UE 10 establishes, via the eNB 45 located in the access network A and the SGW 35 located in the core network 90, the first PDN connection with the PGW_A 1310 located in the core network 90.

Note that the first PDN connection may be constituted of a transfer path that is a combination of a transfer path between the UE 10 and the eNB 45, a transfer path between the eNB 45 and the SGW 35, and a transfer path between the eNB 45 and the PGW_A 1310. Here, the transfer path may be a bearer.

As illustrated in FIG. 15, the procedure for establishing the first PDN connection may be a PDN connectivity procedure using the APN 1.

A specific example of the PDN connectivity procedure will be described below.

2.4. Examples of PDN Connectivity Procedure

Examples of the first to fourth PDN connectivity procedures for establishing the first PDN connection will be described with reference to FIGS. 16 to 18.

2.4.1. Example of First PDN Connectivity Procedure

An example of the first PDN connectivity procedure will be described with reference to FIG. 16.

The UE 10 first transmits a PDN connectivity request to the MME 40 via the eNB 45 (S1902). The UE 10 may transmit the PDN connectivity request including at least a PDN connectivity request message identity (PDN connectivity request message ID), a Procedure transaction identity (Procedure transaction ID), a Request type (request type), a PDN type, a Protocol discriminator, and an EPS bearer identify (EPS bearer ID). Furthermore, the UE 10 may include at least the first identification information and/or the fifth identification information in the PDN connectivity request. Moreover, the UE 10 may include the Access Point Name (APN) and/or Protocol Configuration Options (PCOs) and/or the Traffic Flow Templates (TFTs) in the PDN connectivity request. Note that the UE 10 may transmit the PCO including the first identification information and/or the fifth identification information and/or the TFT.

Here, the first identification information may be the UE NBIFOM capability representing that the UE 10 supports the NBIFOM. Note that the NBIFOM capability may be information indicating the possession of functionality for establishing the multi-access PDN connection based on the NBIFOM.

Furthermore, the fifth identification information may be a Mode Indication representing an NBIFOM operation mode for the multi-access PDN connection based on the NBIFOM, whose establishment is requested by the UE 10. Note that the UE 10 may include the UE-Initiated mode or the Network-Initiated mode in the fifth identification information.

Note that the first identification information may be the fifth identification information. More specifically, the UE 10 may represent, by transmitting the mode indication, that the UE 10 supports the NBIFOM.

As described above, the UE 10 may transmit the PDN connectivity request including the first identification information and/or fifth identification information to request the establishment of the multi-access PDN connection based on the NBIFOM.

The PDN connectivity request message ID may be a message type representing the PDN connectivity request message.

The Procedure transaction ID may be information for identifying the PDN connectivity procedure.

The APN may be an APN to which the UE 10 requests a connection. More specifically, the APN may be the APN 1. The UE 10 may include the APN 1 to establish the multi-access PDN connection based on the NBIFOM. Here, the APN 1 may be an APN that is allowed to establish the multi-access PDN connection based on the NBIFOM and/or an APN that is allowed to perform communication based on the NBIFOM.

The request type may be information for identifying the type of the requested PDN connectivity procedure. For example, the UE 10 performs an initial connection by using the APN 1, so the request type may be the type indicating Attach, rather than the type indicating handover.

The PDN type may indicate an available IP version. For example, the PDN type may be IPv4, IPv6, or IPv4v6.

The Protocol discriminator may be a discriminator representing the type of protocol used for transmitting/receiving the PDN connectivity request.

The EPS bearer ID may be information for identifying the EPS bearer. The EPS bearer ID may be assigned by the MME 40.

The PCO may be protocol information associated with the PDN connection. Furthermore, the PCO may include identification information on the request. Note that the UE 10 may transmit the PCO including the first identification information.

The TFT may be information for identifying an IP flow that performs communication by using the PDN connection established in the present PDN connectivity procedure. Note that the IP flow to be identified may vary for each application. Thus, user data of a specific application can be identified by the TFT.

More specifically, the TFT may be constituted of five-tuple, or may be constituted of identification information such as the application ID. Note that the five-tuple may be constituted of a combination of one or more of a source IP address, a destination IP address, a source port number, a destination port number, and a protocol number.

In a case that the UE 10 requests the establishment of the multi-access PDN connection based on the NBIFOM of the UE-Initiated mode, the UE 10 may include the TFT in the PDN connectivity request. Alternatively, in a case that the UE 10 requests the establishment of the multi-access PDN connection based on the NBIFOM of the Network-Initiated mode, the UE 10 need not include the TFT in the PDN connectivity request.

In other words, in a case that the UE 10 includes the UE-Initiated mode in the fifth identification information, the UE 10 may include the TFT in the PDN connectivity request. Alternatively, in a case that the UE 10 includes the Network-Initiated mode in the fifth identification information, the UE 10 need not include the TFT in the PDN connectivity request.

Note that, in the related art, the UE 10 can perform transmission, with information indicating the IFOM support included in the PCO. Here, the IFOM support is identification information representing that the IP Flow Mobility (IFOM) is supported. Furthermore, the IFOM is a technique for switching a communication path of a specific IP flow by using the Dual Stack Mobile IPv6 (DSMIPv6) protocol. Thus, including the information indicating the IFOM support in the PCO allows the UE 10 to switch the access network through which the communication of a specific IP flow is performed.

In the present embodiment, in a case that the UE 10 includes the first identification information and/or fifth identification information in the PCO, the UE 10 does not include the IFOM support. In contrast, in a case that the UE 10 includes the IFOM support in the PCO, the UE 10 does not include either the first identification information or the fifth identification information. As described above, a configuration may be made in which whether to use the switching of the communication path based on the NBIFOM or the switching of the communication path based on the IFOM is clearly defined by disabling both of the first identification information and the IFOM support.

Thus, the UE 10 can establish either the PDN connection supporting the IFOM or the PDN connection supporting the NBIFOM, in the establishment procedure of a single PDN connection. In other words, the single PDN connection is the PDN connection supporting the NBIFOM, the PDN connection supporting the IFOM, or the single-access PDN connection.

The MME 40 receives the PDN connectivity request transmitted by the UE 10. Based on the reception of the PDN connectivity request, and/or the first identification information included in the PDN connectivity request, and/or the fifth identification information included in the PDN connectivity request, the MME 40 transmits a Create Session Request to the SGW 35 (S1904).

Based on the reception of the PDN connectivity request and/or the first identification information included in the PDN connectivity request, the MME 40 may transmit the Create Session Request including at least the first identification information.

Based on the reception of the PDN connectivity request and/or the fifth identification information included in the PDN connectivity request, the MME 40 may transmit the Create Session Request including at least the fifth identification information. The MME 40 may include the TFT in the Create Session Request, based on the reception of the TFT transmitted by the UE 10.

Furthermore, the TFT may be information for identifying an IP flow that performs communication by using the PDN connection established in the present PDN connectivity procedure. Note that the IP flow to be identified may vary for each application. Thus, user data of a specific application can be identified by the TFT.

More specifically, the TFT may be constituted of five-tuple, or may be constituted of identification information such as the application ID. Note that the five-tuple may be constituted of a combination of one or more of a source IP address, a destination IP address, a source port number, a destination port number, and a protocol number.

In a case that the MME 40 requests the establishment of the multi-access PDN connection based on the NBIFOM of the UE-Initiated mode, the MME 40 may include the TFT in the Create Session Request. Alternatively, in a case that the MME 40 requests the establishment of the multi-access PDN connection based on the NBIFOM of the Network-Initiated mode, the MME 40 need not include the TFT in the Create Session Request.

In other words, in a case that the UE-Initiated mode is included in the fifth identification information included in the PDN connectivity request, the MME 40 may include the TFT in the Create Session Request. Alternatively, in a case that the Network-Initiated mode is included in the fifth identification information included in the PDN connectivity request, the MME 40 need not include the TFT in the Create Session Request.

Here, the MME 40 may determine, based on the fifth identification information, whether to request the establishment of the multi-access PDN connection based on the NBIFOM of the UE-Initiated mode or request the establishment of the multi-access PDN connection based on the NBIFOM of the Network-Initiated mode.

Note that in a case that the first identification information is not included in the PDN connectivity request, the MME 40 may transmit the Create Session Request without including the first identification information. Furthermore, in a case that the fifth identification information is not included in the PDN connectivity request, the MME 40 may transmit the Create Session Request without including the fifth identification information. Moreover, in a case that neither the first identification information nor the fifth identification information is included in the PDN connectivity request, the MME 40 may perform a procedure for establishing the single-access PDN connection.

The SGW 35 receives the Create Session Request transmitted by the MME 40. Based on the reception of the Create Session Request and/or the fifth identification information included in the Create Session Request, the SGW 35 transmits the Create Session Request to the PGW 30 (S1906).

Based on the reception of the Create Session Request and/or the fifth identification information included in the Create Session Request, the SGW 35 may transmit the Create Session Request including at least the fifth identification information. Furthermore, the SGW 35 may include the TFT in the Create Session Request.

Furthermore, the TFT may be information for identifying an IP flow that performs communication by using the PDN connection established in the present PDN connectivity procedure. Note that the IP flow to be identified may vary for each application. Thus, user data of a specific application can be identified by the TFT.

More specifically, the TFT may be constituted of five-tuple, or may be constituted of identification information such as the application ID. Note that the five-tuple may be constituted of a combination of one or more of a source IP address, a destination IP address, a source port number, a destination port number, and a protocol number.

In a case that the SGW 35 requests the establishment of the multi-access PDN connection based on the NBIFOM of the UE-Initiated mode, the SGW 35 may include the TFT in the Create Session Request. Alternatively, in a case that the MME 40 requests the establishment of the multi-access PDN connection based on the NBIFOM of the Network-Initiated mode, the MME 40 need not include the TFT in the Create Session Request.

In other words, in a case that the UE-Initiated mode is included in the fifth identification information included in the Create Session Request, the SGW 35 may include the TFT in the Create Session Request. Alternatively, in a case that the Network-Initiated mode is included in the fifth identification information included in the Create Session Request, the SGW 35 need not include the TFT in the Create Session Request.

Here, the SGW 35 may determine, based on the fifth identification information, whether to request the establishment of the multi-access PDN connection based on the NBIFOM of the UE-Initiated mode or request the establishment of the multi-access PDN connection based on the NBIFOM of the Network-Initiated mode.

Note that in a case that the first identification information is not included in the Create Session Request, the SGW 35 may transmit the Create Session Request without including the first identification information. Furthermore, in a case that the fifth identification information is not included in the Create Session Request, the SGW 35 may transmit the Create Session Request without including the fifth identification information. Moreover, in a case that neither the first identification information nor the fifth identification information is included in the Create Session Request, the SGW 35 may perform a procedure for establishing the single-access PDN connection.

The PGW 30 receives the Create Session Request transmitted by the SGW 35. Based on the reception of the Create Session Request and/or the fifth identification information included in the Create Session Request, the PGW 30 may perform an IP-CAN session update procedure with the PCRF 60 (S1908).

The PGW 30 may transmit, to the PCRF 60, a control message in the IP-CAN session procedure, the control message including information indicating whether the PDN connection to be established is the multi-access PDN connection or the single-access PDN connection, and/or the first identification information, and/or the fifth identification information.

More specifically, in a case that the multi-access PDN connection is to be established, the PGW 30 transmits, to the PCRF 60, the information indicating the access network A, the PDN connection ID, the information indicating that the PDN connection is the multi-access PDN connection, and the first identification information and/or fifth identification information. Alternatively, in a case that the single-access PDN connection is to be established, the PGW 30 transmits, to the PCRF 60, the information indicating the access network A, the PDN connection ID, and the information indicating that the PDN connection is the single-access PDN connection.

Note that the PDN connection ID may be an ID assigned when the PGW 30 establishes the PDN connection in the PDN connectivity procedure, or may be information for uniquely identifying the PDN connection that the UE 10 establishes with the PGW 30.

Note that the PGW 30 may perform the IP-CAN session update procedure to notify the PCRF 60 of information on the UE 10 and/or eNB 45 and/or MME 40 and/or SGW 35.

Furthermore, based on the reception of the fifth identification information, the PCRF 60 may transmit, to the PGW 30, a control message in the IP-CAN session update procedure with the PGW 30, the control message including at least the seventh identification information. The detailed description of the seventh identification information will be described later.

Note that the PCRF 60 may perform the IP-CAN session update procedure to notify the PGW 30 of the charging information and/or the QoS control information and/or the routing information.

Based on the reception of the Create Session Request or the completion of the IP-CAN session update procedure, and/or the fifth identification information included in the Create Session Request and/or the seventh identification information included in the IP-CAN session update procedure, the PGW 30 transmits a Create Session Response to the SGW 35 (S1910).

Based on the reception of the Create Session Request or the completion of the IP-CAN session update procedure, and/or the fifth identification information included in the Create Session Request and/or the seventh identification information included in the IP-CAN session update procedure, the PGW 30 may transmit the Create Session Response including at least the seventh identification information.

Note that a method by which the PGW 30 acquires the seventh identification information is not limited to the above-described method for acquiring the seventh identification information from the PCRF 60 in the IP-CAN session update procedure, and another example may be employed. For example, the PGW 30 may create the seventh identification information and transmit the Create Session Response including the seventh identification information without acquiring the seventh identification information from the PCRF 60 in the IP-CAN session update procedure.

Here, the seventh identification information may be the Allowed Mode representing the NBIFOM operation mode that is allowed for the multi-access PDN connection to be established. In other words, the fifth identification information is an operation mode requested by the UE 10, whereas the seventh identification information may be an operation mode allowed by the operator.

Note that the PCRF 60 or the PGW 30 may determine the Allowed Mode and the seventh identification information based on the operator policy. For example, a policy that allows the establishment of only the PDN connection of the UE-Initiated mode, a policy that allows the establishment of only the PDN connection of the Network-Initiated mode, a policy that allows the establishment of the PDN connection of both of the modes, a policy that prohibits the establishment of the PDN connection of both of the modes, and the like may be managed.

Note that the PCRF 60 or the PGW 30 may acquire the operator policy from the HSS and the like. Alternatively, an operator policy created by an administrator may be stored.

In addition, for the operator policy, a policy different for each subscriber may be managed. Alternatively, a policy different for each APN may be managed. For example, a different Allowed Mode for the PDN connection to be established for each APN may be managed.

In the present example, a case will be described in which the establishment of the PDN connection of the NBIFOM operation mode included in the fifth identification information is allowed based on the Allowed Mode.

Thus, the PCRF 60 or the PGW 30 allows the establishment of the PDN connection based on the NBIFOM operation mode included in the fifth identification information, and includes, in the seventh identification information, the same operation mode as that of the fifth identification information.

In other words, in a case that the UE-Initiated mode is included in the fifth identification information, the PCRF 60 or the PGW 30 may include the UE-Initiated mode in the seventh identification information. Alternatively, in a case that the Network-Initiated mode is included in the fifth identification information, the PCRF 60 or the PGW 30 may include the Network-Initiated mode in the seventh identification information.

As described above, in a case that the establishment of the PDN connection of the NBIFOM operation mode included in the fifth identification information is allowed based on the Allowed Mode, a mode requested by the UE 10 out of one or multiple operation modes allowed based on the Allowed Mode may be regarded as the seventh identification information.

The PGW 30 may include the PDN Address and/or the PDN connection ID and/or the TFT in the Create Session Response.

The PDN Address may be an IP address assigned to the UE 10. For example, the PDN Address may be an IPv4 address, or an IPv6 prefix and an interface ID for constituting an IPv6 address. Here, the PGW 30 may assign the IP address of the UE 10. Moreover, the PGW 30 may include the IP address assigned to the UE 10 in the PDN Address.

Furthermore, the PDN connection ID may be information for uniquely identifying the PDN connection established between the UE 10 and the PGW 30. The PDN connection ID may be assigned by the PGW 30, or may be assigned by the MME 40. In other words, the PGW 30 may assign the PDN connection ID.

The SGW 35 receives the Create Session Response transmitted by the PGW 30. Based on the reception of the Create Session Response and/or the seventh identification information included in the Create Session Response, the SGW 35 transmits the Create Session Response to the MME 40 (S1912).

Based on the reception of the Create Session Response and/or the seventh identification information included in the Create Session Response, the SGW 35 may transmit the Create Session Response including at least the seventh identification information.

Furthermore, the SGW 35 may include the PDN Address and/or the PDN connection ID and/or the TFT in the session request response.

The MME 40 receives the Create Session Response transmitted by the SGW 35. Based on the reception of the Create Session Response and/or the seventh identification information included in the Create Session Response, the MME 40 transmits an Activate default EPS bearer context request to the eNB 45 (S1914).

Based on the reception of the Create Session Response and/or the seventh identification information included in the Create Session Response, the MME 40 may transmit the Activate default EPS bearer context request including at least an Activate default EPS bearer context request message identity (Activate default EPS bearer context request message ID), the Procedure transaction ID, the APN, the PDN Address, the Protocol discriminator, the EPS bearer ID, and an EPS QoS. Furthermore, the MME 40 may include at least the seventh identification information in the Activate default EPS bearer context request. Moreover, the MME 40 may include the PCO and/or an ESM Cause and/or the TFT and/or the PDN connection ID and/or PDN connection attribute information in the Activate default EPS bearer context request. Note that the MME 40 may transmit the PCO including the seventh identification information and/or the TFT and/or the PDN connection ID.

Here, the Activate default EPS bearer context request message ID may be a message type representing the Activate default EPS bearer context request message.

The APN may be an APN to which the UE 10 is allowed to connect. More specifically, the APN may be the APN 1. The APN 1 may be an APN that is allowed to establish the multi-access PDN connection based on the NBIFOM. The MME 40 may include the APN 1 in the Activate default EPS bearer context request.

The PDN Address may be an IP address assigned to the UE 10. For example, the PDN Address may be an IPv4 address, or an interface ID for constituting an IPv6 address.

The EPS QoS may be a state representing QoS of the EPS bearer.

The PDN connection attribute information may be information indicating that the PDN connection established in the present PDN connectivity procedure is the multi-access PDN connection, and/or information indicating that user data transmitted/received by using the PDN connection established in the present PDN connectivity procedure is allowed to be transmitted/received through the access network A and the access network B, and/or information indicating that the PDN connection established in the present PDN connectivity procedure is the multi-access PDN connection of the operation mode indicated by the seventh identification information.

Note that the UE 10 may transmit the Activate default EPS bearer context request message that further includes a connectivity type indicating the type of PDN connection and/or WLAN offload permission information (WLAN offload acceptability) indicating whether or not the WLAN offload can be performed. Furthermore, the MME 40 may transmit the connectivity type or the WLAN offload permission information including the PDN connection attribute information.

The ESM Cause may be information indicating that the PDN type of the PDN Address assigned to the UE 10 is different from the PDN type requested by the UE 10 in the PDN connectivity request.

Note that the MME 40 and/or the PGW 30 may include the seventh identification information in the PCO. However, in a case that the MME 40 and/or the PGW 30 includes the seventh identification information in the PCO, the MME 40 and/or the PGW 30 does not include the IFOM support. In contrast, in a case that the MME 40 and/or the PGW 30 includes the IFOM support in the PCO, the MME 40 and/or the PGW 30 does not include the seventh identification information. As described above, a configuration may be made in which whether to use the switching of the communication path based on the NBIFOM or to use the switching of the communication path based on the IFOM is clearly defined by disabling both of the seventh identification information and the IFOM support.

The eNB 45 receives the Activate default EPS bearer context request transmitted by the MME 40. Based on the reception of the Activate default EPS bearer context request, the eNB 45 transfers the Activate default EPS bearer context request to the UE 10.

The eNB 45 may transmit, to the UE 10, at least an RRC Connection Reconfiguration, together with the Activate default EPS bearer context request (S1916).

The UE 10 receives the RRC Connection Reconfiguration transmitted by the eNB 45. Furthermore, the UE 10 receives the Activate default EPS bearer context request that is transmitted by the MME 40 and transferred by the eNB 45.

Based on the reception of the RRC Connection Reconfiguration, the UE 10 transmits an RRC Connection Reconfiguration Complete to the eNB 45 (S1918).

The eNB 45 receives the RRC Connection Reconfiguration Complete transmitted by the UE 10. Based on the RRC Connection Reconfiguration Complete, the eNB 45 transmits a bearer configuration to the MME 40 (S1920).

The MME 40 receives the bearer configuration transmitted by the eNB 45.

Based on the reception of the Activate default EPS bearer context request and/or the seventh identification information included in the Activate default EPS bearer context request, the UE 10 transmits an Activate default EPS bearer context accept to the MME 40 (S1922) (S1924).

The UE 10 may transmit the Activate default EPS bearer context accept including at least an Activate default EPS bearer context accept message identity (Activate default EPS bearer context accept message ID), the Procedure transaction ID, the Protocol discriminator, and the EPS bearer ID.

Furthermore, the UE 10 may include the PCO in the Activate default EPS bearer context accept.

Here, the Activate default EPS bearer context accept message ID may be a message type representing the Activate default EPS bearer context accept mess age.

After the first PDN connectivity procedure is completed, the UE 10 and the PGW 30 establish the first PDN connection of the NBIFOM operation mode requested by the UE 10. Based on the reception of the Activate default EPS bearer context request and/or the PDN connection attribute information and/or the seventh identification information, the UE 10 may identify that the established PDN connection is the multi-access PDN connection based on the NBIFOM of the NBIFOM operation mode requested by the UE 10. Based on the establishment of the first PDN connection, the UE 10 and the PGW 30 determine a PDN connection and/or a transfer path (such as an EPS bearer) for transmitting/receiving the IP flow by using the TFT, and transmit/receive user data corresponding to the IP flow identified by the TFT. More specifically, the UE 10 and the PGW 30 transmit/receive a flow identified by the TFT by using the first PDN connection.

Note that in the example of the first PDN connectivity procedure, a case has been described in which the transmission/reception of the TFT is included in the PDN connectivity procedure; however, the first PDN connectivity procedure is not limited to this case. The transmission/reception of the TFT may be performed after the multi-access PDN connection based on the NBIFOM is established.

Therefore, the UE 10 and the MME 40 may perform transmission/reception without including the TFT in the PDN connectivity request and/or the Activate default EPS bearer context request, and establish the multi-access PDN connection based on the NBIFOM. In other words, at a point in time when the PDN connection is established, there may be no IP flow transmitting/receiving user data by using the PDN connection. In this case, the UE 10 and the MME 40 transmit the TFT after the multi-access PDN connection based on the NBIFOM is established.

More specifically, in a case that the PDN connection of the UE-Initiated mode has been established, the UE 10 may transmit the TFT to the MME 40 via the eNB 45. In addition, the MME 40 receives the TFT from the UE 10 and transmits the TFT to the PGW 30 via the SGW 35. Thus, the UE 10 and the PGW 30 can determine a PDN connection and/or a transfer path (such as an EPS bearer) for transmitting/receiving the IP flow by using the TFT, and transmit/receive user data corresponding to the IP flow identified by the TFT.

On the other hand, in a case that the PDN connection of the Network-Initiated mode has been established, the PGW 30 may transmit the TFT to the MME 40 via the SGW 35. Here, the PGW 30 may receive, from the PCRF 60, the TFT determined based on the operator policy. In addition, the MME 40 receives the TFT from the PGW 30 via the SGW 35 and transmits the TFT to the UE 10 via the eNB 45. Thus, the UE 10 and the PGW 30 can determine a PDN connection and/or a transfer path (such as an EPS bearer) for transmitting/receiving the IP flow by using the TFT, and transmit/receive user data corresponding to the IP flow identified by the TFT.

Note that in a case that the establishment of the multi PDN connection has succeeded, a procedure for adding a new transfer path can be performed. On the other hand, in a case that the single-access PDN connection has been established, the transfer path can be changed, but a procedure for adding a transfer path cannot be performed.

2.4.2. Example of Second PDN Connectivity Procedure

An example of the second PDN connectivity procedure will be described with reference to FIG. 17.

The UE 10 first transmits a PDN connectivity request to the MME 40 via the eNB 45 (S2002). The UE 10 may transmit the PDN connectivity request including at least a PDN connectivity request message identity (PDN connectivity request message ID), a Procedure transaction identity (Procedure transaction ID), a Request type (request type), a PDN type, a Protocol discriminator, and an EPS bearer identify (EPS bearer ID). Furthermore, the UE 10 may include at least the first identification information and/or the fifth identification information in the PDN connectivity request. Moreover, the UE 10 may include the Access Point Name (APN) and/or Protocol Configuration Options (PCOs) and/or the Traffic Flow Templates (TFTs) in the PDN connectivity request. Note that the UE 10 may transmit the PCO including the first identification information and/or the fifth identification information and/or the TFT.

Here, the first identification information may be the UE NBIFOM capability representing that the UE 10 supports the NBIFOM. Note that the NBIFOM capability may be information indicating the possession of functionality for establishing the multi-access PDN connection based on the NBIFOM.

Here, the fifth identification information may be a Mode Indication representing an NBIFOM operation mode for the multi-access PDN connection based on the NBIFOM, whose establishment is requested by the UE 10. Note that the UE 10 may include the UE-Initiated mode or the Network-Initiated mode in the fifth identification information.

Note that the first identification information may be the fifth identification information. More specifically, the UE 10 may represent, by transmitting the Mode Indication, that the UE 10 supports the NBIFOM.

As described above, the UE 10 may transmit the PDN connectivity request including the first identification information and/or the fifth identification information to request the establishment of the multi-access PDN connection based on the NBIFOM.

The PDN connectivity request message ID may be a message type representing the PDN connectivity request message.

The Procedure transaction ID may be information for identifying the PDN connectivity procedure.

The APN may be an APN to which the UE 10 requests a connection. More specifically, the APN may be the APN 1. The UE 10 may include the APN 1 to establish the multi-access PDN connection based on the NBIFOM. Here, the APN 1 may be an APN that is allowed to establish the multi-access PDN connection based on the NBIFOM and/or an APN that is allowed to perform communication based on the NBIFOM.

The request type may be information for identifying the type of the requested PDN connectivity procedure. For example, the UE 10 performs an initial connection by using the APN 1, so the request type may be the type indicating Attach, rather than the type indicating handover.

The PDN type may indicate an available IP version. For example, the PDN type may be IPv4, IPv6, or IPv4v6. The Protocol discriminator may be a discriminator representing the type of protocol used for transmitting/receiving the PDN connectivity request.

The EPS bearer ID may be information for identifying the EPS bearer. The EPS bearer ID may be assigned by the MME 40.

The PCO may be protocol information associated with the PDN connection. Furthermore, the PCO may include identification information on the request. Note that the UE 10 may transmit the PCO including the first identification information.

The TFT may be information for identifying an IP flow that performs communication by using the PDN connection established in the present PDN connectivity procedure. Note that the IP flow to be identified may vary for each application. Thus, user data of a specific application can be identified by the TFT.

More specifically, the TFT may be constituted of five-tuple, or may be constituted of identification information such as the application ID. Note that the five-tuple may be constituted of a combination of one or more of a source IP address, a destination IP address, a source port number, a destination port number, and a protocol number.

In a case that the UE 10 requests the establishment of the multi-access PDN connection based on the NBIFOM of the UE-Initiated mode, the UE 10 may include the TFT in the PDN connectivity request. Alternatively, in a case that the UE 10 requests the establishment of the multi-access PDN connection based on the NBIFOM of the Network-Initiated mode, the UE 10 need not include the TFT in the PDN connectivity request.

In other words, in a case that the UE 10 includes the UE-Initiated mode in the fifth identification information, the UE 10 may include the TFT in the PDN connectivity request. Alternatively, in a case that the UE 10 includes the Network-Initiated mode in the fifth identification information, the UE 10 need not include the TFT in the PDN connectivity request.

Note that, in the related art, the UE 10 can perform transmission, with information indicating the IFOM support included in the PCO. Here, the IFOM support is identification information representing that the IP Flow Mobility (IFOM) is supported. Furthermore, the IFOM is a technique for switching a communication path of a specific IP flow by using the Dual Stack Mobile IPv6 (DSMIPv6) protocol. Thus, including the information indicating the IFOM support in the PCO allows the UE 10 to switch the access network through which the communication of a specific IP flow is performed.

In the present embodiment, in a case that the UE 10 includes the first identification information and/or fifth identification information in the PCO, the UE 10 does not include the IFOM support. In contrast, in a case that the UE 10 includes the IFOM support in the PCO, the UE 10 does not include the fifth identification information. As described above, a configuration may be made in which whether to use the switching of the communication path based on the NBIFOM or to use the switching of the communication path based on the IFOM is clearly defined by disabling both of the first identification information and the IFOM support.

Thus, the UE 10 can establish either the PDN connection supporting the IFOM or the PDN connection supporting the NBIFOM, in the establishment procedure of a single PDN connection. In other words, the single PDN connection is the PDN connection supporting the NBIFOM, the PDN connection supporting the IFOM, or the single-access PDN connection.

The MME 40 receives the PDN connectivity request transmitted by the UE 10.

In response to the PDN connectivity request received from the UE 10, the MME 40 may transmit a PDN connectivity reject to the UE 10 via the eNB 45 (S2004).

The MME 40 may determine to transmit the PDN connectivity reject based on the operator policy. For example, in a case that the operator policy does not allow the UE 10 to establish the multi-access PDN connection based on the NBIFOM, or in a case that the operator policy does not allow the NBIFOM operation mode requested by the UE 10, the MME 40 may transmit the PDN connectivity reject to the UE 10. More specifically, in a case that the UE 10 requests the establishment of the PDN connection of the UE-Initiated mode but the operator policy does not allow the establishment of the PDN connection in the UE-Initiated mode, the MME 40 may transmit the PDN connectivity reject to the UE 10. Furthermore, in a case that the UE 10 requests the establishment of the PDN connection of the Network-Initiated mode but the operator policy does not allow the establishment of the PDN connection in the Network-Initiated mode, the MME 40 may transmit the PDN connectivity reject to the UE 10.

Based on the reception of the PDN connectivity request and/or the fifth identification information included in the PDN connectivity request, the MME 40 may transmit the PDN connectivity reject including at least a PDN connectivity reject message identity (PDN connectivity reject message ID), the Protocol discriminator, the EPS bearer ID, the Procedure transaction ID, and the ESM Cause. Furthermore, the MME 40 may include at least the seventh identification information and/or the eighth identification information in the PDN connectivity reject. Moreover, the MME 40 may include the PCO and/or the T3396 value in the PDN connectivity reject. Note that the MME 40 may transmit the PCO including the seventh identification information and/or the eighth identification information.

Here, the seventh identification information may be the Allowed Mode representing the NBIFOM operation mode that is allowed for the multi-access PDN connection based on the NBIFOM to be established. In other words, the fifth identification information is an operation mode requested by the UE 10, whereas the seventh identification information may be an operation mode allowed by the operator.

Note that the MME 40 may determine the Allowed Mode and the seventh identification information based on the operator policy. For example, a policy that allows the establishment of only the PDN connection of the UE-Initiated mode, a policy that allows the establishment of only the PDN connection of the Network-Initiated mode, a policy that allows the establishment of the PDN connection of both of the modes, a policy that prohibits the establishment of the PDN connection of both of the modes, and the like may be managed.

Note that the MME 40 may acquire the operator policy from the AAA 55, the HSS, and the like. Alternatively, an operator policy created by an administrator may be stored.

In addition, for the operator policy, a policy different for each subscriber may be managed. Alternatively, a policy different for each APN may be managed. For example, a different Allowed Mode for the PDN connection to be established for each APN may be managed.

In the present example, based on the Allowed Mode, a case will be described in which the establishment of the PDN connection of the NBIFOM operation mode included in the fifth identification information is not allowed.

Thus, the MME 40 does not allow the establishment of the PDN connection based on the NBIFOM operation mode included in the fifth identification information, and includes, in the seventh identification information, an operation mode that is a mode allowed by the Allowed Mode and is different from the fifth identification information.

In other words, in a case that the UE-Initiated mode is included in the fifth identification information and the Network-Initiated mode is allowed, the MME 40 may include the Network-Initiated mode in the seventh identification information. Alternatively, in a case that the Network-Initiated mode is included in the fifth identification information and the UE-Initiated mode is allowed, the MME 40 may include the UE-Initiated mode in the seventh identification information.

Note that in a case that the establishment of the PDN connection based on the operation mode different from the fifth identification information is not allowed, the MME 40 need not include the seventh identification information. In such a case, the MME 40 may transmit the PDN connectivity reject including cause information indicating that the Requested Operation Mode is not allowed.

As described above, in a case that the establishment of the PDN connection of the NBIFOM operation mode included in the fifth identification information is not allowed based on the Allowed Mode, an operation mode that is different from the NBIFOM operation mode included in the fifth identification information and is allowed to establish the PDN connection may be regarded as the seventh identification information based on the Allowed Mode.

Furthermore, the eighth identification information may be the Rejected Mode representing the NBIFOM operation mode for the multi-access PDN connection rejected by the MME 40. Note that the MME 40 may include, in the eighth identification information, the same mode as the NBIFOM operation mode included in the fifth identification information.

In other words, in a case that the UE-Initiated mode is included in the fifth identification information, the PGW 30 and/or the PCRF 60 may include the UE-Initiated mode in the eighth identification information. Alternatively, in a case that the Network-Initiated mode is included in the fifth identification information, the PGW 30 and/or the PCRF 60 may include the Network-Initiated mode in the eighth identification information.

The PDN connectivity reject message ID may be a message type representing the PDN connectivity reject message.

The ESM Cause may be information representing a reason why the PDN connectivity request is rejected. The T3396 value may be a value of the T3396 timer, included when the ESM Cause represents insufficient resources or an inappropriate APN (missing or unknown APN).

The UE 10 receives the PDN connectivity reject transmitted by the MME 40. Based on the reception of the PDN connectivity reject and/or the seventh identification information and/or eighth identification information included in the PDN connectivity reject, the UE 10 may newly perform the PDN connectivity procedure (S2006).

The UE 10 may perform the PDN connectivity procedure including a mode different from the NBIFOM operation mode that is included in the fifth identification information in the PDN connectivity request.

Note that the UE 10 may regard the seventh identification information received from the MME 40 as the fifth identification information.

Alternatively, the UE 10 may regard the eighth identification information received from the MME 40 as the fifth identification information.

In other words, in a case that the UE 10 includes the UE-Initiated mode in the fifth identification information in the PDN connectivity request of the first time, the UE 10 may perform the PDN connectivity procedure including the Network-Initiated mode. Alternatively, in a case that the UE 10 includes the UE-Initiated mode in the fifth identification information in the PDN connectivity request of the first time, the UE 10 may perform the PDN connectivity procedure including the Network-Initiated mode.

In addition, in a case that the seventh identification information included in the PDN connectivity reject is the UE-Initiated mode, the UE 10 may perform the PDN connectivity procedure including the UE-Initiated mode. Alternatively, in a case that the seventh identification information included in the PDN connectivity reject is the Network-Initiated mode, the UE 10 may perform the PDN connectivity procedure including the Network-Initiated mode.

In addition, in a case that the eighth identification information included in the PDN connectivity reject is the UE-Initiated mode, the UE 10 may perform the PDN connectivity procedure including the Network-Initiated mode. Alternatively, in a case that the seventh identification information included in the PDN connectivity reject is the Network-Initiated mode, the UE 10 may perform the PDN connectivity procedure including the UE-Initiated mode.

Note that in a case that the UE 10 has not received the seventh identification information and/or in a case that there is no any other operation mode allowed for the PDN connection and/or in a case that the establishment of the PDN connection of the other operation mode is not requested, the UE 10 need not newly initiate the PDN connectivity procedure.

Note that details of the PDN connectivity procedure may be similar to those of the PDN connectivity procedure described with reference to FIG. 16 in 2.4.4. Example of First PDN Connectivity Procedure. Therefore, the detailed description will be omitted.

After the second PDN connectivity procedure is completed, the UE 10 and the PGW 30 establish the first PDN connection of a mode different from the NBIFOM operation mode that the UE 10 initially requests. Based on the establishment of the first PDN connection, the UE 10 and the PGW 30 determine a PDN connection and/or a transfer path (such as an EPS bearer) for transmitting/receiving the IP flow by using the TFT, and transmit/receive user data corresponding to the IP flow identified by the TFT. More specifically, the UE 10 and the PGW 30 transmit/receive a flow identified by the TFT by using the first PDN connection.

Note that in the example of the second PDN connectivity procedure, a case has been described in which the transmission/reception of the TFT is included in the PDN connectivity procedure; however, the second PDN connectivity procedure is not limited to this case. The transmission/reception of the TFT may be performed after the multi-access PDN connection based on the NBIFOM is established.

Therefore, the UE 10 and the MME 40 may perform transmission/reception without including the TFT in the PDN connectivity request and/or the Activate default EPS bearer context request, and establish the multi-access PDN connection based on the NBIFOM. In other words, at a point in time when the PDN connection is established, there may be no IP flow transmitting/receiving user data by using the PDN connection. In this case, the UE 10 and the MME 40 transmit the TFT after the multi-access PDN connection based on the NBIFOM is established.

More specifically, in a case that the PDN connection of the UE-Initiated mode has been established, the UE 10 may transmit the TFT to the MME 40 via the eNB 45. In addition, the MME 40 receives the TFT from the UE 10 and transmits the TFT to the PGW 30 via the SGW 35. Thus, the UE 10 and the PGW 30 can determine a PDN connection and/or a transfer path (such as an EPS bearer) for transmitting/receiving the IP flow by using the TFT, and transmit/receive user data corresponding to the IP flow identified by the TFT.

On the other hand, in a case that the PDN connection of the Network-Initiated mode has been established, the PGW 30 may transmit the TFT to the MME 40 via the SGW 35. Here, the PGW 30 may receive, from the PCRF 60, the TFT determined based on the operator policy. In addition, the MME 40 receives the TFT from the PGW 30 via the SGW 35 and transmits the TFT to the UE 10 via the eNB 45. Thus, the UE 10 and the PGW 30 can determine a PDN connection and/or a transfer path (such as an EPS bearer) for transmitting/receiving the IP flow by using the TFT, and transmit/receive user data corresponding to the IP flow identified by the TFT.

Note that in a case that the multi PDN connection has been established, a procedure for adding a new transfer path can be performed. On the other hand, in a case that the single-access PDN connection has been established, the transfer path can be changed, but a procedure for adding a transfer path cannot be performed.

2.4.3. Example of Third PDN Connectivity Procedure

An example of the third PDN connectivity procedure will be described with reference to FIG. 16.

The UE 10 first transmits a PDN connectivity request to the MME 40 MME 40 via the eNB 45 (S1902). The UE 10 may transmit the PDN connectivity request including at least a PDN connectivity request message identity (PDN connectivity request message ID), a Procedure transaction identity (Procedure transaction ID), a Request type (request type), a PDN type, a Protocol discriminator, and an EPS bearer identify (EPS bearer ID). Furthermore, the UE 10 may include at least the first identification information and/or the fifth identification information in the PDN connectivity request. Moreover, the UE 10 may include the Access Point Name (APN) and/or Protocol Configuration Options (PCOs) and/or the Traffic Flow Templates (TFTs) in the PDN connectivity request. Note that the UE 10 may transmit the PCO including the first identification information and/or the fifth identification information and/or the TFT.

Here, the first identification information may be the UE NBIFOM capability indicating that the UE 10 supports the NBIFOM. Note that the NBIFOM capability may be information indicating the possession of functionality for establishing the multi-access PDN connection based on the NBIFOM.

Furthermore, the fifth identification information may be a Mode Indication indicating an NBIFOM operation mode for the multi-access PDN connection based on the NBIFOM, whose establishment is requested by the UE 10. Note that the UE 10 may include the UE-Initiated mode or the Network-Initiated mode in the fifth identification information.

Note that the first identification information may be the fifth identification information. More specifically, the UE 10 may indicate, by transmitting the Mode Indication, that the UE 10 supports the NBIFOM.

As described above, the UE 10 may transmit the PDN connectivity request including the first identification information and/or the fifth identification information to request the establishment of the multi-access PDN connection based on the NBIFOM.

The PDN connectivity request message ID may be a message type indicating the PDN connectivity request message.

The Procedure transaction ID may be information for identifying the PDN connectivity procedure.

The APN may be an APN to which the UE 10 requests a connection. More specifically, the APN may be the APN 1. The UE 10 may include the APN 1 to establish the multi-access PDN connection based on the NBIFOM. Here, the APN 1 may be an APN that is allowed to establish the multi-access PDN connection based on the NBIFOM and/or an APN that is allowed to perform communication based on the NBIFOM.

The request type may be information for identifying the type of the requested PDN connectivity procedure. For example, the UE 10 performs an initial connection by using the APN 1, so the request type may be the type indicating Attach, rather than the type indicating handover.

The PDN type may indicate an available IP version. For example, the PDN type may be IPv4, IPv6, or IPv4v6. The Protocol discriminator may be a discriminator representing the type of protocol used for transmitting/receiving the PDN connectivity request.

The EPS bearer ID may be information for identifying the EPS bearer. The EPS bearer ID may be assigned by the MME 40.

The PCO may be protocol information associated with the PDN connection. Furthermore, the PCO may include identification information on the request. Note that the UE 10 may transmit the PCO including the first identification information.

The TFT may be information for identifying an IP flow that performs communication by using the PDN connection established in the present PDN connectivity procedure. Note that the IP flow to be identified may vary for each application. Thus, user data of a specific application can be identified by the TFT.

More specifically, the TFT may be constituted of five-tuple, or may be constituted of identification information such as the application ID. Note that the five-tuple may be constituted of a combination of one or more of a source IP address, a destination IP address, a source port number, a destination port number, and a protocol number.

In a case that the UE 10 requests the establishment of the multi-access PDN connection based on the NBIFOM of the UE-Initiated mode, the UE 10 may include the TFT in the PDN connectivity request. Alternatively, in a case that the UE 10 requests the establishment of the multi-access PDN connection based on the NBIFOM of the Network-Initiated mode, the UE 10 need not include the TFT in the PDN connectivity request.

In other words, in a case that the UE 10 includes the UE-Initiated mode in the fifth identification information, the UE 10 may include the TFT in the PDN connectivity request. Alternatively, in a case that the UE 10 includes the Network-Initiated mode in the fifth identification information, the UE 10 need not include the TFT in the PDN connectivity request.

Note that, in the related art, the UE 10 can perform transmission, with information indicating the IFOM support included in the PCO. Here, the IFOM support is identification information representing that the IP Flow Mobility (IFOM) is supported. Furthermore, the IFOM is a technique for switching a communication path of a specific IP flow by using the Dual Stack Mobile IPv6 (DSMIPv6) protocol. Thus, including the information indicating the IFOM support in the PCO allows the UE 10 to switch the access network through which the communication of a specific IP flow is performed.

In the present embodiment, in a case that the UE 10 includes the first identification information and/or fifth identification information in the PCO, the UE 10 does not include the IFOM support. In contrast, in a case that the UE 10 includes the IFOM support in the PCO, the UE 10 does not include either the first identification information or the fifth identification information. As described above, a configuration may be made in which whether to use the switching of the communication path based on the NBIFOM or to use the switching of the communication path based on the IFOM is clearly defined by disabling both of the first identification information and the IFOM support.

Thus, the UE 10 can establish either the PDN connection supporting the IFOM or the PDN connection supporting the NBIFOM, in the establishment procedure of a single PDN connection. In other words, the single PDN connection is the PDN connection supporting the NBIFOM, the PDN connection supporting the IFOM, or the single-access PDN connection.

The MME 40 receives the PDN connectivity request transmitted by the UE 10. Based on the reception of the PDN connectivity request, and/or the first identification information included in the PDN connectivity request, and/or the fifth identification information included in the PDN connectivity request, the MME 40 transmits a Create Session Request to the SGW 35 (S1904).

Based on the reception of the PDN connectivity request and/or the first identification information included in the PDN connectivity request, the MME 40 may transmit the Create Session Request including at least the first identification information.

Based on the reception of the PDN connectivity request and/or the fifth identification information included in the PDN connectivity request, the MME 40 may transmit the Create Session Request including at least the fifth identification information. The MME 40 may include the TFT in the Create Session Request, based on the reception of the TFT transmitted by the UE 10.

Furthermore, the TFT may be information for identifying an IP flow that performs communication by using the PDN connection established in the present PDN connectivity procedure. Note that the IP flow to be identified may vary for each application. Thus, user data of a specific application can be identified by the TFT.

More specifically, the TFT may be constituted of five-tuple, or may be constituted of identification information such as the application ID. Note that the five-tuple may be constituted of a combination of one or more of a source IP address, a destination IP address, a source port number, a destination port number, and a protocol number.

In a case that the MME 40 requests the establishment of the multi-access PDN connection based on the NBIFOM of the UE-Initiated mode, the MME 40 may include the TFT in the Create Session Request. Alternatively, in a case that the MME 40 requests the establishment of the multi-access PDN connection based on the NBIFOM of the Network-Initiated mode, the MME 40 need not include the TFT in the Create Session Request.

In other words, in a case that the UE-Initiated mode is included in the fifth identification information included in the PDN connectivity request, the MME 40 may include the TFT in the Create Session Request. Alternatively, in a case that the Network-Initiated mode is included in the fifth identification information included in the PDN connectivity request, the MME 40 need not include the TFT in the Create Session Request.

Here, the MME 40 may determine, based on the fifth identification information, whether to request the establishment of the multi-access PDN connection based on the NBIFOM of the UE-Initiated mode or request the establishment of the multi-access PDN connection based on the NBIFOM of the Network-Initiated mode.

Note that in a case that the first identification information is not included in the PDN connectivity request, the MME 40 may transmit the Create Session Request without including the first identification information. Furthermore, in a case that the fifth identification information is not included in the PDN connectivity request, the MME 40 may transmit the Create Session Request without including the fifth identification information. Moreover, in a case that neither the first identification information nor the fifth identification information is included in the PDN connectivity request, the MME 40 may perform a procedure for establishing the single-access PDN connection.

The SGW 35 receives the Create Session Request transmitted by the MME 40. Based on the reception of the Create Session Request and/or the fifth identification information included in the Create Session Request, the SGW 35 transmits the Create Session Request to the PGW 30 (S1906).

Based on the reception of the Create Session Request and/or the fifth identification information included in the Create Session Request, the SGW 35 may transmit the Create Session Request including at least the fifth identification information. Furthermore, the SGW 35 may include the TFT in the Create Session Request.

Furthermore, the TFT may be information for identifying an IP flow that performs communication by using the PDN connection established in the present PDN connectivity procedure. Note that the IP flow to be identified may vary for each application. Thus, user data of a specific application can be identified by the TFT.

More specifically, the TFT may be constituted of five-tuple, or may be constituted of identification information such as the application ID. Note that the five-tuple may be constituted of a combination of one or more of a source IP address, a destination IP address, a source port number, a destination port number, and a protocol number.

In a case that the SGW 35 requests the establishment of the multi-access PDN connection based on the NBIFOM of the UE-Initiated mode, the SGW 35 may include the TFT in the Create Session Request. Alternatively, in a case that the MME 40 requests the establishment of the multi-access PDN connection based on the NBIFOM of the Network-Initiated mode, the MME 40 need not include the TFT in the Create Session Request.

In other words, in a case that the UE-Initiated mode is included in the fifth identification information included in the Create Session Request, the SGW 35 may include the TFT in the Create Session Request. Alternatively, in a case that the Network-Initiated mode is included in the fifth identification information included in the Create Session Request, the SGW 35 need not include the TFT in the Create Session Request.

Here, the SGW 35 may determine, based on the fifth identification information, whether to request the establishment of the multi-access PDN connection based on the NBIFOM of the UE-Initiated mode or request the establishment of the multi-access PDN connection based on the NBIFOM of the Network-Initiated mode.

Note that in a case that the first identification information is not included in the Create Session Request, the SGW 35 may transmit the Create Session Request without including the first identification information. Furthermore, in a case that the fifth identification information is not included in the Create Session Request, the SGW 35 may transmit the Create Session Request without including the fifth identification information. Moreover, in a case that neither the first identification information nor the fifth identification information is included in the Create Session Request, the SGW 35 may perform a procedure for establishing the single-access PDN connection.

The PGW 30 receives the Create Session Request transmitted by the SGW 35. Based on the reception of the Create Session Request and/or the fifth identification information included in the Create Session Request, the PGW 30 may perform an IP-CAN session update procedure with the PCRF 60 (S1908).

The PGW 30 may transmit, to the PCRF 60, a control message in the IP-CAN session procedure, the control message including information indicating whether the PDN connection to be established is the multi-access PDN connection or the single-access PDN connection, and/or the fifth identification information.

More specifically, in a case that the multi-access PDN connection based on the NBIFOM is to be established, the PGW 30 transmits, to the PCRF 60, the information indicating the access network A, the PDN connection ID, the information indicating that the PDN connection is the multi-access PDN connection, and the first identification information and/or fifth identification information. Alternatively, in a case that the single-access PDN connection is to be established, the PGW 30 transmits, to the PCRF 60, the information indicating the access network A, the PDN connection ID, and the information indicating that the PDN connection is the single-access PDN connection.

Note that the PDN connection ID may be an ID assigned when the PGW 30 establishes the PDN connection in the PDN connectivity procedure, or may be information for uniquely identifying the PDN connection that the UE 10 establishes with the PGW 30.

Note that the PGW 30 may perform the IP-CAN session update procedure to notify the PCRF 60 of information on the UE 10 and/or eNB 45 and/or MME 40 and/or SGW 35.

Furthermore, based on the reception of the fifth identification information, the PCRF 60 may transmit, to the PGW 30, a control message in the IP-CAN session update procedure with the PGW 30, the control message including at least the seventh identification information. The detailed description of the seventh identification information will be described later.

Note that the PCRF 60 may perform the IP-CAN session update procedure to notify the PGW 30 of the charging information and/or the QoS control information and/or the routing information.

Based on the reception of the Create Session Request or the completion of the IP-CAN session update procedure, and/or the fifth identification information included in the Create Session Request and/or the seventh identification information included in the IP-CAN session update procedure, the PGW 30 transmits a Create Session Response to the MME 40 (S1910).

Based on the reception of the Create Session Request or the completion of the IP-CAN session update procedure, and/or the fifth identification information included in the Create Session Request and/or the seventh identification information included in the IP-CAN session update procedure, the PGW 30 may transmit the Create Session Response including at least the seventh identification information.

Note that a method by which the PGW 30 acquires the seventh identification information is not limited to the above-described method for acquiring the seventh identification information from the PCRF 60 in the IP-CAN session update procedure, and another example may be employed. For example, the PGW 30 may create the seventh identification information and transmit the Create Session Response including the seventh identification information, without acquiring the seventh identification information from the PCRF 60 in the IP-CAN session update procedure.

Here, the seventh identification information may be the Allowed Mode representing the NBIFOM operation mode that is allowed for the multi-access PDN connection to be established. In other words, the fifth identification information is an operation mode requested by the UE 10, whereas the seventh identification information may be an operation mode allowed by the operator.

Note that the PCRF 60 or the PGW 30 may determine the Allowed Mode and the seventh identification information based on the operator policy. For example, a policy that allows the establishment of only the PDN connection of the UE-Initiated mode, a policy that allows the establishment of only the PDN connection of the Network-Initiated mode, a policy that allows the establishment of the PDN connection of both of the modes, a policy that prohibits the establishment of the PDN connection of both of the modes, and the like may be managed.

Note that the PCRF 60 or the PGW 30 may acquire the operator policy from the HSS and the like. Alternatively, an operator policy created by an administrator may be stored.

In addition, for the operator policy, a policy different for each subscriber may be managed. Alternatively, a policy different for each APN may be managed. For example, a different Allowed Mode for the PDN connection to be established for each APN may be managed.

In the present example, based on the Allowed Mode, a case will be described in which the establishment of the PDN connection of the NBIFOM operation mode included in the fifth identification information is not allowed.

Thus, the PCRF 60 or the PGW 30 does not allow the establishment of the PDN connection based on the NBIFOM operation mode included in the fifth identification information, and includes, in the seventh identification information, an operation mode that is a mode allowed by the Allowed Mode and is different from the fifth identification information.

In other words, in a case that the UE-Initiated mode is included in the fifth identification information and the Network-Initiated mode is allowed, the PCRF 60 or the PGW 30 may include the Network-Initiated mode in the seventh identification information. Alternatively, in a case that the Network-Initiated mode is included in the fifth identification information and the UE-Initiated mode is allowed, the PCRF 60 or the PGW 30 may include the UE-Initiated mode in the seventh identification information.

In a case that the establishment of the PDN connection based on the operation mode different from the fifth identification information is not allowed, the PCRF 60 need not notify the PGW 30 of the seventh identification information.

In a case that the establishment of the PDN connection based on the operation mode different from the fifth identification information is not allowed, the PCRF 60 may notify the PGW 30 that there is no allowed operation.

In a case that the establishment of the PDN connection based on the operation mode different from the fifth identification information is not allowed, the PCRF 60 may transmit, to the PGW 30, the cause information indicating that the Requested Operation Mode is not allowed.

In a case that the establishment of the PDN connection based on the operation mode different from the fifth identification information is not allowed, the PGW 30 need not notify the MME 40 of the seventh identification information.

In a case that the establishment of the PDN connection based on the operation mode different from the fifth identification information is not allowed, the PGW 30 may transmit, to the MME 40 via the SGW 35, the Create Session Response including the cause information indicating that the Requested Operation Mode is not allowed.

In a case that the establishment of the PDN connection based on the operation mode different from the fifth identification information is not allowed, the PGW 30 may notify the MME 40 that there is no allowed operation.

As described above, in a case that the establishment of the PDN connection of the NBIFOM operation mode included in the fifth identification information is not allowed based on the Allowed Mode, an operation mode that is different from the NBIFOM operation mode included in the fifth identification information and is allowed to establish the PDN connection may be regarded as the seventh identification information based on the allowed mode.

Furthermore, the PGW 30 may include the PDN Address and/or the PDN connection ID and/or the TFT in the Create Session Response.

The PDN Address may be an IP address assigned to the UE 10. For example, the PDN Address may be an IPv4 address, or an IPv6 prefix and an interface ID for constituting an IPv6 address. Here, the PGW 30 may assign the IP address of the UE 10. Moreover, the PGW 30 may include the IP address assigned to the UE 10 in the PDN Address.

Furthermore, the PDN connection ID may be information for uniquely identifying the PDN connection established between the UE 10 and the PGW 30. The PDN connection ID may be assigned by the PGW 30, or may be assigned by the MME 40. In other words, the PGW 30 may assign the PDN connection ID.

The SGW 35 receives the Create Session Response transmitted by the PGW 30. Based on the reception of the Create Session Response and/or the seventh identification information included in the Create Session Response, the SGW 35 transmits the Create Session Response to the MME 40 (S1912).

Based on the reception of the Create Session Response and/or the seventh identification information included in the Create Session Response, the SGW 35 may transmit the Create Session Response including at least the seventh identification information.

Furthermore, the SGW 35 may include the PDN Address and/or the PDN connection ID and/or the TFT in the session request response.

The MME 40 receives the Create Session Response transmitted by the SGW 35. Based on the reception of the Create Session Response and/or the seventh identification information included in the Create Session Response, the MME 40 transmits an Activate default EPS bearer context request to the eNB 45 (S1914).

Based on the reception of the Create Session Response and/or the seventh identification information included in the Create Session Response, the MME 40 may transmit the Activate default EPS bearer context request including at least the Activate default EPS bearer context request message identity (Activate default EPS bearer context request message ID), the Procedure transaction ID, the APN, the PDN Address, the Protocol discriminator, the EPS bearer ID, and the EPS QoS. Furthermore, the MME 40 may include at least the seventh identification information in the Activate default EPS bearer context request. Moreover, the MME 40 may include the PCO and/or an ESM Cause and/or the TFT and/or the PDN connection ID and/or PDN connection attribute information in the Activate default EPS bearer context request. Note that the MME 40 may transmit the PCO including the seventh identification information and/or the TFT and/or the PDN connection ID.

Here, the Activate default EPS bearer context request message ID may be a message type representing the Activate default EPS bearer context request message.

The APN may be an APN to which the UE 10 is allowed to connect. More specifically, the APN may be the APN 1. The APN 1 may be an APN that is allowed to establish the multi-access PDN connection based on the NBIFOM. The MME 40 may include the APN 1 in the Activate default EPS bearer context request.

The PDN Address may be an IP address assigned to the UE 10. For example, the PDN Address may be an IPv4 address, or an interface ID for constituting an IPv6 address.

The EPS QoS may be a state representing the QoS of the EPS bearer.

The PDN connection attribute information may be information indicating that the PDN connection established in the present PDN connectivity procedure is the multi-access PDN connection, and/or information indicating that user data transmitted/received by using the PDN connection established in the present PDN connectivity procedure is allowed to be transmitted/received through the access network A and the access network B, and/or information indicating that the PDN connection established in the present PDN connectivity procedure is the multi-access PDN connection of the operation mode indicated by the seventh identification information.

Note that the UE 10 may transmit the Activate default EPS bearer context request message that further includes a connectivity type indicating the type of PDN connection and/or WLAN offload permission information (WLAN offload acceptability) indicating whether or not the WLAN offload can be performed. Furthermore, the MME 40 may transmit the connectivity type or the WLAN offload permission information including the PDN connection attribute information.

The ESM Cause may include information representing that the PDN type of the PDN Address assigned to the UE 10 is different from the PDN type requested by the UE 10 in the PDN connectivity request. Additionally/alternatively, the EMS Cause may include information representing that the PDN connection established in the present PDN connectivity procedure is the multi-access PDN connection of an NBIFOM operation mode different from the NBIFOM operation mode requested by the UE 10.

Note that the MME 40 and/or the PGW 30 may include the seventh identification information in the PCO. However, in a case that the MME 40 and/or the PGW 30 includes the seventh identification information in the PCO, the MME 40 and/or the PGW 30 does not include the IFOM support. In contrast, in a case that the MME 40 and/or the PGW 30 includes the IFOM support in the PCO, the MME 40 and/or the PGW 30 does not include the seventh identification information. As described above, a configuration may be made in which whether to use the switching of the communication path based on the NBIFOM or to use the switching of the communication path based on the IFOM is clearly defined by disabling both of the first identification information and the IFOM support.

Note that the UE 10 may transmit the Activate default EPS bearer context request message that further includes a connectivity type indicating the type of PDN connection and/or WLAN offload permission information (WLAN offload acceptability) indicating whether or not the WLAN offload can be performed. Furthermore, the MME 40 may transmit the connectivity type or the WLAN offload permission information including the PDN connection attribute information.

The eNB 45 receives the Activate default EPS bearer context request transmitted by the MME 40. Based on the reception of the Activate default EPS bearer context request, the eNB 45 transfers the Activate default EPS bearer context request to the UE 10.

The eNB 45 may transmit, to the UE 10, at least an RRC Connection Reconfiguration, together with the Activate default EPS bearer context request (S1916).

The UE 10 receives the RRC Connection Reconfiguration transmitted by the eNB 45. Furthermore, the UE 10 receives the Activate default EPS bearer context request that is transmitted by the MME 40 and transferred by the eNB 45.

Based on the reception of the RRC Connection Reconfiguration, the UE 10 transmits an RRC Connection Reconfiguration Complete to the eNB 45 (S1918).

The eNB 45 receives the RRC Connection Reconfiguration Complete transmitted by the UE 10. Based on the RRC Connection Reconfiguration Complete, the eNB 45 transmits a bearer configuration to the MME 40 (S1920).

The MME 40 receives the bearer configuration transmitted by the eNB 45.

Based on the reception of the Activate default EPS bearer context request and/or the seventh identification information included in the Activate default EPS bearer context request, the UE 10 may transmit an Activate default EPS bearer context accept to the MME 40 (S1922) (S1924).

The UE 10 may transmit the Activate default EPS bearer context accept including at least an Activate default EPS bearer context accept message identity (Activate default EPS bearer context accept message ID), the Procedure transaction ID, the Protocol discriminator, and the EPS bearer ID.

Furthermore, the UE 10 may include the PCO in the Activate default EPS bearer context accept and/or an Activate default EPS bearer context reject.

Here, the Activate default EPS bearer context accept message ID may be a message type representing the Activate default EPS bearer context accept message.

After the third PDN connectivity procedure is completed, the UE 10 and the PGW 30 establish the first PDN connection of a mode different from the NBIFOM operation mode requested by the UE 10. Based on the reception of the Activate default EPS bearer context request and/or the PDN connection attribute information and/or the seventh identification information and/or the ESM Cause, the UE 10 may identify that the established PDN connection is the multi-access PDN connection of an operation mode different from the NBIFOM operation mode requested by the UE 10. Based on the establishment of the first PDN connection, the UE 10 and the PGW 30 determine a PDN connection and/or a transfer path (such as an EPS bearer) for transmitting/receiving the IP flow by using the TFT, and transmit/receive user data corresponding to the IP flow identified by the TFT. More specifically, the UE 10 and the PGW 30 transmit/receive a flow identified by the TFT by using the first PDN connection.

Note that in the example of the third PDN connectivity procedure, a case has been described in which the transmission/reception of the TFT is included in the PDN connectivity procedure; however, the third PDN connectivity procedure is not limited to this case. The transmission/reception of the TFT may be performed after the multi-access PDN connection based on the NBIFOM is established.

Therefore, the UE 10 and the MME 40 may transmit/receive the TFT that is not included in the PDN connectivity request and/or the Activate default EPS bearer context request, and establish the multi-access PDN connection. In other words, at a point in time when the PDN connection is established, there may be no IP flow transmitting/receiving user data by using the PDN connection. In this case, the UE 10 and the MME 40 transmit the TFT after the multi-access PDN connection based on the NBIFOM is established.

More specifically, in a case that the PDN connection of the UE-Initiated mode has been established, the UE 10 may transmit the TFT to the MME 40 via the eNB 45. In addition, the MME 40 receives the TFT from the UE 10 and transmits the TFT to the PGW 30 via the SGW 35. Thus, the UE 10 and the PGW 30 can determine a PDN connection and/or a transfer path (such as an EPS bearer) for transmitting/receiving the IP flow by using the TFT, and transmit/receive user data corresponding to the IP flow identified by the TFT.

On the other hand, in a case that the PDN connection of the Network-Initiated mode has been established, the PGW 30 may transmit the TFT to the MME 40 via the SGW 35. Here, the PGW 30 may receive, from the PCRF 60, the TFT determined based on the operator policy. In addition, the MME 40 receives the TFT from the PGW 30 via the SGW 35 and transmits the TFT to the UE 10 via the eNB 45. Thus, the UE 10 and the PGW 30 can determine a PDN connection and/or a transfer path (such as an EPS bearer) for transmitting/receiving the IP flow by using the TFT, and transmit/receive user data corresponding to the IP flow identified by the TFT.

Furthermore, in the example of the third PDN connectivity procedure, a case has been described in which the UE 10 and the PGW 30 establish the first PDN connection of a mode different from the NBIFOM operation mode requested by the UE 10; however, the third PDN connectivity procedure is not limited to this case. The UE 10 may reject the establishment of the first PDN connection of the NBIFOM operation mode different from the request.

For example, in a case that the UE 10 does not support the NBIFOM operation mode for the established first PDN connection and/or in a case that the NBIFOM operation mode for the established first PDN connection does not comply with the policy of the UE 10, the UE 10 may reject the establishment of the first PDN connection of the NBIFOM operation mode different from the request.

In more detail, based on the reception of the Activate default EPS bearer context request and/or the seventh identification information included in the Activate default EPS bearer context request and/or the PDN connection attribute information and/or the policy of the UE 10, the UE 10 may transmit the Activate default EPS bearer context reject to the MME 40 via the eNB 45.

The UE 10 may transmit the Activate default EPS bearer context reject including at least an Activate default EPS bearer context reject message identity (Activate default EPS bearer context reject message ID), the Procedure transaction ID, the Protocol discriminator, the EPS bearer ID, and the ESM Cause. Furthermore, the UE 10 may further include fourth identification information in the Activate default EPS bearer context reject. Furthermore, the UE 10 may further include the PCO in the Activate default EPS bearer context reject. Note that the UE 10 may transmit the PCO including the fourth identification information.

The fourth identification information may be information indicating that the UE 10 does not support the NBIFOM operation mode for the established first PDN connection and/or information indicating that the NBIFOM operation mode for the established first PDN connection does not comply with the policy of the UE 10.

The Activate default EPS bearer context reject message ID may be a message type representing the Activate default EPS bearer context reject message.

The ESM Cause may be information indicating a reason why the Activate default EPS bearer context request is rejected. Here, the UE 10 may notify the UE 10 of the fourth identification information included in the ESM cause.

The MME 40 may receive the Activate default EPS bearer context reject transmitted by the UE 10. Based on the reception of the Activate default EPS bearer context reject and/or the fourth identification information included in the Activate default EPS bearer context reject, the MME 40 may delete the EPS bearer context, held by the MME 40, relating to the established PDN connection. Furthermore, the MME 40 may transmit, to the SGW 35, the fourth identification information included in the Activate default EPS bearer context reject.

The SGW 35 may receive the fourth identification information transmitted by the MME 40. Based on the reception of the fourth identification information and/or the operator policy, the SGW 35 may delete the EPS bearer context, held by the SGW 35, relating to the established PDN connection. Furthermore, the SGW 35 may transmit, to the PGW 30, the fourth identification information received from the MME 40.

The PGW 30 may receive the fourth identification information transmitted by the SGW 35. Based on the reception of the fourth identification information and/or the operator policy, the PGW 30 may delete the EPS bearer context, held by the PGW 30, relating to the established PDN connection.

Furthermore, the PGW 30 may perform the IP-CAN session update procedure with the PCRF 60, based on the reception of the fourth identification information. The PGW 30 may include the fourth identification information in the IP-CAN session update procedure.

The PCRF 60 may change the operator policy based on the IP-CAN session update procedure. Note that based on the change of the operator policy, the PGW 30 may delete the EPS bearer context, held by the PGW 30, relating to the established PDN connection.

Note that in a case that the multi PDN connection is established, a procedure for adding a new transfer path can be performed. On the other hand, in a case that the single-access PDN connection is established, the transfer path can be changed, but a procedure for adding a transfer path cannot be performed.

2.4.4. Example of Fourth PDN Connectivity Procedure

An example of the fourth PDN connectivity procedure will be described with reference to FIG. 18.

The UE 10 first transmits a PDN connectivity request to the MME 40 via the eNB 45 (S2102). The UE 10 may transmit the PDN connectivity request including at least a PDN connectivity request message identity (PDN connectivity request message ID), a Procedure transaction identity (Procedure transaction ID), a Request type (request type), a PDN type, a Protocol discriminator, and an EPS bearer identify (EPS bearer ID). Furthermore, the UE 10 may include at least the first identification information and/or the sixth identification information in the PDN connectivity request. Moreover, the UE 10 may include the Access Point Name (APN) and/or Protocol Configuration Options (PCOs) and/or the Traffic Flow Templates (TFTs) in the PDN connectivity request. Note that the UE 10 may transmit the PCO including the first identification information and/or the sixth identification information and/or the TFT.

Here, the first identification information may be the UE NBIFOM capability representing that the UE 10 supports the NBIFOM. Note that the NBIFOM capability may be information indicating the possession of functionality for establishing the multi-access PDN connection based on the NBIFOM.

In addition, the sixth identification information may be a Request NBIFOM representing that a request to determine the NBIFOM operation mode for the multi-access PDN connection. Additionally/alternatively, the sixth identification information may be information representing that a request for an NBIFOM operation mode allowed for the multi-access PDN connection based on the NBIFOM to be established.

As described above, the UE 10 may transmit the PDN connectivity request including the first identification information and/or sixth identification information to request the establishment of the multi-access PDN connection based on the NBIFOM, without requesting a specific NBIFOM operation mode.

The PDN connectivity request message ID may be a message type indicating the PDN connectivity request message.

The Procedure transaction ID may be information for identifying the PDN connectivity procedure.

The APN may be an APN to which the UE 10 requests a connection. More specifically, the APN may be the APN 1. The UE 10 may include the APN 1 to establish the multi-access PDN connection based on the NBIFOM. Here, the APN 1 may be an APN that is allowed to establish the multi-access PDN connection based on the NBIFOM and/or an APN that is allowed to perform communication based on the NBIFOM.

The request type may be information for identifying the type of the requested PDN connectivity procedure. For example, the UE 10 performs an initial connection by using the APN 1, so the request type may be the type indicating Attach, rather than the type indicating handover.

The PDN type may indicate an available IP version. For example, the PDN type may be IPv4, IPv6, or IPv4v6.

The Protocol discriminator may be a discriminator indicating the type of protocol used for transmitting/receiving the PDN connectivity request.

The EPS bearer ID may be information for identifying the EPS bearer. The EPS bearer ID may be assigned by the MME 40.

The PCO may be protocol information associated with the PDN connection. Furthermore, the PCO may include identification information on the request. Note that the UE 10 may transmit the PCO including the first identification information.

The TFT may be information for identifying an IP flow that performs communication by using the PDN connection established in the present PDN connectivity procedure. Note that the IP flow to be identified may vary for each application. Thus, user data of a specific application can be identified by the TFT.

More specifically, the TFT may be constituted of five-tuple, or may be constituted of identification information such as the application ID. Note that the five-tuple may be constituted of a combination of one or more of a source IP address, a destination IP address, a source port number, a destination port number, and a protocol number.

Note that in the present example, when transmitting the PDN connectivity request, the UE 10 does not request a specific NBIFOM operation mode, and thus, the UE 10 may transmit the PDN connectivity request without including the TFT. In other words, in a case that the UE 10 requests the establishment of the multi-access PDN connection based on the NBIFOM without requesting the specific NBIFOM operation mode, the UE 10 may transmit the PDN connectivity request without including the TFT. More specifically, in a case that the UE 10 includes the first identification information and/or the sixth identification information, the UE 10 may transmit the PDN connectivity request without including the TFT.

Note that, in the related art, the UE 10 can perform transmission, with information indicating the IFOM support included in the PCO. Here, the IFOM support is identification information indicating that the IP Flow Mobility (IFOM) is supported. Furthermore, the IFOM is a technique for switching a communication path of a specific IP flow by using the Dual Stack Mobile IPv6 (DSMIPv6) protocol. Thus, including the information indicating the IFOM support in the PCO allows the UE 10 to switch the access network through which the communication of a specific IP flow is performed.

In the present embodiment, in a case that the UE 10 includes the first identification information and the sixth identification information in the PCO, the UE 10 does not include the IFOM support. In contrast, in a case that the UE 10 includes the IFOM support in the PCO, the UE 10 does not include the first identification information and/or the sixth information. As described above, a configuration may be made in which whether to use the switching of the communication path based on the NBIFOM or to use the switching of the communication path based on the IFOM is clearly defined by disabling both of the first identification information and the IFOM support.

Thus, the UE 10 can establish either the PDN connection supporting the IFOM or the PDN connection supporting the NBIFOM in the establishment procedure of a single PDN connection. In other words, the single PDN connection is the PDN connection supporting the NBIFOM, the PDN connection supporting the IFOM, or the single-access PDN connection.

The MME 40 receives the PDN connectivity request transmitted by the UE 10. Based on the reception of the PDN connectivity request, and/or and/or the first identification information and/or sixth identification information included in the PDN connectivity request, the MME 40 transmits a Create Session Request to the SGW 35 (S2104).

Based on the reception of the PDN connectivity request and/or the first identification information and/or sixth identification information included in the PDN connectivity request, the MME 40 may transmit the Create Session Request including at least the first identification information and/or sixth identification information.

Furthermore, the MME 40 may include the TFT in the Create Session Request based on the reception of the TFT transmitted by the UE 10.

Furthermore, the TFT may be information for identifying an IP flow that performs communication by using the PDN connection established in the present PDN connectivity procedure. Note that the IP flow to be identified may vary for each application. Thus, user data of a specific application can be identified by the TFT.

More specifically, the TFT may be constituted of five-tuple, or may be constituted of identification information such as the application ID. Note that the five-tuple may be constituted of a combination of one or more of a source IP address, a destination IP address, a source port number, a destination port number, and a protocol number.

Note that in a case that neither the first identification information nor the sixth identification information is included in the PDN connectivity request, the MME 40 may transmit the Create Session Request without including the first identification information and/or the sixth identification information. Moreover, in a case that the first identification information and/or the sixth identification information is not included in the PDN connectivity request, the MME 40 may perform a procedure for establishing the single-access PDN connection.

The SGW 35 receives the Create Session Request transmitted by the MME 40. Based on the reception of the Create Session Request, and/or the first identification information and/or sixth identification information included in the Create Session Request, the SGW 35 transmits the Create Session Request to the PGW 30 (S2106).

Based on the reception of the Create Session Request, and/or the first identification information and/or sixth identification information included in the Create Session Request, the SGW 35 may transmit the Create Session Request including at least the first identification information and/or the sixth identification information.

Furthermore, the SGW 35 may include the TFT in the Create Session Request.

Furthermore, the TFT may be information for identifying an IP flow that performs communication by using the PDN connection established in the present PDN connectivity procedure. Note that the IP flow to be identified may vary for each application. Thus, user data of a specific application can be identified by the TFT.

More specifically, the TFT may be constituted of five-tuple, or may be constituted of identification information such as the application ID. Note that the five-tuple may be constituted of a combination of one or more of a source IP address, a destination IP address, a source port number, a destination port number, and a protocol number.

Note that in a case that neither the first identification information nor the sixth identification information is included in the PDN connectivity request, the SGW 35 may transmit the Create Session Request without including the first identification information and/or the sixth identification information. Moreover, in a case that the first identification information and/or the sixth identification information is not included in the PDN connectivity request, the MME 40 may perform a procedure for establishing the single-access PDN connection.

The PGW 30 receives the Create Session Request transmitted by the SGW 35. Based on the reception of the Create Session Request, and/or the first identification information and/or sixth identification information included in the Create Session Request, the PGW 30 may perform the IP-CAN session update procedure with the PCRF 60 (S2108).

Based on the reception of the Create Session Request, and/or the first identification information and/or sixth identification information included in the Create Session Request, the PGW 30 may perform the IP-CAN session update procedure including at least the first identification information and/or the sixth identification information.

Note that the PGW 30 may perform the IP-CAN session update procedure to notify the PCRF 60 of information on the UE 10 and/or eNB 45 and/or MME 40 and/or SGW 35.

The PGW 30 may transmit, to the PCRF 60, a control message in the IP-CAN session procedure, the control message including information indicating whether the PDN connection to be established is the multi-access PDN connection or the single-access PDN connection, and/or the first identification information, and/or the sixth identification information.

More specifically, in a case that the multi-access PDN connection is to be established, the PGW 30 transmits, to the PCRF 60, the information indicating the access network A, the PDN connection ID, the information indicating that the PDN connection is the multi-access PDN connection, and the first identification information and/or sixth identification information. Alternatively, in a case that the single-access PDN connection is to be established, the PGW 30 transmits, to the PCRF 60, the information indicating the access network A, the PDN connection ID, and the information indicating that the PDN connection is the single-access PDN connection.

Note that the PDN connection ID may be an ID assigned when the PGW 30 establishes the PDN connection in the PDN connectivity procedure, or may be information for uniquely identifying the PDN connection that the UE 10 establishes with the PGW 30.

Furthermore, based on the reception of the first identification information and/or sixth identification information, the PCRF 60 may transmit, to the PGW 30, a control message in the IP-CAN session update procedure with the PGW 30, the control message including at least the seventh identification information. The detailed description of the seventh identification information will be described below.

Note that the PCRF 60 may perform the IP-CAN session update procedure to notify the PGW 30 of the charging information and/or the QoS control information and/or the routing information.

Based on the reception of the Create Session Request or the completion of the IP-CAN session update procedure, and/or the first identification information and/or sixth identification information included in the Create Session Request, and/or the seventh identification information included in the IP-CAN session update procedure, the PGW 30 transmits a Create Session Response to the SGW 35 (S2110).

Based on the reception of the Create Session Request or the completion of the IP-CAN session update procedure, and/or the first identification information and/or sixth identification information included in the Create Session Request, and/or the seventh identification information included in the IP-CAN session update procedure, the PGW 30 may transmit the Create Session Response including at least the seventh identification information.

Furthermore, the PGW 30 may include the PDN Address and/or the PDN connection ID and/or the TFT in the Create Session Response.

Note that a method by which the PGW 30 acquires the seventh identification information is not limited to the above-described method for acquiring the seventh identification information from the PCRF 60 in the IP-CAN session update procedure, and another example may be employed. For example, the PGW 30 may create the seventh identification information and transmit the Create Session Response including the seventh identification information, without acquiring the seventh identification information from the PCRF 60 in the IP-CAN session update procedure.

Here, the seventh identification information may be the Allowed Mode indicating the NBIFOM operation mode that is allowed for the multi-access PDN connection based on the NBIFOM to be established. In other words, the seventh identification information may be the operation mode allowed by the operator.

Note that the PCRF 60 or the PGW 30 may determine the Allowed Mode and the seventh identification information based on the operator policy. For example, a policy that allows the establishment of only the PDN connection of the UE-Initiated mode, a policy that allows the establishment of only the PDN connection of the Network-Initiated mode, a policy that allows the establishment of the PDN connection of both of the modes, a policy that prohibits the establishment of the PDN connection of both of the modes, and the like may be managed.

Note that the PCRF 60 or the PGW 30 may acquire the operator policy from the HSS and the like. Alternatively, an operator policy created by an administrator may be stored.

In addition, for the operator policy, a policy different for each subscriber may be managed. Alternatively, a policy different for each APN may be managed. For example, a different Allowed Mode for the PDN connection to be established for each APN may be managed.

Based on the Allowed Mode, the PCRF 60 or the PGW 30 may include the allowed operation mode in the seventh identification information.

In other words, in a case that only the Network-Initiated mode is allowed, the PCRF 60 or the PGW 30 may include the Network-Initiated mode in the seventh identification information. Alternatively, in a case that only the UE-Initiated mode is allowed, the PCRF 60 or the PGW 30 may include the UE-Initiated mode in the seventh identification information.

Note that in a case that both of the UE-Initiated mode and the Network-Initiated mode are allowed, the seventh identification information may include both of the operation modes. Alternatively, in a case that both of the UE-Initiated mode and the Network-Initiated mode are allowed and a default operation mode is configured, the seventh identification information may include only the default operation mode. Note that which of the UE-Initiated mode and the Network-Initiated mode is defined as the default operation mode may be configured based on the operator policy.

Note that, in a case that none of the operation modes is allowed for establishment of the PDN connection, the PCRF 60 may transmit, to the PGW 30, the cause information indicating that the Requested Operation Mode is not allowed.

In a case that none of the operation modes is allowed for establishment of the PDN connection, the PGW 30 need not notify the MME 40 of the seventh identification information via the SGW 35.

In a case that none of the operation modes is allowed for establishment of the PDN connection, the PGW 30 may transmit, to the MME 40 via the SGW 35, the Create Session Response including the cause information indicating that the Requested Operation Mode is not allowed.

In a case that none of the operation modes is allowed for establishment of the PDN connection, the PGW 30 may notify, via the SGW 35, the MME 40 that there is no allowed operation.

As described above, based on the Allowed Mode, the PCRF 60 or the PGW 30 may regard an operation mode that is allowed to establish the PDN connection as the seventh identification information.

Note that in a case that the Network-Initiated mode is not included in the seventh identification information, the PCRF 60 need not transmit the TFT to the PGW 30.

In other words, only in a case that the Network-Initiated mode is included in the seventh identification information, the PCRF 60 may transmit the TFT to the PGW 30.

Note that in a case that the Network-Initiated mode is not included in the seventh identification information, the PGW 30 need not transmit the TFT to the MME 40 via the SGW 35. Thus, in this case, the PGW 30 need not include the TFT in the Create Session Response.

In other words, only in a case that the Network-Initiated mode is included in the seventh identification information, the PGW 30 may transmit the TFT to the MME 40 via the SGW 35. Thus, in this case, the PGW 30 may include the TFT in the Create Session Response.

The PDN Address may be an IP address assigned to the UE 10. For example, the PDN Address may be an IPv4 address, or an IPv6 prefix and an interface ID for constituting an IPv6 address. Here, the PGW 30 may assign the IP address of the UE 10. Moreover, the PGW 30 may include the IP address assigned to the UE 10 in the PDN Address.

Furthermore, the PDN connection ID may be information for uniquely identifying the PDN connection established between the UE 10 and the PGW 30. The PDN connection ID may be assigned by the PGW 30, or may be assigned by the MME 40. In other words, the PGW 30 may assign the PDN connection ID.

The SGW 35 receives the Create Session Response transmitted by the PGW 30. Based on the reception of the Create Session Response and/or the seventh identification information included in the Create Session Response, the SGW 35 transmits the Create Session Response to the MME 40 (S2112).

Based on the reception of the Create Session Response and/or the seventh identification information included in the Create Session Response, the SGW 35 may transmit the Create Session Response including at least the seventh identification information.

Furthermore, the SGW 35 may include the PDN Address and/or the PDN connection ID and/or the TFT in the session request response.

The MME 40 receives the Create Session Response transmitted by the SGW 35. Based on the reception of the Create Session Response and/or the seventh identification information included in the Create Session Response, the MME 40 transmits an Activate default EPS bearer context request to the eNB 45 (S2114).

Based on the reception of the Create Session Response and/or the seventh identification information included in the Create Session Response, the MME 40 may transmit the Activate default EPS bearer context request including at least an Activate default EPS bearer context request message identity (Activate default EPS bearer context request message ID), the Procedure transaction ID, the APN, the PDN Address, the Protocol discriminator, the EPS bearer ID, and an EPS QoS. Furthermore, the MME 40 may include at least the seventh identification information in the Activate default EPS bearer context request. Moreover, the MME 40 may include the PCO and/or an ESM Cause and/or the TFT and/or the PDN connection ID and/or PDN connection attribute information in the Activate default EPS bearer context request. Note that the MME 40 may transmit the PCO including the seventh identification information and/or the TFT and/or the PDN connection ID.

Here, the Activate default EPS bearer context request message ID may be a message type representing the Activate default EPS bearer context request message.

The APN may be an APN to which the UE 10 is allowed to connect. More specifically, the APN may be the APN 1. The APN 1 may be an APN that is allowed to establish the multi-access PDN connection based on the NBIFOM. The MME 40 may include the APN 1 in the Activate default EPS bearer context request.

The PDN Address may be an IP address assigned to the UE 10. For example, the PDN Address may be an IPv4 address, or an interface ID for constituting an IPv6 address.

The EPS QoS may be a state representing the QoS of the EPS bearer.

The PDN connection attribute information may be information indicating that the PDN connection established in the present PDN connectivity procedure is the multi-access PDN connection, and/or information indicating that user data transmitted/received by using the PDN connection established in the present PDN connectivity procedure is allowed to be transmitted/received through the access network A and the access network B, and/or information indicating that the PDN connection established in the present PDN connectivity procedure is the multi-access PDN connection of the operation mode indicated by the seventh identification information.

Note that the UE 10 may transmit the Activate default EPS bearer context request message that further includes a connectivity type indicating the type of PDN connection and/or WLAN offload permission information (WLAN offload acceptability) indicating whether or not the WLAN offload can be performed. Furthermore, the MME 40 may transmit the connectivity type or the WLAN offload permission information including the PDN connection attribute information.

The ESM Cause may be information representing that the PDN type of the PDN Address assigned to the UE 10 is different from the PDN type requested by the UE 10 in the PDN connectivity request.

Note that the MME 40 and/or the PGW 30 may include the seventh identification information in the PCO. However, in a case that the MME 40 and/or the PGW 30 includes the seventh identification information in the PCO, the MME 40 and/or the PGW 30 does not include the IFOM support. In contrast, in a case that the MME 40 and/or the PGW 30 includes the IFOM support in the PCO, the MME 40 and/or the PGW 30 does not include the seventh identification information. As described above, a configuration may be made in which whether to use the switching of the communication path based on the NBIFOM or the switching of the communication path based on the IFOM is clearly defined by disabling both of the seventh identification information and the IFOM support.

The eNB 45 receives the Activate default EPS bearer context request transmitted by the MME 40. Based on the reception of the Activate default EPS bearer context request, the eNB 45 transfers the Activate default EPS bearer context request to the UE 10.

The eNB 45 may transmit, to the UE 10, at least an RRC Connection Reconfiguration together with the Activate default EPS bearer context request (S2116).

The UE 10 receives the RRC Connection Reconfiguration transmitted by the eNB 45. Furthermore, the UE 10 receives the Activate default EPS bearer context request that is transmitted by the MME 40 and transferred by the eNB 45.

Based on the reception of the RRC Connection Reconfiguration, the UE 10 transmits an RRC Connection Reconfiguration Complete to the eNB 45 (S2118).

The eNB 45 receives the RRC Connection Reconfiguration Complete transmitted by the UE 10. Based on the RRC Connection Reconfiguration Complete, the eNB 45 transmits a bearer configuration to the MME 40.

The MME 40 receives the bearer configuration transmitted by the eNB 45 (S2120).

Based on the reception of the Activate default EPS bearer context request and/or the seventh identification information included in the Activate default EPS bearer context request, the UE 10 transmits an Activate default EPS bearer context accept to the MME 40 (S2122) (S2124).

The UE 10 may transmit the Activate default EPS bearer context accept including at least an Activate default EPS bearer context accept message identity (Activate default EPS bearer context accept message ID), the Procedure transaction ID, the Protocol discriminator, and the EPS bearer ID.

Furthermore, the UE 10 may include the PCO in the Activate default EPS bearer context accept.

Furthermore, in a case that multiple INFOM operation modes are included in the seventh identification information, the UE 10 may include at least the fifth identification information in the Activate default EPS bearer context accept. In other words, in a case that the multiple INFOM operation modes are allowed, the UE 10 may select one the allowed modes and transmit the fifth identification information including the selected mode.

Specifically, in a case that the UE-Initiated mode and the Network-Initiated mode are included in the seventh identification information included in the Activate default EPS bearer context request, the UE 10 may include the UE-Initiated mode or the Network-Initiated mode in the fifth identification information.

Which of the UE-Initiated mode and the Network-Initiated mode is to be included in the fifth identification information may be determined based on the UE policy.

Note that the UE policy may be any information configured for the UE 10. For example, the UE policy may be information configured by a user.

Here, the Activate default EPS bearer context accept message ID may be a message type indicating the Activate default EPS bearer context accept message.

After the fourth PDN connectivity procedure is completed, the UE 10 and the PGW 30 establish the first PDN connection of the operation mode determined based on the operator policy. Alternatively, the UE 10 establishes the first PDN connection of an operation mode selected from the operation modes allowed based on the operator policy. Note that based on the reception of the Activate default EPS bearer context request and/or the PDN connection attribute information and/or the seventh identification information and/or the operation mode selected based on the seventh identification information, the UE 10 may identify the NBIFOM operation mode for the established PDN connection. Based on the establishment of the first PDN connection, the UE 10 and the PGW 30 determine a PDN connection and/or a transfer path (such as an EPS bearer) for transmitting/receiving the IP flow by using the TFT, and transmit/receive user data corresponding to the IP flow identified by the TFT. More specifically, the UE 10 and the PGW 30 transmit/receive a flow identified by the TFT by using the first PDN connection.

Note that in the example of the fourth PDN connectivity procedure, a case has been described in which the transmission/reception of the TFT is included in the PDN connectivity procedure; however, the fourth PDN connectivity procedure is not limited to this case. The transmission/reception of the TFT may be performed after the multi-access PDN connection based on the NBIFOM is established.

Therefore, the UE 10 and the MME 40 may perform transmission/reception without including the TFT in the PDN connectivity request and/or the Activate default EPS bearer context request, and establish the multi-access PDN connection based on the NBIFOM. In other words, at a point in time when the PDN connection is established, there may be no IP flow transmitting/receiving user data by using the PDN connection. In this case, the UE 10 and the MME 40 transmit the TFT after the multi-access PDN connection is established.

More specifically, in a case that the PDN connection of the UE-Initiated mode has been established, the UE 10 may transmit the TFT to the MME 40 via the eNB 45. In addition, the MME 40 receives the TFT from the UE 10 and transmits the TFT to the PGW 30 via the SGW 35. Thus, the UE 10 and the PGW 30 can determine a PDN connection and/or a transfer path (such as an EPS bearer) for transmitting/receiving the IP flow by using the TFT, and transmit/receive user data corresponding to the IP flow identified by the TFT.

On the other hand, in a case that the PDN connection of the Network-Initiated mode has been established, the PGW 30 may transmit the TFT to the MME 40 via the SGW 35. Here, the PGW 30 may receive, from the PCRF 60, the TFT determined based on the operator policy. In addition, the MME 40 receives the TFT from the PGW 30 via the SGW 35 and transmits the TFT to the UE 10 via the eNB 45. Thus, the UE 10 and the PGW 30 can determine a PDN connection and/or a transfer path (such as an EPS bearer) for transmitting/receiving the IP flow by using the TFT, and transmit/receive user data corresponding to the IP flow identified by the TFT.

Furthermore, in the example of the fourth PDN connectivity procedure, a case has been described in which the UE 10 and the PGW 30 establish the first PDN connection of the operation mode selected by the UE 10 from the operation mode determined based on the operator policy and the operation mode allowed based on the operator policy; however, the fourth PDN connectivity procedure is not limited to this case. The UE 10 may reject the establishment of the first PDN connection.

For example, in a case that the UE 10 does not support the operation mode allowed based on the operator policy and/or in a case that the operation mode allowed based on the operator policy does not comply with the policy of the UE 10, the UE 10 may reject the establishment of the first PDN connection.

In more detail, based on the reception of the Activate default EPS bearer context request and/or the seventh identification information included in the Activate default EPS bearer context request and/or the PDN connection attribute information and/or the policy of the UE 10, the UE 10 may transmit the Activate default EPS bearer context reject to the MME 40 via the eNB 45.

The UE 10 may transmit the Activate default EPS bearer context reject including at least the Activate default EPS bearer context reject message identity (Activate default EPS bearer context reject message ID), the Procedure transaction ID, the Protocol discriminator, the EPS bearer ID, and the ESM Cause. Furthermore, the UE 10 may further include fourth identification information in the Activate default EPS bearer context reject. Furthermore, the UE 10 may further include the PCO in the Activate default EPS bearer context reject. Note that the UE 10 may transmit the PCO including the fourth identification information.

The fourth identification information may be information representing that the UE 10 does not support the operation mode allowed based on the operator policy and/or information representing that the operation mode allowed based on the operator policy does not comply with the policy of the UE 10.

The Activate default EPS bearer context reject message ID may be a message type representing the Activate default EPS bearer context reject mess age.

The ESM Cause may be information indicating a reason why the Activate default EPS bearer context request is rejected. Here, the UE 10 may notify the UE 10 of the fourth identification information included in the ESM Cause.

The MME 40 may receive the Activate default EPS bearer context reject transmitted by the UE 10. Based on the reception of the Activate default EPS bearer context reject and/or the fourth identification information included in the Activate default EPS bearer context reject, the MME 40 may delete the EPS bearer context, held by the MME 40, relating to the established PDN connection. Furthermore, the MME 40 may transmit, to the SGW 35, the fourth identification information included in the Activate default EPS bearer context reject.

The SGW 35 may receive the fourth identification information transmitted by the MME 40. Based on the reception of the fourth identification information and/or the operator policy, the SGW 35 may delete the EPS bearer context, held by the SGW 35, relating to the established PDN connection. Furthermore, the SGW 35 may transmit, to the PGW 30, the fourth identification information received from the MME 40.

The PGW 30 may receive the fourth identification information transmitted by the SGW 35. Based on the reception of the fourth identification information and/or the operator policy, the PGW 30 may delete the EPS bearer context, held by the PGW 30, relating to the established PDN connection.

Furthermore, the PGW 30 may perform the IP-CAN session update procedure with the PCRF 60 based on the reception of the fourth identification information. The PGW 30 may include the fourth identification information in the IP-CAN session update procedure.

The PCRF 60 may change the operator policy based on the IP-CAN session update procedure. Note that based on the change of the operator policy, the PGW 30 may delete the EPS bearer context, held by the PGW 30, relating to the established PDN connection.

Note that in a case that the multi PDN connection has been established, a procedure for adding a new transfer path can be performed. On the other hand, in a case that the single-access PDN connection has been established, the transfer path can be changed, but a procedure for adding a transfer path cannot be performed.

2.4.5. Description of State After PDN Connectivity Establishment Procedure

Performing the above-described first to fourth PDN connectivity procedures leads to a first state and a second state described below.

Note that the initial state in the additional Attach procedure may be the second state. The initial state in the additional Attach procedure need not be limited to the second state.

2.4.6. Description of First State

The first state will be described with reference to FIG. 13. In the first state, the UE 10 has already established the first PDN connection with the core network 90. However, the UE 10 has not yet established the second PDN connection. In more detail, the UE 10 has already established the first PDN connection with the PGW_A 1310. However, the UE 10 has not yet established the second PDN connection with the PGW_B 1320.

Note that the PGW_A 1310 may be a gateway device selected by using the APN 1. The PGW_B 1320 may be a gateway device selected by using the APN 2. Moreover, the PGW_A 1310 and the PGW_B 1320 may be the PGW 30. Furthermore, the selection of gateway using the APN 1 and/or the APN 2 may be performed by the TWAG 74 included and located in the access network B and/or the MME 40 included and located in the core network 90.

In addition, the gateway device selected by using the APN 1 and the gateway device selected by using the APN 2 may be the same gateway device. In this case, the PGW_A 1310 and the PGW_B 1320 may be the same device.

Note that the first PDN connection may be constituted of a transfer path between the UE 10 and the PGW 30 through the access network A. Thus, the first PDN connection may be constituted of a transfer path that is a combination of a transfer path between the UE 10 and the eNB 45, a transfer path between the eNB 45 and the SGW 35, and a transfer path between the SGW 35 and the PGW_A 1310. Here, the transfer path may be a bearer.

As described above, in the first state, the UE 10 may be in a state of having the multi-access PDN connection based on the NBIFOM established via the access network A. In addition, in the first state, the UE 10 may be in a state of not connected to the core network 90 via the access network B.

Note that the UE 10 need not have the single-access PDN connection established via the access network A.

Alternatively, the UE 10 may be in a state of having the single-access PDN connection established via the access network A. In this case, the UE 10 may perform, in the LTE access network, the Attach procedure or the PDN connectivity procedure in the single-access PDN connection initiated by the UE 10 to establish the third PDN connection.

Note that the third PDN connection may be established with the gateway selected by using the APN 2. Alternatively, the third PDN connection may be established with a gateway selected by using another APN different from either the APN 1 or the APN 2.

The first state has been described above; however the first state is not limited to the above-described state, and may be, for example, a state in which the multi-access PDN connection based on the NBIFOM has been established through the access network A and the PDN connection has not established through the access network B.

2.4.7. Description of Second State

The second state will be described with reference to FIG. 14. In the second state, the UE 10 has already established the first PDN connection with the core network 90. Furthermore, the UE 10 has already established the second PDN connection with the core network 90. In more detail, the UE 10 has already established the first PDN connection with the PGW_A 1310. Furthermore, the UE 10 has already established the second PDN connection with the PGW_B 1320.

Note that the PGW_A 1310 may be a gateway device selected by using the APN 1. The PGW_B 1320 may be a gateway device selected by using the APN 2. Moreover, the PGW_A 1310 and the PGW_B 1320 may be the PGW 30. Furthermore, the selection of gateway using the APN 1 and/or the APN 2 may be performed by the TWAG 74 included and located in the access network B and/or the MME 40 included and located in the core network 90.

In addition, the gateway device selected by using the APN 1 and the gateway device selected by using the APN 2 may be the same gateway device. In this case, the PGW_A 1310 and the PGW_B 1320 may be the same device.

Note that the first PDN connection may be constituted of a transfer path between the UE 10 and the PGW 30 through the access network A. Thus, the first PDN connection may be constituted of a transfer path that is a combination of a transfer path between the UE 10 and the eNB 45, a transfer path between the eNB 45 and the SGW 35, and a transfer path between the SGW 35 and the PGW_A 1310. Here, the transfer path may be a bearer.

In addition, the second PDN connection may be constituted of a transfer path between the UE 10 and the PGW 30 through the access network B. Thus, the second PDN connection may be constituted of a transfer path between the UE 10 and the TWAG 74 and a transfer path between the TWAG 74 and the PGW_B 1320. Here, the transfer path may be a bearer.

As described above, in the first state, the UE 10 may be in a state of having the multi-access PDN connection based on the NBIFOM established via the access network A. Furthermore, the UE 10 may be in a state of having the single-access PDN connection established via the access network B.

Note that the UE 10 need not have the single-access PDN connection established via the access network A.

Alternatively, the UE 10 may be in a state of having the single-access PDN connection established via the access network A. In this case, the UE 10 may perform, in the LTE access network, the Attach procedure or the PDN connectivity procedure in the single-access PDN connection initiated by the UE 10 to establish the third PDN connection.

Note that the third PDN connection may be established with the gateway selected by using the APN 2. Alternatively, the third PDN connection may be established with a gateway selected by using another APN different from either the APN 1 or the APN 2.

The second state has been described above; however, the second state is not limited to the above-described state, and may be, for example, a state in which the multi-access PDN connection based on the NBIFOM has been established through the access network B and the single-access PDN connection has not been established through the access network A.

3. Modification

Additionally, the programs run on the devices in the embodiments are each configured to control a CPU (program causing a computer to function) so as to realize the functions of the above-described embodiments. The information handled by these devices is temporarily held in a transitory storage device (RAM, for example) at the time of processing, and is then stored in various storage devices such as a ROM and an HDD, read out by the CPU as necessary, and edited and written.

Here, a semiconductor medium (a ROM, a non-volatile memory card, or the like, for example), an optical recording medium/magneto-optical recording medium (a Digital Versatile Disc (DVD), a Magneto Optical Disc (MO), a Mini Disc (MD), a Compact Disc (CD), a BD, or the like, for example), a magnetic recording medium (magnetic tape, a flexible disk, or the like, for example), and the like can be given as examples of recording media for storing the programs. In addition to realizing the functions of the above-described embodiments by executing loaded programs, the functions of the present invention are realized by the programs running cooperatively with an operating system, other application programs, or the like in accordance with instructions included in those programs.

When delivering these programs to market, the programs can be stored in a portable recording medium, or transferred to a server computer connected via a network such as the Internet. In this case, it is needless to say that the storage device in the server computer is also included in the present invention.

Additionally, each device in the above-described embodiments may be partially or completely realized as Large Scale Integration (LSI) circuit, which is a typical integrated circuit. The functional blocks of each device may be individually realized as chips, or may be partially or completely integrated into a chip. Furthermore, a circuit integration technique is not limited to the LSI, and may be realized with a dedicated circuit or a general-purpose processor. Furthermore, if advances in semiconductor technology produce circuit integration technology capable of replacing the LSI, it is needless to say that the integrated circuits based on the technology can be used.

Additionally, although, for the above-described embodiments, the LTE and the WLAN (IEEE 802.11a/b/n, for example) have been described as examples of the radio access network, the connections may be made with WiMAX instead of the WLAN.

REFERENCE SIGNS LIST

7 Core network
9 Communication system
10 UE
30 PGW
35 SGW
40 MME
45 eNB
50 HSS
55 AAA
60 PCRF
65 ePDG
70 WLAN ANa
74 TWAG
75 WLAN ANb
80 LTE AN
100 PDN

The invention claimed is:

1. A User Equipment (UE) comprising:
   LTE interface circuitry configured to:
   transmit a Packet Data Network (PDN) connectivity request message to a Mobility Management Entity (MME), in order to establish a PDN connection; and
   receive an Activate default EPS bearer context request message from the MME; and
   control circuitry, wherein
   the PDN connectivity request message includes first information indicating a requested Network-based IP Flow Mobility (NBIFOM) mode,
   the PDN connectivity request message further includes a request type and a Protocol Configuration Option (PCO),
   the control circuitry is configured to set the request type to information indicating an initial connectivity request,
   the PCO includes information indicating a request for use of NBIFOM, the Activate default EPS bearer context request message is a response message to the PDN connectivity request message, and includes second information indicating an NBIFOM mode, the Activate default EPS bearer context request message further includes information indicating that the request for use of NBIFOM is accepted, and based on the reception of the Activate default EPS bearer context request message, the control circuitry is configured to:
- consider that the NBIFOM is applied to the PDN connection; and
- consider the second information as the NBIFOM mode for the PDN connection.

2. The UE according to claim 1, wherein
each of the first information and the second information indicates a UE-initiated NBIFOM mode or a Network-initiated NBIFOM mode.

3. The UE according to claim 2, wherein
the second information indicates the UE-initiated NBIFOM mode as the NBIFOM mode, in a case that the UE requests the UE-initiated NBIFOM mode and a PDN Gateway (PGW) or a Policy and Charging Rules Function (PCRF) selects the UE-initiated NBIFOM mode, and the second information indicates the Network-initiated NBIFOM mode as the NBIFOM mode, in a case that the UE requests the Network-initiated NBIFOM mode and the PGW or the PCRF selects the Network-initiated NBIFOM mode.

4. The UE according to claim 2, wherein
the NBIFOM mode that the second information indicates is selected, based on an operator policy, by a PDN Gateway (PGW) or a Policy and Charging Rules Function (PCRF), in a case that the UE requests the UE-initiated NBIFOM mode.

5. A Mobility Management Entity (MME) comprising:
IP mobile communication network interface circuitry configured to:
- receive a Packet Data Network (PDN) connectivity request message from a User Equipment (UE); and
- transmit an Activate default EPS bearer context request message to the UE; and control circuitry configured to control the IP mobile communication network interface circuitry, wherein the PDN connectivity request message includes first information indicating a requested Network-based IP Flow Mobility (NBIFOM) mode, the PDN connectivity request message further includes a request type and a Protocol Configuration Option (PCO), the request type is set to information indicating an initial connectivity request, the PCO includes information indicating a request for use of NBIFOM, the Activate default EPS bearer context request message is a response message to the PDN connectivity request message, and includes second information indicating an NBIFOM mode, and the Activate default EPS bearer context request message further includes information indicating that the request for use of NBIFOM is accepted.

6. The MME according to claim 5, wherein
each of the first information and the second information indicates a UE-initiated NBIFOM mode or a Network-initiated NBIFOM mode.

7. The MME according to claim 6, wherein
the second information indicates the UE-initiated NBIFOM mode as the NBIFOM mode, in a case that the UE requests the UE-initiated NBIFOM mode and a PDN Gateway (PGW) or a Policy and Charging Rules Function (PCRF) selects the UE-initiated NBIFOM mode, and the second information indicates the Network-initiated NBIFOM mode as the NBIFOM mode, in a case that the UE requests the Network-initiated NBIFOM mode and the PGW or the PCRF selects the Network-initiated NBIFOM mode.

8. The MME according to claim 6, wherein
the NBIFOM mode that the second information indicates is selected, based on an operator policy, by a PDN Gateway (PGW) or a Policy and Charging Rules Function (PCRF), in a case that the UE requests the UE-initiated NBIFOM mode.

* * * * *